US008442844B1

(12) United States Patent
Trandal et al.

(10) Patent No.: US 8,442,844 B1
(45) Date of Patent: May 14, 2013

(54) METHODS AND SYSTEMS FOR CLAIMS MANAGEMENT FACILITATION

(76) Inventors: David S. Trandal, Santa Barbara, CA (US); David Brahm, The Woodlands, TX (US)

( * ) Notice: Subject to any disclaimer, the term of this patent is extended or adjusted under 35 U.S.C. 154(b) by 0 days.

(21) Appl. No.: 13/008,166

(22) Filed: Jan. 18, 2011

Related U.S. Application Data

(63) Continuation of application No. 12/137,373, filed on Jun. 11, 2008, now abandoned.

(51) Int. Cl.
*G06Q 40/00* (2012.01)
(52) U.S. Cl.
USPC .................................. 705/4; 705/35
(58) Field of Classification Search ................ 705/4, 35
See application file for complete search history.

(56) References Cited

U.S. PATENT DOCUMENTS

| 5,642,279 | A | * | 6/1997 | Bloomberg et al. | 705/14.34 |
| 2002/0069118 | A1 | * | 6/2002 | Zylstra | 705/26 |
| 2004/0143502 | A1 | * | 7/2004 | McClung, III | 705/14 |
| 2008/0028473 | A1 | * | 1/2008 | Cehelnik | 726/27 |
| 2008/0073429 | A1 | * | 3/2008 | Oesterling et al. | 235/383 |
| 2009/0289114 | A1 | * | 11/2009 | Grigsby et al. | 235/383 |

OTHER PUBLICATIONS

Abstract: Buy Now and Match Later: Impact of Posterior Price Matching on Profit with Strategic Consumers; Guoming Lai , Laurens G. Debo and Katia Sycara (http://msom.highwire.org/content/12/1/33.short).*

* cited by examiner

*Primary Examiner* — Narayanswamy Subramanian
*Assistant Examiner* — Asha Puttaiah

(57) ABSTRACT

The present invention relates to product claims management solutions, and in particular, to methods and systems for maintaining purchase records and product repair, replacement, and refund claims processing. The user experience in performing claims management is simplified and enhanced over existing methods.

21 Claims, 46 Drawing Sheets

Fig. 15 http://www.eZReturns.com/eZReturn.html — 20100 e℥ Returns ™ / Contact Us / Help /
— 20200 eZ Return Instructions:

You have selected the easy return option. Here is what we are going to do:.

- We will contact the manufacturer and send/fax a copy of your store receipt.
- They will ship to your residence a new faucet filter. Expect to receive your new faucet filter in 2-3 weeks.
- Return the old faucet filter in the new filter packaging.
- We will bill your credit card $4.95 for shipping and handling charges.
- If you do not return the old faucet within 3 weeks after receipt of the new one, we will be required to place a $129.97 charge on your credit card for the cost of the new faucet filter.

We need you to confirm the following:

Your current address:   Robert Smith
                        1234 State Street
                        Santa Barbara, CA, 93101
                        — 20300    click here to modify Charges to be placed on   $4.95
your credit card number : VISA XXXXXXXXXXXX9771
                        — 20400   click here to modify or to
                                  to use a different payment
                                  option

[Confirm] — 20600
— 20500

By clicking on Confirm you are agreeing to eZ Returns
Warranty Manager Terms and Conditions.

METHODS AND SYSTEMS FOR CLAIMS MANAGEMENT FACILITATION

REFERENCE TO RELATED APPLICATIONS

This application is a continuation of U.S. application Ser. No. 12/137,373, filed Jun. 11, 2008, which is hereby incorporated by reference in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

FIELD OF THE INVENTION

The present invention relates to product warranty and insurance claims management using digital imaging, data processing and data/voice networks.

BACKGROUND OF THE INVENTION

Many consumers are unaware of the warranty and insurance services that they paid for when they purchased an item. Others are aware of these benefits but are unwilling to expend the effort to retain the purchase records and to complete the appropriate forms to take advantage of these benefits when the item is lost or malfunctions. In yet other cases, consumers are aware they have warranty coverage but are unsure whether they need to contact the retail merchant, the manufacturer, their insurance agent and/or their credit card company. As a result, consumers waste millions of dollars annually by purchasing new items or repairing their existing items at their own expense.

SUMMARY OF THE INVENTION

Example embodiments listed simplify product purchase record keeping and product repair/replacement/refund during claims processing. In addition, the described embodiments create more reliable, complete, and secure record keeping processes for the consumer.

In addition, embodiments of the present invention provide methods and systems to enable a service provider to offer claims management facilitation services that includes searching, organizing, and storing purchase records and analysis of warranty and service contract tradeoffs to assist consumer purchase decisions. In addition, internal and external databases are queried to link or further enhance the data/objects organized and stored related to consumer purchases. In addition, certain methods and systems described herein determine whether a user is within a warranty period and who/how to contact to process a warranty claim. In addition, certain methods and system described herein provide alert notification services related to warranty periods.

BRIEF DESCRIPTION OF THE DRAWINGS

Example embodiments will now be described with reference to the drawings summarized below. These drawings and the associated descriptions are provided to illustrate example embodiments of the invention, and not to limit the scope of the invention.

FIG. 9 illustrates a second example Web-based user interface display of a user's stored receipts.

FIG. 10 illustrates another example Web-based user interface display of an individual receipt.

FIG. 11 illustrates another example Web-based user interface displaying selected purchased items for tracking.

FIG. 15 illustrates another example Web-based user interface displaying sale refund instructions for a given item.

FIG. 20 illustrates another example Web-based user interface displaying user return instructions when processed by the Claims Management system.

DETAILED DESCRIPTION OF THE PRESENT INVENTION

Figure 1:
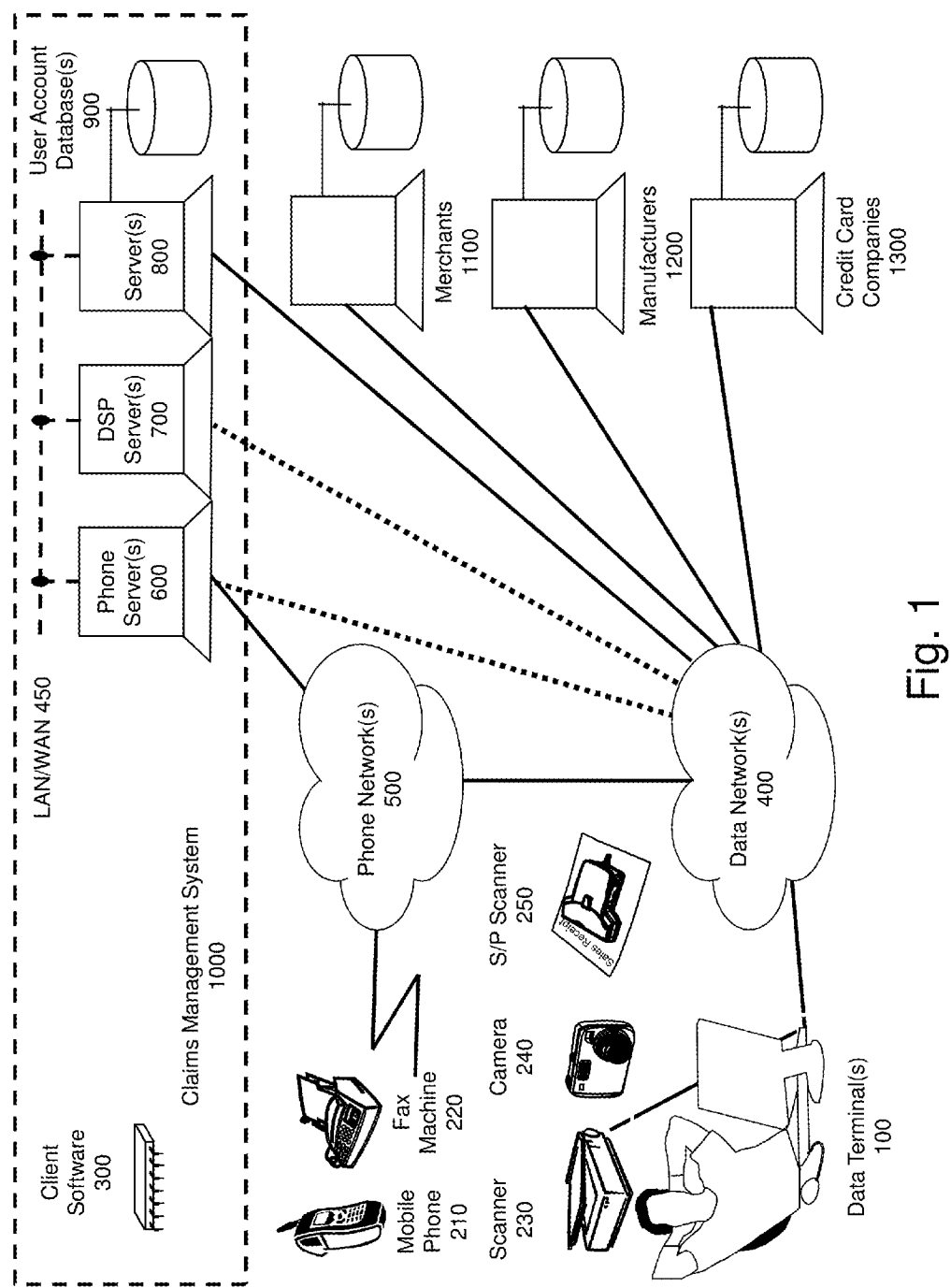
FIG. 1 illustrates an example network operating environment for a Claims Management system.

The methods and systems of the present invention simplify and enhance product warranty and insurance claims processing and product purchase record capture.

GLOSSARY

Merchant Return Policy—a merchant policy or obligation that a product sold can be returned for reimbursement, repaired or replaced within a stated period of time in the event that the product is defective or not as should be expected by a reasonable buyer. In some cases, merchants have a satisfaction guarantee policy which entitles the consumer to return the item if they are not satisfied with the product or if the product is not functioning as expected by a reasonable buyer.

Lowest Price Guarantee (Price Protection)—some merchants and credit card companies/banks provide a time limited guarantee that the price paid for products purchased at their store or using their credit cards will be the lowest available or they will refund the difference to the buyer.

Credit Card Extended Insurance (Purchase Security)—some credit card companies/banks provide additional insurance on products purchased. At the credit card company's/bank's discretion, they replace, repair or reimburse the consumer for eligible items of personal property purchased entirely with an eligible credit card up to a maximum dollar amount per claim and a per cardholder maximum, in the event of theft, damage due to fire, vandalism, accidentally discharged water, or certain weather conditions.

Manufacturer's Warranty—a manufacturer's warranty is an obligation that a product sold is as factually stated or legally implied by the seller. The manufacturer's warranty provides for a specific remedy such as reimbursement, repair or replacement in the event the product fails to meet the warranty conditions. A breach of warranty occurs when the promise is broken, i.e., a product is defective or not functioning as should be expected by a reasonable buyer.

Extended Warranty—a retailer, a manufacturer, a credit card company/bank, or a third party may offer an "extended" warranty. An extended warranty extends the warranty period of a product. Extended warranties, in some cases, have different terms and conditions from the original manufacturer's warranty. For example, extended warranties may exclude parts that normally wear out.

Web Site or Web—a term used throughout the following description to refer to a user-accessible network site that implements the basic World Wide Web standards for the coding and transmission of hypertext documents. These standards currently include Hypertext Markup Language (HTML) and Hypertext Transfer Protocol (HTTP). It should be understood that the term "site" is not intended to imply a single geographic location, as a Web or other network site can, for example, include multiple geographically distributed computer systems that are appropriately linked together. Furthermore, while the following descriptions relates to an embodiment utilizing the Internet and related protocols, other networks and other protocols may be used as well.

Scanned Image—while the following refers to scanned images or pictures of receipts, the term should not be limited to images from a scanner or photographic images taken from a mobile device. Images include for example facsimiles, video, digital camera images, and other optical image capture which can be used to scan or photograph items and transmit the images or pictures electronically.

Rendition—a rendition is an alternate view of original information. An example includes a conversion of a purchase receipt into an editable electronic document or presentation on a widget or browser display.

Widget/Gadget—some or all of the information and functionality provided by the user interfaces discussed can be provided by a widget or a gadget. A widget can be in the form of portable code that can be installed and executed within a Web page (e.g. an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

Unless otherwise indicated, the functions described herein may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a Personal Computer (PC) system or data device, other computer or electronic systems can be used as well, such as, without limitation, an interactive television, a network-enabled personal digital assistant (PDA), a network game console, a networked entertainment device, a smart phone (e.g., with an operating system and on which a user can install applications) and so on.

The terms, "for example", "e.g.", "optionally", as used herein, are intended to be used to introduce non-limiting examples. While certain references are made to certain example system components or services, other components and services can be used as well and/or the example components can be combined into fewer components and/or divided into further components.

In addition, while certain user inputs or gestures are described as being provided via phone key presses, data entry via a keyboard, or by clicking a computer mouse or button, optionally, user inputs can be provided using other techniques, such as by voice or otherwise. The example screen layouts, appearance, and terminology as depicted and described herein, are intended to be illustrative and exemplary, and in no way limit the scope of the invention as claimed.

The functionality, operation, and implementation for an example Claims Manager (CM) service will now be described in further detail.

FIG. 1 illustrates an example CM system 1000 that can be used in accordance with the present invention. As illustrated, the CM system includes a plurality of user mobile phones 210 which function as receipt scanners. The mobile phones 210 are connected to a phone (wireless) network 500 and data network 400. Optionally, wireline phones are connected to a phone (wireline) network 500. Optionally, the mobile phones 210 are capable of receiving one or more software applications 300 over a phone network 400. Optionally, the mobile phones 210 are capable of taking pictures and these pictures can be downloaded over a phone network 500 and/or data network 400 to a server 800. Optionally, web server 800 offloads image and speech processing to Digital Signal Processing (DSP) Servers 700 to assist in image processing scanned documents or purchase receipts. Live operators can also serve to assist and/or replace the DSP servers 700 in carrying out these services. Optionally, other types of devices with image scanning capabilities can be utilized with the CM system 1000. For example, a facsimile device 220 can be used to scan and transmit an image across the phone network 500 and received by the phone server 600 of the CM system 1000.

As further illustrated, the CM system interacts with a plurality of computer/data terminals 100. The data/computer terminals 100 can be a personal computer having a monitor, keyboard, memory, a disk drive, and a data communication interface. In addition, the computer terminal 100 can be an interactive television, a networked-enabled personal digital assistant (PDA) or the like. The data/computer terminals 100 are connected to a data network 400 (e.g., the Internet or a corporate LAN or WAN).

As further illustrated, the CM system 1000 includes a plurality of conventional scanners 230 that can optionally be connected to and integrate with a data terminal 100. Optionally, a digital camera 240 can be used to take a picture of a receipt or document and download the image to a data terminal 100. Scanned images can be stored within a data terminal 100 or transmitted over a data network 400 (e.g., the Internet or a corporate LAN or WAN). Optionally, a plurality of more sophisticated scanners (e.g., self-standing scanners not requiring a data terminal 100) or specialized receipt scanners 250 (e.g., a special purpose scanner built explicitly to scan receipts) are connected to a data network 400 (e.g., the Internet or a corporate LAN or WAN). These specialized receipt scanners 250 can optionally include a display, an input keyboard, computer memory, a disk drive, and a data communication interface.

In an example embodiment, a downloadable, application software program 300 connects to and communicates with a phone server 600 and/or a web server 800 either directly via the phone network 500 or indirectly by linking the wireless network 500 with the data network 400. The application program 300, executing on a subscriber's mobile phone 210 or other host, can interact with the optical scanning capabilities of the mobile phone to receive an image or the content of an image. Optionally, the application program 300 can be used to directly transmit data to the CM system 1000 (e.g., by transmitting a message over the Internet). Optionally, the application program 300 can make the user's online presence known to the CM system 1000 (e.g., by periodically transmitting a message over the Internet to the CM system 1000). Optionally, the application program 300 can be used to receive and store in a computer readable medium a password from the user. For example, the user invokes the application (if the application is not already active) and enters a password (e.g., by key pressing or speaking a password). Optionally, the application program 300 can be used to receive and store in a computer readable medium a copy of a password from a CM service provider 1000 that the user has previously registered with. For example, the CM system transmits a message over a wireless data connection to the application program 1000 or via a Short Message Service (SMS). SMS is a wireless messaging service that enables the transmission of messages between mobile subscribers (and their phones) and external systems such as electronic mail services. Optionally, the application program 300 can display user instructions, status, success, and failure messages to the user. Optionally, the application program 300 provides a user interface through which a user can enter data and/or respond to messages. Optionally, the application programs functional capabilities can be integrated into and can be a part of another application (e.g., a telecommunications client or a contact management client).

The CM Servers 600, 700, and 800 are interconnected either through Data Network 400 (e.g. the public Internet—as depicted by the dotted line connections in FIG. 1) or via a private Local Area Network (LAN) or private Wide Area Network (WAN) 450—as shown by the dashed line connections in FIG. 1.

The CM system 1000 in this example contains centralized databases and/or general-purpose storage area, optionally including, but not limited to, some or all of the following: a customer database 900, a purchase receipt image store, a dictionary or library of image patterns (e.g. merchant receipt logos), a dictionary or library of manufacturers and associated product items and warranty policies, merchant return policies, merchant Stock Keeping Units (SKU) identifiers, a dictionary of keyword search terms matching item and merchant names. The storage subsystem of the CM optionally stores warranty experiences or blogs by end user (e.g., call hold times, warranty process challenges). The storage subsystem of the CM optionally stores a dictionary of product terms or labels.

The Claims Management system includes a database of merchant return policies. This information can be made available to a user upon request. In addition, if an item breaks or malfunctions during the merchant return window, the CM system optionally may recommend the user return the item directly to the store. The CM compares merchant return policies with those printed on the merchant's receipt. If there is a discrepancy, the CM can optionally notify CM personnel to investigate and resolve the discrepancy (e.g., updating the CM database with a change to the merchant's policy).

The user interfaces for access to the stored/archived information are optionally device specific. By way of example, the user interface for a computer may be provided via a widget/gadget, a more traditional web portal, and/or an executable client. For a mobile handset, the interaction is optionally tailored to the available display space and interaction mechanism, where the functionality is similar although optionally reduced in scope. For example, for a smart phone handset, certain logos, menus, images, and the like can be reduced in relative size or eliminated.

The CM system in this example contains a phone server subsystem 600 with call processing capabilities. These servers optionally provide interactive voice response, voice messaging, voice recognition, text-to-speech services and voice message transcription to natural-language text.

The Claims Management system 1000 optionally includes a Customer Relationship Management (CRM) subsystem. The CRM engine can mine certain information with respect to a user's usage of the CM system. For example, the CM system can promote certain products and/or services based on products purchased and/or the length of time the product has been owned by a user. If an item is nearing the end of warranty an extended warranty and/or service/repair shop may be promoted. In addition, the CRM subsystem can provide other helpful hints on how best to use the system and/or notification of service recalls or administrative updates (e.g., notify a user that their password has not been changed in 6 months).

In this example, the CM servers 600, 700, and 800 are optionally centralized at a given location, or distributed to a number of locations. The CM system 1000 can be a standalone system (e.g., a CM system used by a number of service providers) or the CM system can be integrated into a service provider's internal systems (e.g., those systems employed to provide users online information services). Optionally, the Claims Management system is provided by a telecommunication carrier (e.g., Verizon) to service providers (e.g., Google or Intuit). Optionally, there are no charges to use the CM service. Optionally, the voice and/or data transactions between a user's mobile device and one or more CM servers are not charged to the user but to the service provider or telecommunication carrier. Optionally, the CM system 1000 is connected to a data communication network 400 and a wireless network 500. The CM system interconnects with the wireless network 500 using telecommunication interfaces (e.g., SS7) and via data communication networks using a secure router subsystem and an SMS server subsystem which optionally serves as a mail relay to transmit and receive SMS and MMS messages via a Short Message Service Center (e.g., an SMSC operated by a network carrier). These subsystems of the CM system are optionally interconnected via a Local Area Network (LAN), a Private Wide Area Private Network (WAN), and/or a Public Wide Area Network (e.g., Internet).

Optionally, the CM system includes a presence management subsystem. Presence managers optionally authenticate and track an application's online presence and interact with a given application (e.g., an application program 300 hosted on a user's mobile phone 210 or data terminal 100) as information (e.g., passwords, scanned receipts) is synchronized with the centralized databases to provide the user secure, reliable, and timely data transmissions and synchronized user interactions.

Optionally the CM system includes a purchase receipt identification subsystem. The subsystem includes various programs and/or devices including some or all of the following and/or additional and/or different programs and/or devices: a control program which submits images/files to an internal or independent device (e.g., a dedicated device including hardware and/or software) specialized for identifying if there are multiple receipts within an image using a combination of image filtering, pattern recognition, color change detection, receipt outline detection, repetitious text, text alignment, conventional receipt dimensions, etc. and receives back one or more files each consisting of one receipt together with a set of values representing probability or confidence values relating to the item recognition and other features. Optionally, the receipt recognizer can make the output available to a human operator if the confidence values fall below a threshold value. Optionally, the receipt recognizer uses a different recognizer engine and/or item database/dictionary based on user or merchant specific characteristics including but not limited to: the geographic region of the user (e.g., determined from the user's mobile phone identifier); standardized merchant receipts; standardized credit card receipts; etc.

Figure 2:
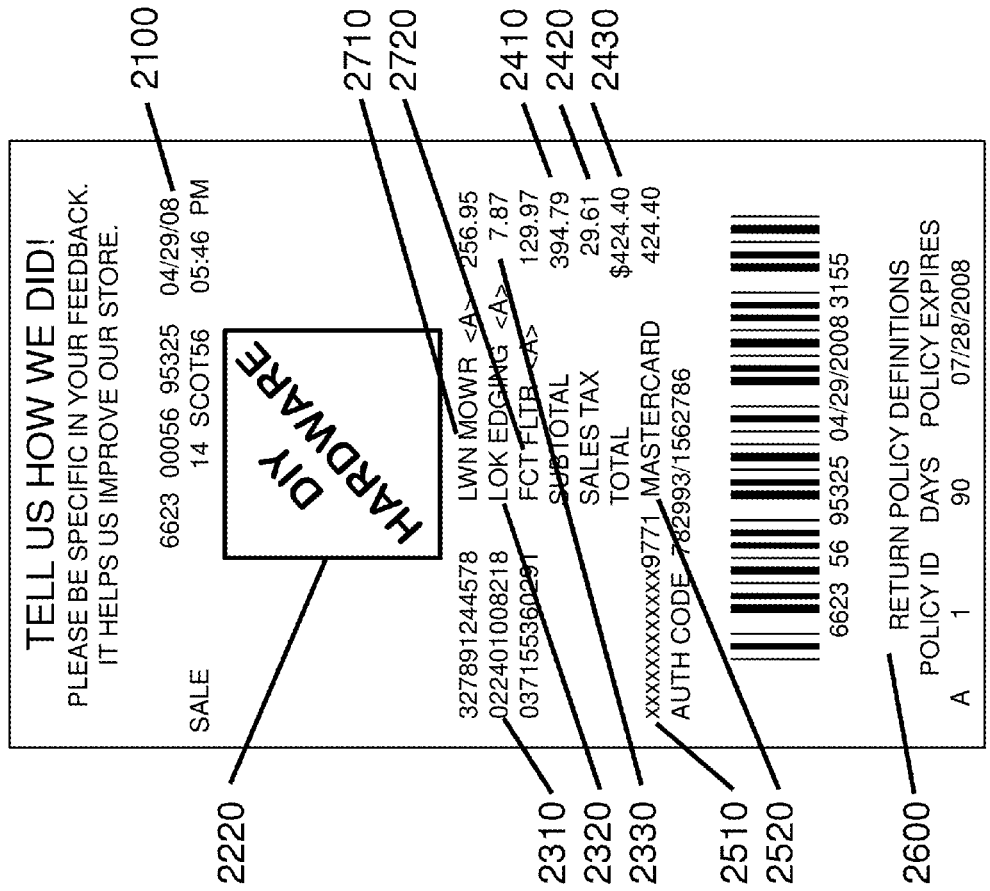
FIG. 2 illustrates an example purchase receipt.

The CM system 1000 contains an image processing subsystem 700 for merchant receipt parsing and element recognition within a receipt. The subsystem 700 performs word and pattern recognition by comparing items in an image (or scanned receipt) against a database of merchant receipt store names and logos, and/or other techniques and/or algorithms (e.g., using simple Bayesian classifiers or more powerful neural networks). FIG. 2 illustrates an example receipt where a unique merchant icon, "DIY Hardware" 2220 is present on the receipt. The subsystem 700 includes various programs and/or devices including some or all of the following and/or additional and/or different programs and/or devices: a control program which submits images/files to an internal or independent device (e.g., a dedicated device including hardware and/or software) specialized for word and pattern recognition, and receives back a text file that includes the identity of the merchant together with a set of values relating to the merchant recognition and other features. Optionally, the merchant receipt recognizer uses a different recognizer engine and/or merchant receipt database/dictionary based on user specific characteristics including but not limited to: the geographic region of the user; language; demographics, psychographics, etc. Optionally, the merchant receipt recognizer can be personalized or tuned based on direct feedback from a user (e.g., user changing the name of the merchant) or indirect feedback (e.g., user item search requests). Initially, the merchant recognizer is populated with a wide collection of known receipts and/or merchant logos.

The CM system 1000 optionally assists the user (or service provider personnel) by identifying problematic merchant receipt images which are likely to yield OCR results of low certainty or confidence. Low certainty can result from many sources including poor receipt quality, an improper scan, a crumpled receipt, unknown merchant, etc. Optionally, a low certainty merchant recognition or unknown recognition may cause the output to be routed to humans for review and/or manual merchant recognition. New merchants can be automatically or manually added to the merchant recognizer library.

The CM image processing subsystem 700 enhances the legibility of poor quality receipt images. For example, some receipts are difficult to read because the original ink has faded or the original receipt printer was malfunctioning. The CM system processes the scanned in receipt image and enhances the definition of the printed elements of the receipt (e.g., darkens print by enhancing the background contrast).

The CM web server 800 controls user access to recorded database objects including purchase receipts. Users can sort and search information by merchant, by item type, by date, and by item price. For example, a user can search for all receipts from a given retail merchant. In addition, the system creates a knowledge base of merchant descriptors as users of the system enter search terms. So if the user is searching for "The Home Depot®" receipts, the user can enter in different variations (e.g., Home Depo, Home Deep, Depo, etc.).

The kind of objects that can be stored by a CM service provider is optionally not limited to a particular set of objects. Therefore, the list below includes nonlimiting example illustrative objects that people can relate to and make use of if they are readily accessible but is not meant to be a complete list:

Purchase Receipt—information regarding a purchase transaction available on a purchase receipt, such as, by way of example, some or all of the following (see FIG. 2): time and date of purchase 2100, retail merchant (e.g., derived from merchant logo 2220), merchant item SKU 2310, merchant item description 2320, merchant item purchase price 2330, purchase subtotal 2410, sales tax 2420, total purchase price 2430, payment method 2520, card number and/or last four digits of card number 2510, and merchant return policy 2600. Additionally, each purchased item that the CM system 1000 is tracking and managing will have a database record for the item manufacturer, the item model number (where available), and the generic name of the item. Additionally, each managed item will also include, for example, warranty start and stop dates for the merchant return period, the manufacturer's warranty period, and the extended warranty period (where applicable). Price protection start and stop dates will also be recorded and tracked (where applicable). Product loss coverage (Purchase Security) start and stop dates will also be recorded and tracked (where applicable).

Credit Card Receipt—information regarding the payment method and the type of card (e.g., Visa, MasterCard, American Express, Discover)

Item Manufacturer—manufacturer of a purchased item.

Item Serial Number—a unique number assigned for identification purposes.

Item Universal Product Code—a specific type of barcode that is widely used by merchants for tracking store items.

Some or all of the information described above is obtained directly from a user (or their scanned purchase receipt or credit card receipt for example). Some of the information is derived from common global CM system libraries. This optionally includes item manufacturer, warranty information (including extended warranty), return processing information, common item names, item type, item category, item class, etc.

The captured/stored data is organized and is made readily accessible to join various pieces of information of interest (e.g., retail merchant return policy, warranty period, extended warranty). Some or all of the following techniques are optionally used to help organize the data and make it more accessible to the user:

Optical Character Recognition (OCR)—OCR (software that translates text images into computer readable text) may be applied to purchase receipt images to facilitate search and item selection and to make these receipts more usable and optionally editable (e.g., attach a customized name to a purchased item).

Optical Icon/Logo Recognition—pattern matching optionally is applied to purchase receipt images to determine retail merchant to facilitate search and display.

Text-to-Speech—optionally purchase receipt text is converted to speech (e.g., for item selection and/or confirmation by the user).

The Claims Management system includes a database and/or an interface to a database managed by a merchant that allows the CM system to determine the make and model of a given item. For example, the Stock Keeping Unit or SKU 2310 is conventionally printed on the receipt next to the brief description of the purchased item 2320 as can be seen in FIG. 2. The SKU allows the merchant to uniquely identify an item and is conventionally used by the merchant for managing inventory. The CM server 800 translates the purchased item SKU 2310 into the item manufacturer and model information. The CM system 1000 then queries one or more internal or external databases to determine the manufacturer's warranty terms (e.g., the CM service provider optionally manually populates the relevant terms and conditions of thousands of suppliers and hundreds of items from each supplier).

The Claims Management system can also analyze the OCR output to determine if an extended warranty or service contract was purchased. Conventionally, extended warranties are treated as a separate billable line item on the purchase receipt with a separate SKU, description and price. As described above, the CM system 1000 can query one or more databases to determine the terms and conditions of the extended warranty. Optionally, instead of or in addition to, the user is requested to enter (e.g., via a website) any associated extended warranty, price protection, and/or product loss (purchase security) terms and conditions.

The Claims Management system includes a subsystem used for determining whether a credit card includes a protection policy (e.g., extended warranty, price protection, purchase security, etc) and the terms and conditions of that policy. A credit card company optionally provides all their card holders with additional protection policies (e.g., extended warranty). Optionally, protection policies are only available on premium cards or those cards with annual fees. Optionally, a data network interface between the CM and the major providers of credit cards is used to query their database with the user's credit card information to determine if they have protection policies. Optionally, the CM provides the user instructions on how to determine if their credit card(s) includes protection services. The terms and conditions are then manually entered by the user into the CM system.

The Claims Manager includes a notification subsystem. This subsystem enables the Claims Management system to display alerts/notification messages (e.g., in a Widget application on a data terminal 100 or mobile device 210), transmit notification/alert messages to a user's mobile device 210, transmit notification/alert messages to a user's email address, transmit notifications/alert messages to an instant message application, etc. For example, the Claims Management system may transmit an alert of warranty expiration over a wireless data connection via a Short Message Service (SMS) or Multi-Media Messaging Service (MMS). SMS and MMS are wireless messaging services that enable the transmission of messages between mobile subscribers (and their phones) and external systems such as electronic mail services. In another example, the phone server 600 may place an outbound call and play an audio message alerting the user to important claims period events (e.g., warranty expiration, price protection sale, etc.).

The CM system also contains a sophisticated subsystem for indexing items identified by the user to be tracked. Conventionally, the item name identified on the receipt is too cryptic or a name not easily remembered. For example, the purchased item in FIG. 2 is a faucet filter listed on the receipt as "FCT FLTR" 2720. It would be difficult for the user to recall this abbreviation so the selected item is indexed to a collection of general search terms (e.g. filter, faucet, fct repair, bathroom fixtures, sink). The CM system 1000 also allows the user to specify a custom name for the item, one which they can easily remember (as is discussed later in FIG. 8). The CM system continually updates and expands the database of terms by using user customized terms, user search entry keywords, analysis of store receipts, etc.

The CM system 1000 is optionally electronically interfaced to data processing systems owned and operated on behalf of selected Merchants 1100, Manufacturers 1200, and Credit Card Companies 1300 (see FIG. 1). This provides improved quality and reduced cycle times for most claims processing.

FIG. 2 illustrates an example purchase receipt. The example receipt includes a retail merchant logo 2220 and a listing of purchased items including the name (e.g., 2710, 2320, and 2720), SKU number 2310 for each purchased item, and the price of each item (e.g., 2330). Purchase receipts conventionally also include the purchase date 2100, method of payment 2520, and if a credit card purchase the last 4 digits of the credit card number 2510. Some purchase receipts also contain a store return policy 2600.

Figure 3:
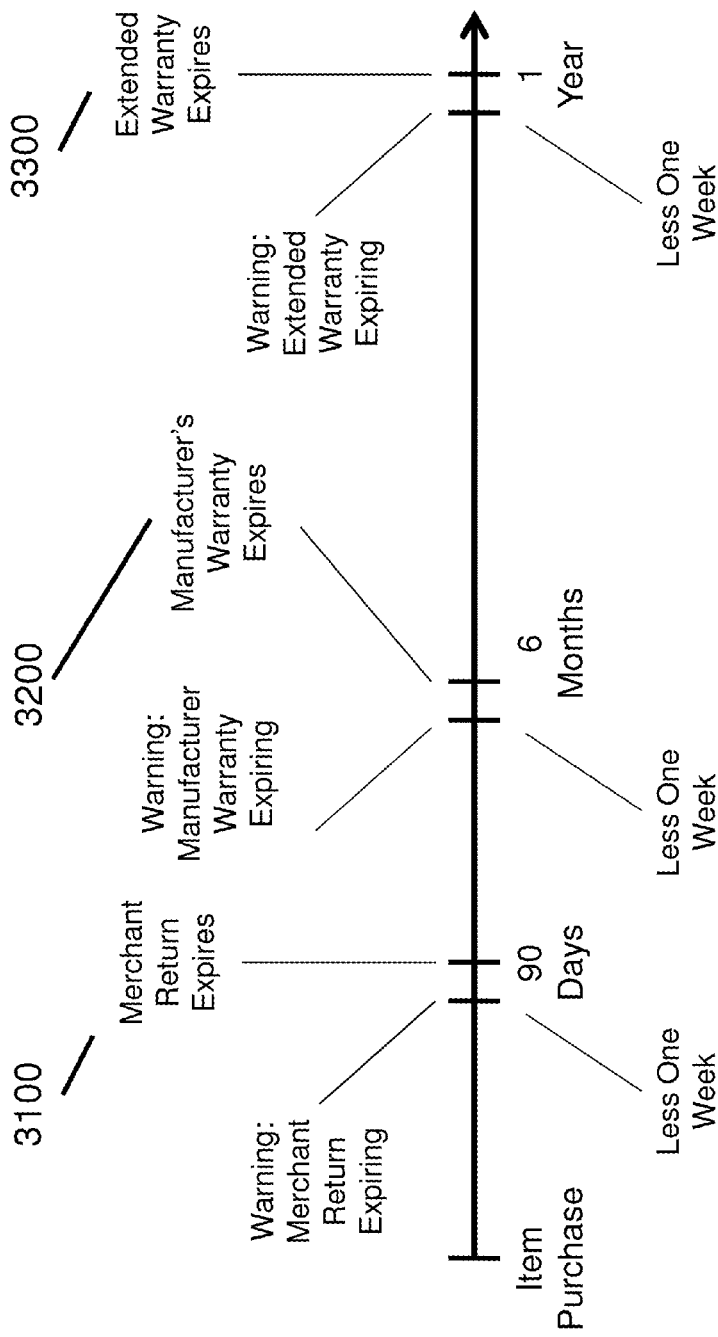
FIG. 3 illustrates an example merchant return and warranty time line for a purchased item.

FIG. 3 illustrates an example typical time line for a product purchased from a merchant (e.g., a water faucet filter purchased from a Hardware store). Merchant return and basic and extended warranty event dates are highlighted in the figure. In this example, the filter has a 90 day merchant return policy 3100, a 6 month manufacturer's warranty 3200, and an additional 6 month extended warranty 3300 because the item was purchased using a credit card which offers purchase security extended warranty service. Additionally, other purchased product claims management time lines, events, and information services can be provided by the CM system for claim periods outside of a policy's active protection window. For example, a user may be able to purchase an additional extended warranty after the original product warranties have expired or the CM system might provide recommendations regarding repair or repurchase if an item malfunctions in an out-of-warranty period.

Figure 4:
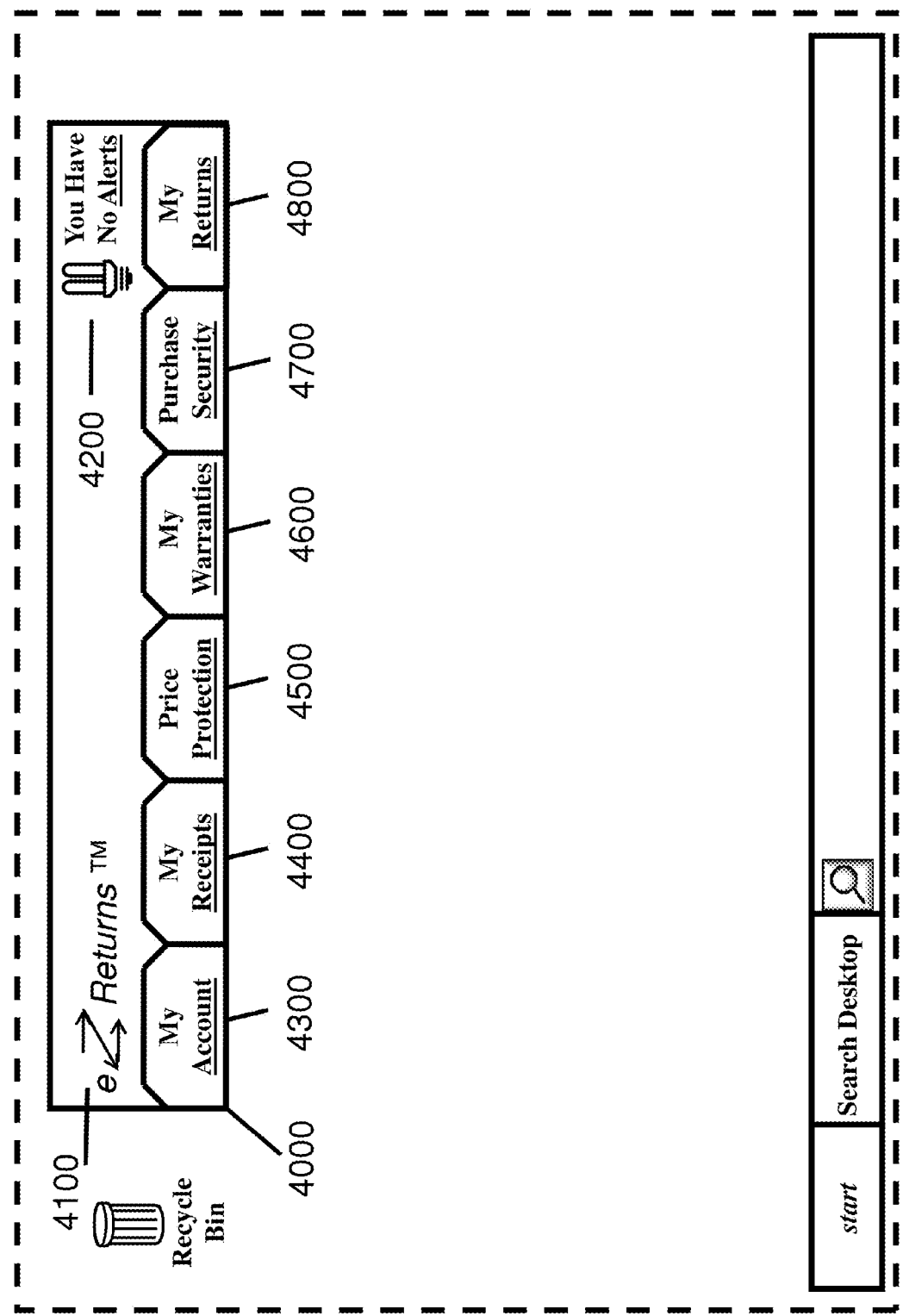
FIG. 4 illustrates a first example Widget-based alert notifier and Web-access navigational user interface.

In an example embodiment, a widget application 4000 (see, for example FIG. 4) connects to and communicates with a CM system via the Internet, an Intranet, or other network. The widget application, executing on a user's computer terminal or other host, can be used to, for example, login and authenticate into a CM web site, navigate directly to different sections of a CM web site, receive image files (e.g., of a scanned receipt), alert the user of important events, display selected information, and edit product purchase and warranty records. In this example embodiment, the Widget 4000 can be in one of two modes, receipt processing and normal display. In normal operational display mode 4000, the widget displays the name/branding of the CM service provider 4100. Optionally, if the user double clicks on the branding control 4100, the user's browser is activated (if not already active), the user is auto-logged into their CM service provider account, and the CM service provider welcome page (see FIG. 13 for an example) is displayed. The example widget also has an alert display 4200 which notifies the user of important information or events (e.g., pending or recently expired warranties). For example, the alert icon might flash yellow when a warranty period is within a week from its expiration date. When a warranty period is less than forty-eight hours from expiration, the alert icon might flash red. Optionally, a user gesture such as double clicking on the alert icon causes the activation of the user's browser (if not already active), the user to be auto-logged into their CM service provider account, and the CM service provider welcome web page to be displayed (see FIG. 13 for an example). The welcome page displays the content of the alert messages which can be optionally individually deleted. Additionally, an active alert notification (e.g., flashing icon) can be acknowledged (transitioned to a non-flashing alerting state) by a single click (or double click as described above) on the alert icon 4200. Optionally, the widget's active alert can be acknowledged by a user logging into their CM system account and deleting any listed alerts. The widget's alert can also optionally display the number and/or type of alert messages for review by the user. The widget also optionally contains an account information access control. Selecting (e.g., single or double clicking) the account control 4300 activates the user's browser (if not already active), auto-logs the customer into their account and displays their account information (e.g., name, payment information, password, email address for updates and notifications, mobile phone number for notifications and/or security authentication, etc.). The widget 4000 also optionally contains a control 4400 for accessing stored purchase receipts. Selecting the "My Receipts" control 4400 activates the user's browser (if not already active), auto-logs the customer into their account and displays a top-level view of their stored receipts (see FIG. 9 for an example). The widget also optionally contains a control 4500 for accessing those items that the CM system is tracking for refund eligibility (in this example branded "Price Protection"). Selecting the "My Price Protection" control 4500 activates the user's browser (if not already active), auto-logs the customer into their account and displays a top-level view of their items tracked for potential refunds (see FIG. 14 for an example). The widget also optionally contains a control 4600 for accessing those items the CM system is warranty coverage tracking. Selecting the "My Warranties" control 4600 activates the user's browser (if not already active), auto-logs the customer into their account and displays a top-level view of their items tracked for warranty coverage (see FIG. 18 for an example). The widget also optionally contains a control 4700 for accessing those items the CM system is product loss tracking (in this example branded "Purchase Security"). Selecting the "Purchase Security" control 4700 activates the user's browser (if not already active), auto-logs the customer into their account and displays a top-level view of their items currently being tracked for product loss coverage (see FIG. 26 for an example). The widget also optionally contains a control 4800 for accessing those items the CM system is tracking for return or refund processing. Selecting the "My Returns" control 4800 activates the user's browser (if not already active), auto-logs the customer into their account and displays a top-level view of their items in returns or refund processing (see FIG. 30 for an example).

Figure 5:
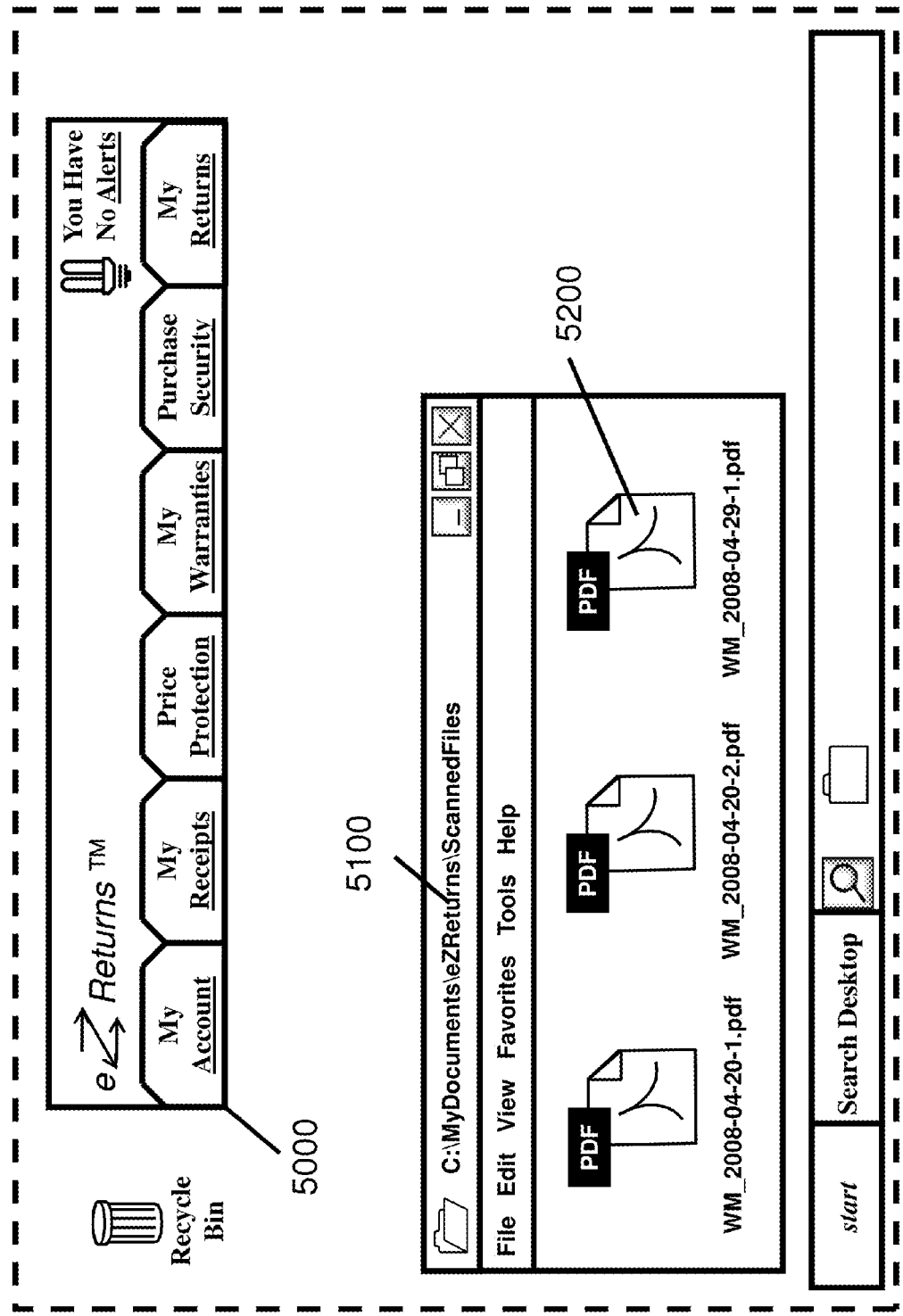
FIG. 5 illustrates another example Widget-based alert notifier and Web-access navigational user interface together with an open file folder.
Figure 6:
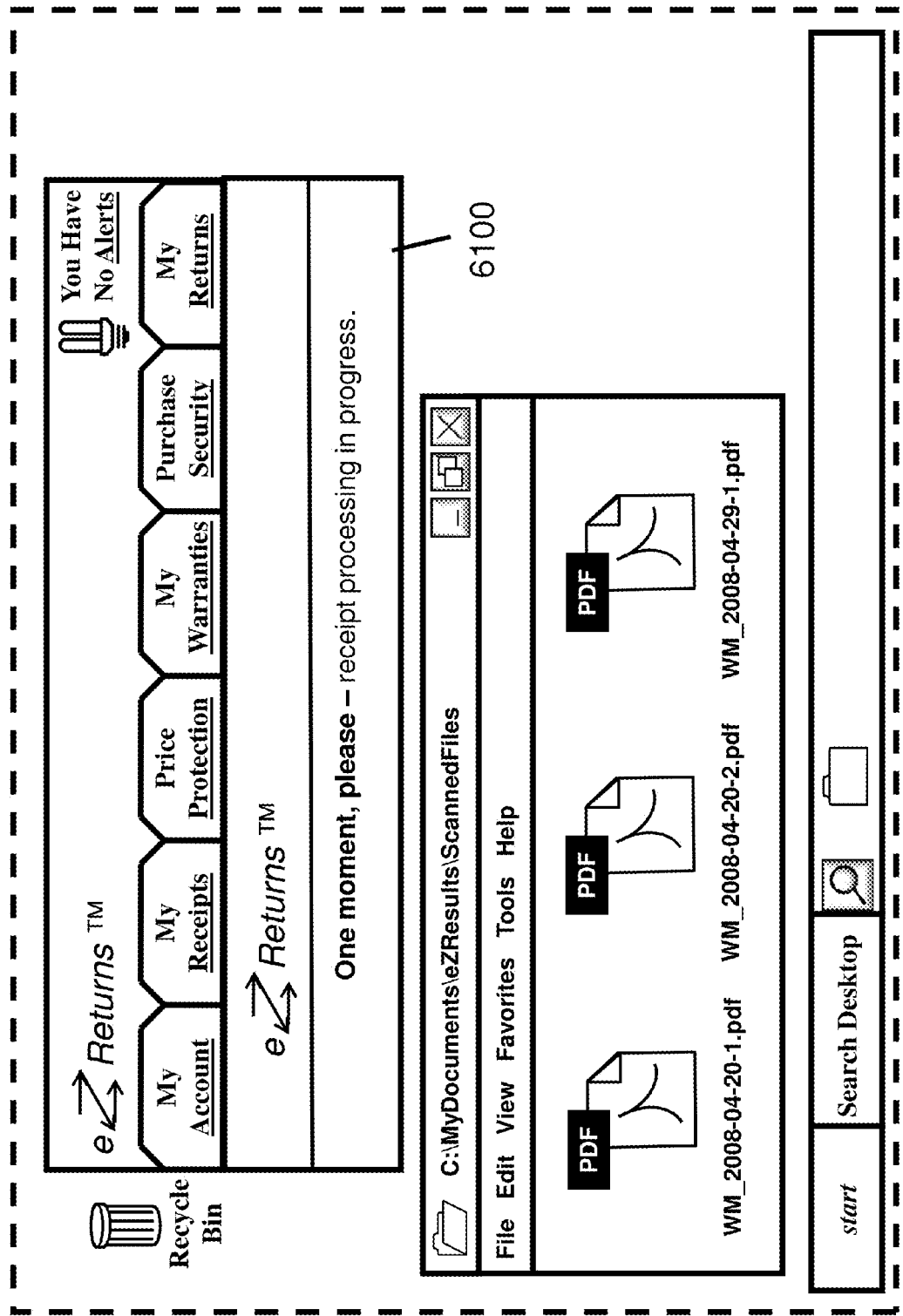
FIG. 6 illustrates another example Widget-based alert notifier and Web navigational user interface processing a scanned receipt.
Figure 7:
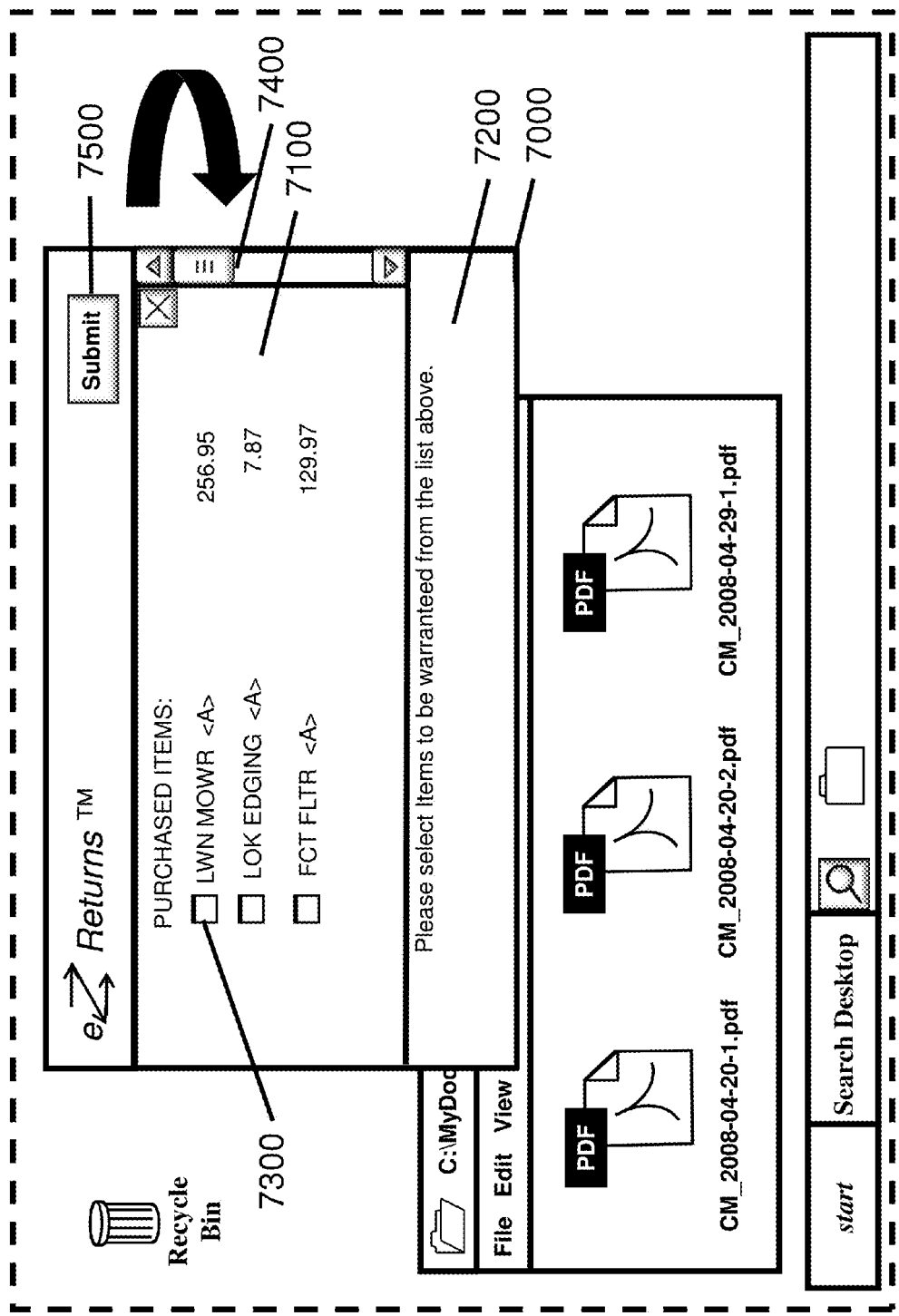
FIG. 7 illustrates another example Widget-based alert notifier and Web navigational user interface displaying purchased items.

In an example embodiment, the second mode of operation of the widget is receipt processing. To transmit a purchase receipt to the CM provider, a user scans their purchase receipts (e.g., using a scanner 230 connected to a data terminal 100). FIG. 5 illustrates an example data terminal desktop display where a user has scanned in a purchase receipt 5200 using a flatbed scanner 230 (which in this example, the scanner software records the scanned image as a pdf file). The resulting scanned image is stored on the user's data terminal 100 (e.g. in the location "C:\MyDocuments\ezReturns\ScannedFiles" 5100 and titled CM_2008-04-29-1.pdf 5200.) The widget 5000 is also running in the display of the data terminal 100. The user has also opened the file folder "ScannedFiles" 5100 on the desktop of the data terminal. The file folder contains three scanned documents. In this example, to transmit the scanned receipt, the user drags the pdf image file 5200 (e.g., image files such as .bmp, .jpeg, .pdf can also be used) onto the widget. The widget 5000 displays a message (e.g., "One moment please, widget processing in progress") in the message display area 6100 as illustrated in FIG. 6. If there are any errors in transmission, the user is alerted with an updated message in the message display area 6100. After receiving the purchase receipt and processing the image (e.g., using OCR capabilities in the DSP server 700), the CM system transmits a rendition of the receipt back to the user for their review and purchase item selection for CM system tracking. The widget visually flips over and changes shape to display the receipt rendition in the display area 7100 of the example widget 7000 as illustrated in FIG. 7.

There are several alternative embodiments of receipt processing/capture. For example, before a purchase receipt is scanned, the user is requested to mark on the receipt those items which the user is requesting the system to organize, track, and store. The receipt can be marked by underlining the item, circling the item, placing a check mark or arrow in the left margin, etc. The CM imaging processing subsystem can optionally detect these marks thereby avoiding the manual selection steps described below.

Optionally, a combination of receipt marking and user confirmation can be used to select individual purchase items. For example, the user can optionally mark items on the receipt which are preselected in the rendition. The user optionally then just confirms the preselections.

Other automatic selection methods can be used. For example, any item on a product purchase receipt greater than a user or service provider threshold causes the item to be organized, stored, and tracked.

Other selection methods can be used. For example, upon receipt of a product purchase receipt, the phone server 600 can place a call to the user's cell phone asking them to speak those items on the receipt that the system is requested to track. The DSP servers 700 can use speech recognition to identify the spoken items in the receipt list (optionally including the price to further help the recognizer distinguish the listed item). If the voice recognizer cannot match the spoken item request, the output can be transmitted to a live operator for analysis or the user can be requested to repeat the item identification. Optionally, the phone server 600 and DSP servers 700 can use text-to-speech and have the user select the item(s) from the list of spoken items.

Figure 8:
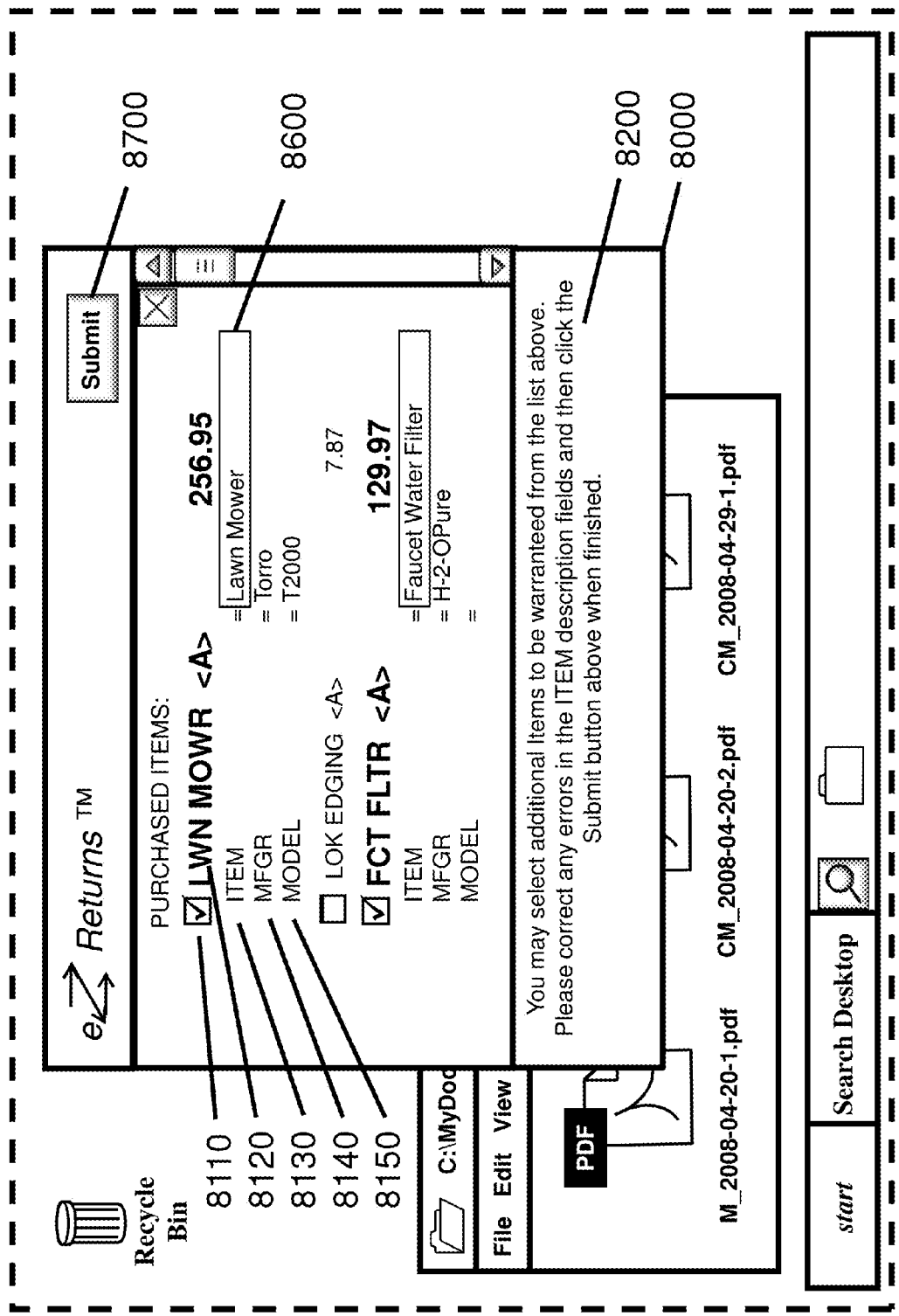
FIG. 8 illustrates another example Widget-based alert notifier and Web navigational user interface displaying selected purchased items for tracking.

The user is optionally instructed in a widget display area 7200 to select those items in the receipt rendition s/he requests the CM system to organize, store, and track. Optionally, items are preselected based on a selection method including but not limited to: an item exceeding a dollar threshold, an item highlighted by the user prior to scanning, a single item on a receipt, etc. The user selects an item from the receipt rendition by clicking in the box 7300 to the left of the purchase receipt line item as shown in FIG. 7. In response to a user selecting a purchased item, additional detail associated with the item is displayed to the user as shown in FIG. 8. Optionally, if there are a number of items within the receipt rendition, a scroll control 7400 is available to the user to scroll through the items. Once a user completes their item selection and any optional edits to the item name (as described below, see FIG. 8), the user submits their request by clicking on the submit control 7500 of the widget. The selected items are transmitted to the CM system and optionally a new message is displayed in the message display 6100 (see FIG. 6, "Your item selection is confirmed"). After the CM system acknowledges receipt of the information transmitted from the widget, the widget flips back to display operational mode 5000 as illustrated in FIG. 5.

FIG. 8 illustrates another example user interface presented via a widget 8000 (or other interface application). The widget displays additional item detail in response to a user selecting an item by clicking on the item selection box 8110 next to the purchased item's description. For example in FIG. 8, the LWN MOWR item 8120 when selected displays a common name 8600 for the item 8130, the item manufacturer 8140, and the item model number 8150. (Optionally, additional or less information can be displayed.) The detailed information is generated by the CM system (e.g., by querying internal or external databases). For example, the item name optionally is assigned by the CM provider personnel (e.g., all purchases from DIY Hardware with a matching SKU and/or receipt description LWN MOWR are assigned the common name Lawn Mower). The common name can also be assigned by a manufacturer or a retail merchant, optionally with an electronic interface with the CM system. Names can be determined from other databases such as Wikipedia, dictionaries, or CM keyword searches. For example, the CM system may determine from internal mining of keyword searches and user customizations that users prefer the common name "Grass Cutter" rather than "Lawn Mower". Optionally, the user can customize the item name 8130 by selecting the name field 8600 and changing or replacing the name. User edits to the item name are optionally transmitted immediately (assuming the data terminal 100 is connected to a data network 400 and CM server 800) or when the user selects the submit control 8700. Optionally the user interface includes instructions in the display field 8200.

Figure 9:
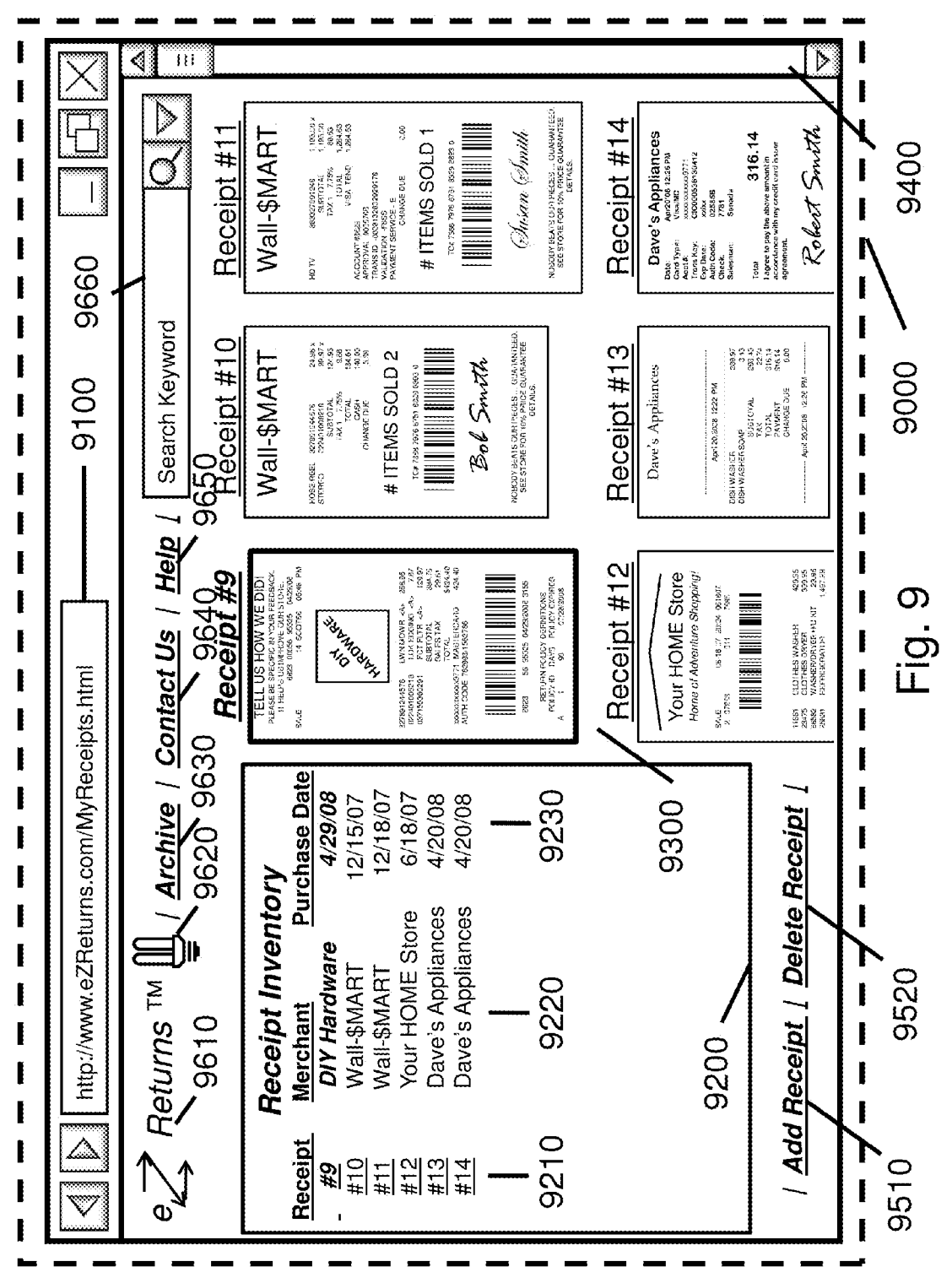

FIG. 9 illustrates an example Claims Management system user interface 9000 presented via a browser (or other interface application) to a user. The browser can be, by way of example executing on a computer terminal 100, such as a PC, a Wireless Application Protocol (WAP) or browser-enabled phone 210, a PDA or the like. The web page can optionally be accessed by selecting a control on a widget/gadget application program 4400 (see FIG. 4), by supplying the appropriate Uniform Resource Locator (URL) to the browser 9100, by selecting a link in response to a search query, or the like (the latter two access methods optionally would require the user first login by submitting a user id and/or password). The example user interface provides a top-level listing of all receipts stored by a user that are in a currently active state. An active state is when a purchased item is covered under a price protection, a warranty or a purchase security program. In addition, the web page user interface optionally allows the user to add new purchase receipts directly from the web (as an example alternative to the widget purchase receipt capture process described above). The example user interface includes an area of common controls replicated on most of the example web-based pages. These common controls include branding 9610 (e.g., eZReturns™), links 9650 and 9640 to other Claims Management system services (e.g., help and contact information), and a search capability 9660 to assist the user in finding receipts, warranty and/or price protection information associated with a user account (search is described in additional detail in FIGS. 34 and 35 below). Optionally the left portion of the web page 9200 presents an inventory of active receipts stored by the CM system for a given user. Optionally the receipt inventory listing 9200 includes a number identifier 9210 assigned by the system (e.g., a simple chronological numbering of receipts beginning from 1), the retail merchant 9220 where the items were purchased, and the purchase date 9230. Optionally the right hand portion of the web site displays thumbnail images 9300 of the active stored receipts. Optionally, the thumbnail listing includes all of the receipt images listed in the left-hand portion of the web user interface display. Double clicking on a thumbnail image optionally activates a new browser with an expanded view of the receipt and conventional browser options (e.g., print). Optionally, if there are more receipt images than can fit in a single web page view, the browser includes a scroll control 9400. Optionally, the web page has a delete receipt control 9520. The user optionally deletes a receipt by selecting a receipt in the inventory listing 9210 or by selecting a thumbnail image 9300 and then clicking on the delete receipt control 9520. Optionally, the user can store/process a new receipt from the web by selecting the add receipt control 9510. The user first scans in their purchase receipts (e.g., using a scanner 230 connected to a data terminal 100) and selects the add receipt control 9510. In response, the system optionally presents a web dialog box (not shown in FIG. 9). The web dialog instructs the user to specify the path name or browse to the scanned in stored receipt. In this example, the specified file is then downloaded across the data network 400, stored in the user account database 900 and displayed as a numbered receipt. Optionally the browser user interface also includes an archive link 9630. Selecting the Archive control displays a listing of all receipts which have been stored within the CM system user account and which are no longer currently active (optionally, the archive control displays all stored receipts which were not explicitly deleted by a user). Optionally, while archived information is being displayed, the name of the Archive control toggles to "Current" to allow the user to return to a listing of only active merchant receipts. The browser user interface also includes an alert or message notification control 9620 which notifies the user of important information or events (e.g., pending or recently expired warranties). For example, the alert icon might flash yellow when a warranty is a week or other time period from expiring or flash red when a warranty is forty-eight hours or other time period from expiration. Optionally, a user gesture such as double clicking on the alert icon causes the activation of a new browser user interface window to the CM service provider welcome page (see FIG. 13 for an example display). The welcome page displays the content of alert messages which can be optionally deleted. Optionally, an active alert notification (e.g., flashing icon) can be acknowledged (transitioned to a non-flashing/alerting state) by a single click (or double click as described above) on the alert icon 9620. Optionally, the alert notification can be acknowledged by a user browsing to the CM system welcome page and deleting any listed alerts.

Figure 10:
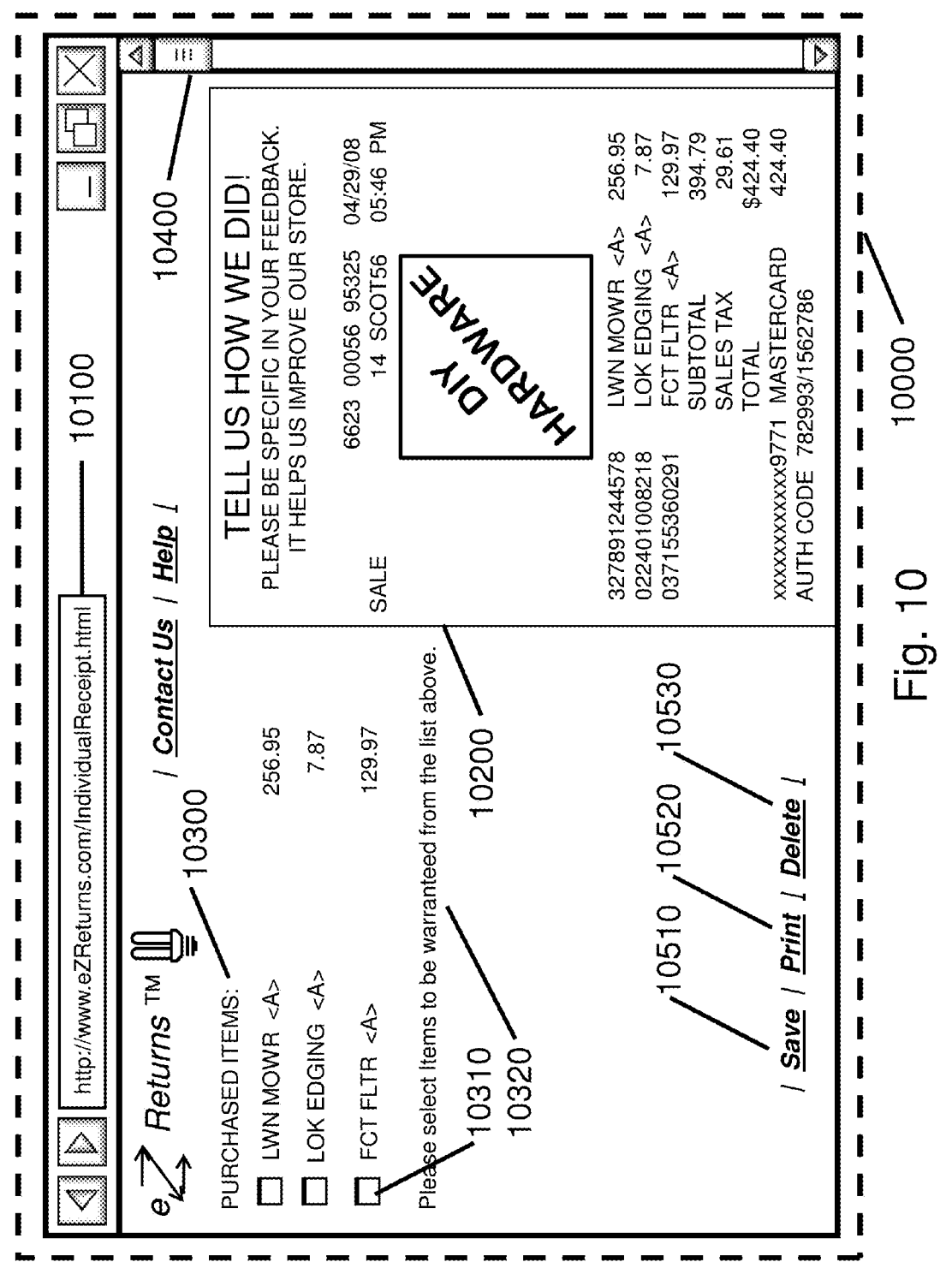
Figure 11:
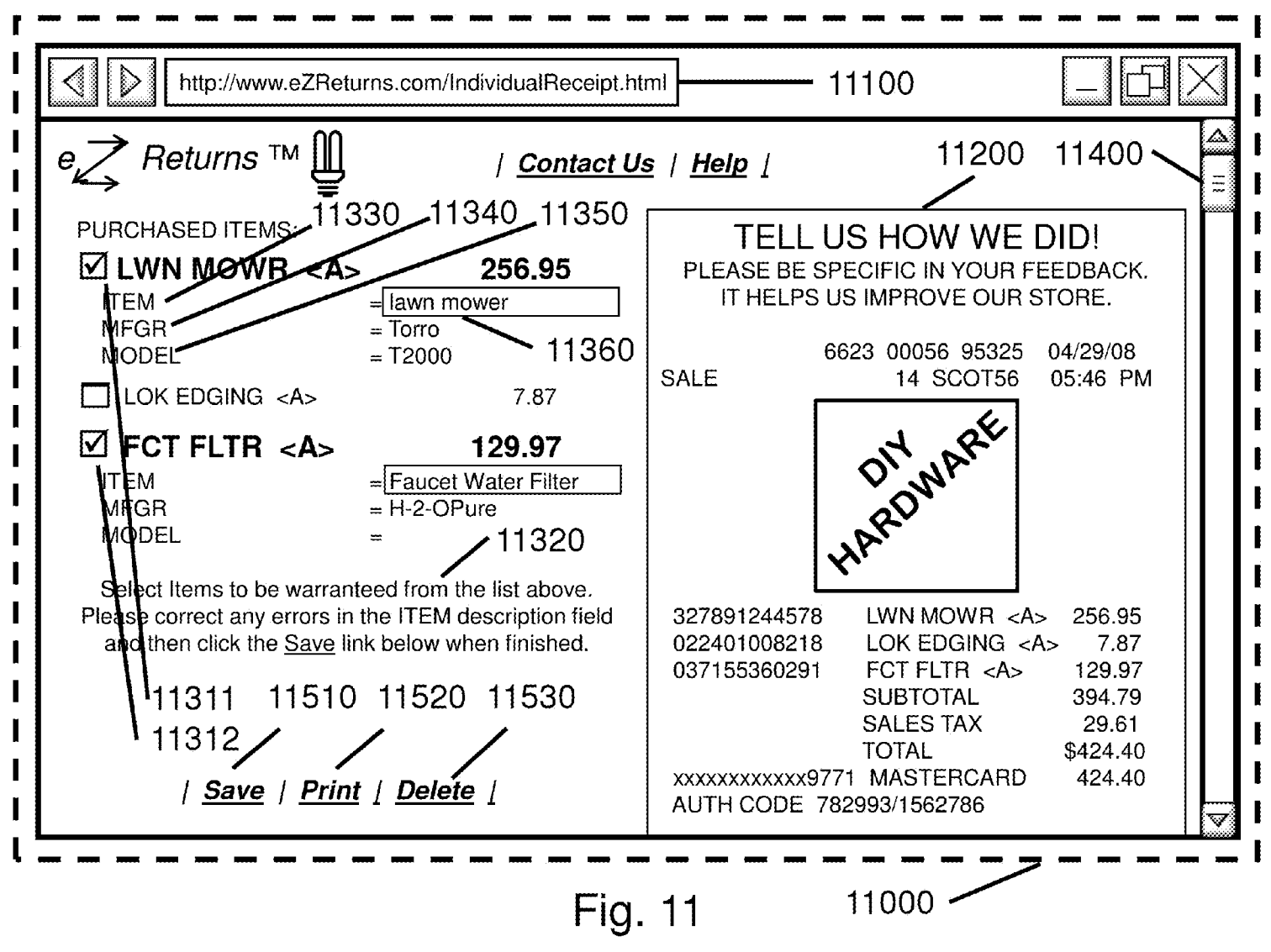

FIG. 10 illustrates an example Claims Management system user interface 10000 presented via a browser (or other interface application) to a user. The web page can optionally be accessed by selecting a control on a widget/gadget application program, by supplying the appropriate Uniform Resource Locator (URL) to the browser 10100, by selecting a link in response to a search query, by selecting an individual receipt from the receipt inventory listing 9200 or by selecting a thumbnail image 9300 in FIG. 9, or the like. The example user interface provides a view of an individual receipt. Optionally, the browser user interface display includes a collection of web-site common controls including branding, an alert/notifier, and contact and help information links. Optionally, if there are more purchased items in the list than can fit in a single web page view, the browser includes a scroll control 10400. The left hand portion of the display 10300 optionally includes a list of the purchased items derived from a text rendering of the receipt and the right hand portion of the display includes an image of the receipt 10200. The user is optionally provided instructions 10320 to select those purchased items the CM system is to organize, store, and track. The user selects an item from the receipt list by clicking in the box 10310 to the left of the purchase receipt item. In response to a user selecting a purchased item, additional detail associated with the item is displayed to the user as shown in FIG. 11. Once a user has completed item selection and review/edits to the item name (as described in FIG. 11), the user submits their request by clicking on the save control 10510. The selected items (and optionally customized names as described in FIG. 11) are transmitted to the CM server 800 over a data network 400 and stored in the account database 900. Optionally, the web page has a delete receipt control 10530 which deletes the current receipt and transitions control back to the top-level receipt view (see FIG. 9). The user can optionally print the current receipt by selecting the print control 10520.

FIG. 11 illustrates an example Claims Management system user interface 11000 presented via a browser (or other interface application) to a user. Optionally, the browser user interface display includes a collection of web-site common controls including branding, an alert/notifier, and help and contact information links. Optionally, if there are more purchased items in the list than can fit in a single web page view, the browser includes a scroll control 11400. In this example display, the user selects two items, LWN MOWR and FCT FILTER, by clicking in the associated item selection boxes 11311 and 11312 respectively next to the item descriptions. Optionally the CM system confirms the selection by placing a check mark within the selected box. Selecting an item causes the CM system to track and monitor the item. In addition to responding with a check mark, the CM system displays additional item detail. For example in FIG. 11, the LWN MOWR item when selected displays a common name for the item 11330, the item manufacturer 11340, and the item model number 11350 (optionally additional or less information can be displayed). The detailed information is generated by the CM system (e.g., by querying internal or external databases). For example, the item name optionally is assigned by the CM provider personnel (e.g., all purchases from DIY Hardware with a matching SKU and/or receipt description LWN MOWR are assigned the common name Lawn Mower). The common name can also be assigned by a manufacturer or a retail merchant, optionally with an interface into the CM system. Names can be determined from other databases such as Wikipedia, dictionaries, or CM keyword searches. For example, the CM system may determine from internal mining of keyword searches and user customizations that user's prefer the common name "Grass Cutter" rather than "Lawn Mower". Optionally, the user can customize the item name by selecting the name field 11360 and changing or replacing the name. User edits to the item name are optionally transmitted immediately (assuming the data terminal 100 is connected to a data network and server 800) or when the user selects the save control 11510. Optionally, the web page has a delete receipt control 11530 which deletes the current receipt and transitions control back to the top-level receipt view (see FIG. 9). The user can optionally print the current receipt by selecting the print control 11520.

Figure 12:
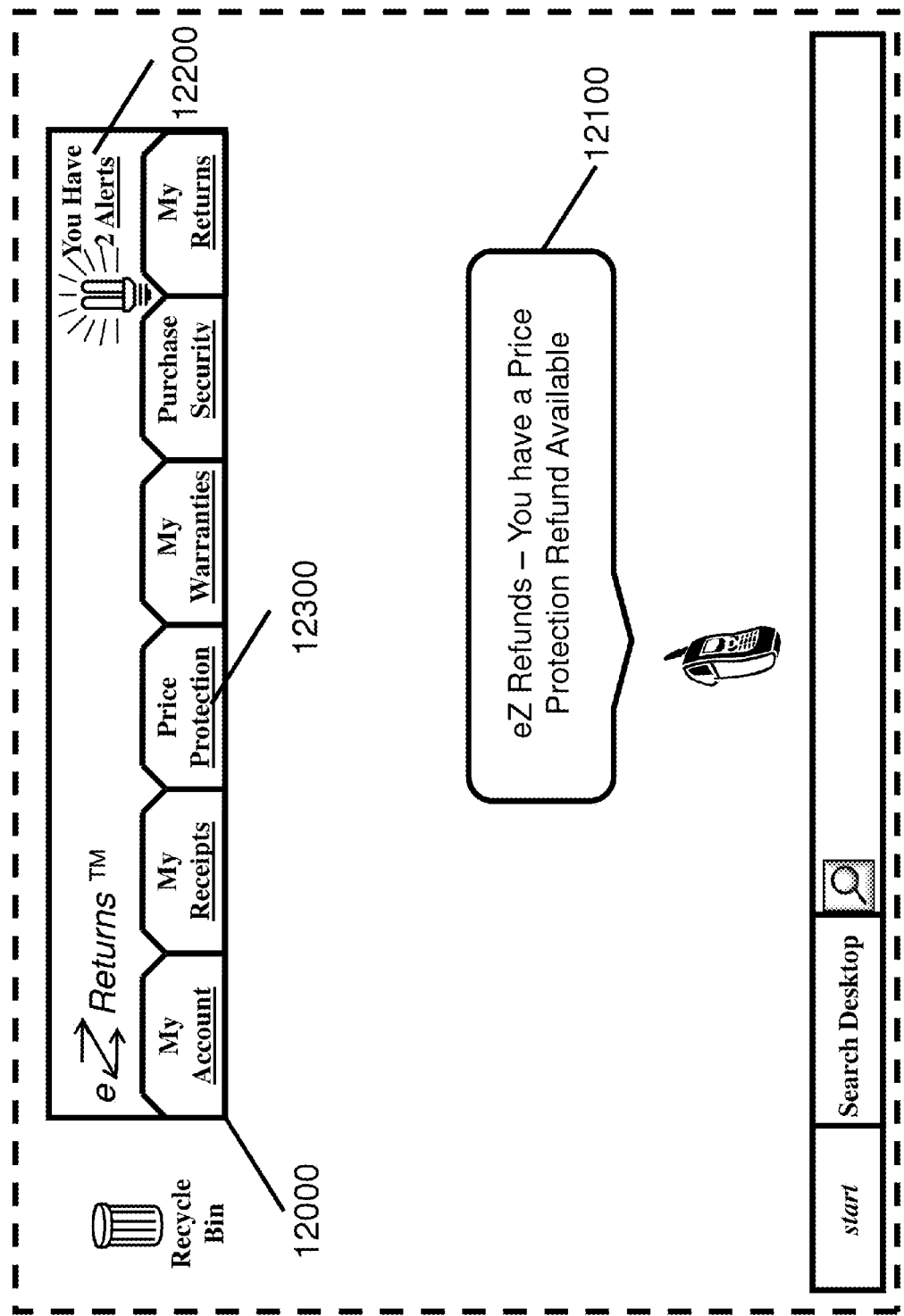
FIG. 12 illustrates an example text message notification alert from the Claims Management system.

FIG. 12 illustrates an example alert from the CM system to a user's mobile device 210. In this example alert notification, the CM system sends the message "eZ Refunds—You have a Price Protection Refund Available" 12100. This message alerts the user to a potential refund available on a recently purchased item. In this example, the Widget user interface display 12000 also notifies the user that one or more alerts 12200 are pending the user's review.

Figure 13:
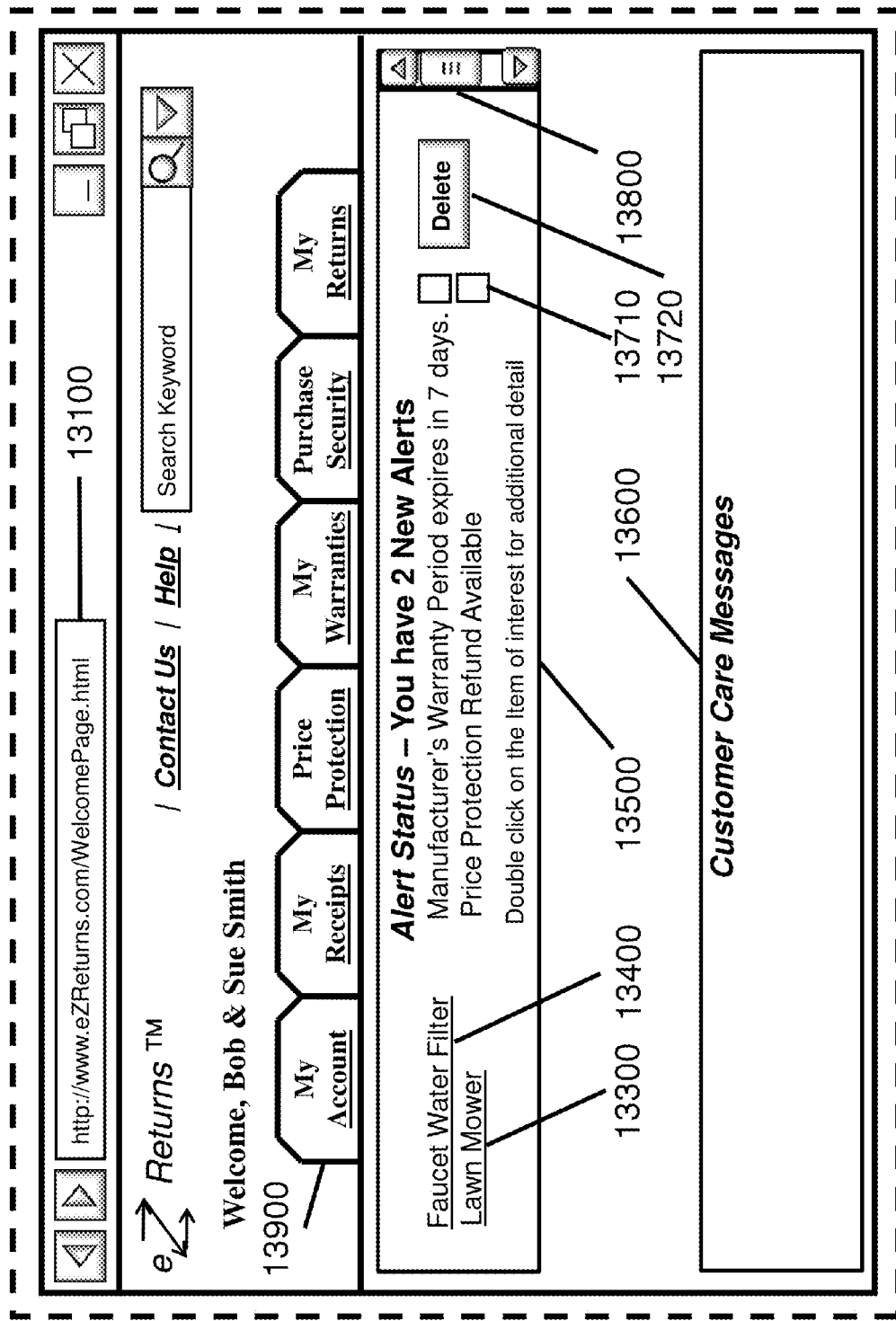
FIG. 13 illustrates another example Web-based user interface home page for a Claims Management system.

FIG. 13 illustrates an example Claims Management system home page user interface 13000 presented via a browser (or other interface application) to a user. Optionally, the browser user interface display includes a collection of web-site common controls including branding, an alert/notifier, contact and help information links, and a search function (search is described fully in the description of FIGS. 34 and 35). The CM home page optionally includes an alert message display 13500. Informational messages related to the tracking of price protection, warranteed items, purchase security, and/or return/refund status are displayed in this area. In this example there are two alerts displayed. The first alert message 13400 informs the user of a pending warranty expiration related to a purchased Faucet Water Filter. The second alert message 13300 informs the user of a pending available refund on a recently purchased lawn mower. Optionally, alert messages include embedded URL links 13300 and 13400. If a URL link is selected by the user, the new web page provides additional information related to the alert. For example, the user can optionally click on the Faucet Water Filter link 13400. Clicking this link 13400 sends the user to the selected item's current warranty status (see example FIG. 19). From this new page 19000, the user can get additional detail on the expiration of the Faucet Water Filter warranty. Optionally, alert messages include a delete control 13720. If the user clicks the item selection box 13710 and then clicks the delete control 13720, the selected alert status line is deleted from the display. Optionally, if there are more alerts in the list than can fit in a single view, the view includes a scroll control 13800. Optionally, the CM welcome page 13000 includes a Customer Relationship Management (CRM) display 13600. The CRM display provides the user with informational messages related to the user's account (e.g., to notify a user that their password has not changed in over 6 months and it should be modified for added account security) and helpful hints on how best to use the system. Optionally the CM welcome page includes navigation controls 13900 for traversing the CM web site. Selecting (e.g., single or double clicking) the My Accounts control 13900 displays a user's account information which optionally can be examined and modified (e.g., user name, payment information, password, email address for updates and notifications, mobile phone number for notifications and/or security authentication, etc.). Selecting the "My Receipts" control 13900 displays a top-level view of the user's stored receipts (see FIG. 9 for an example). Selecting the "My Price Protection" control 13900 displays a top-level view of their items tracked for potential refunds (see FIG. 14 for an example). Selecting the "My Warranties" control 13900 displays a top-level view of their items tracked for warranty coverage (see FIG. 18 for an example). Selecting the "Purchase Security" control 13900 displays a top-level view of their items tracked for product loss coverage (see FIG. 26 for an example). Selecting the "My Returns" control 13900 displays a top-level view of their items in returns or refund processing (see FIG. 30 for an example).

Figure 14:
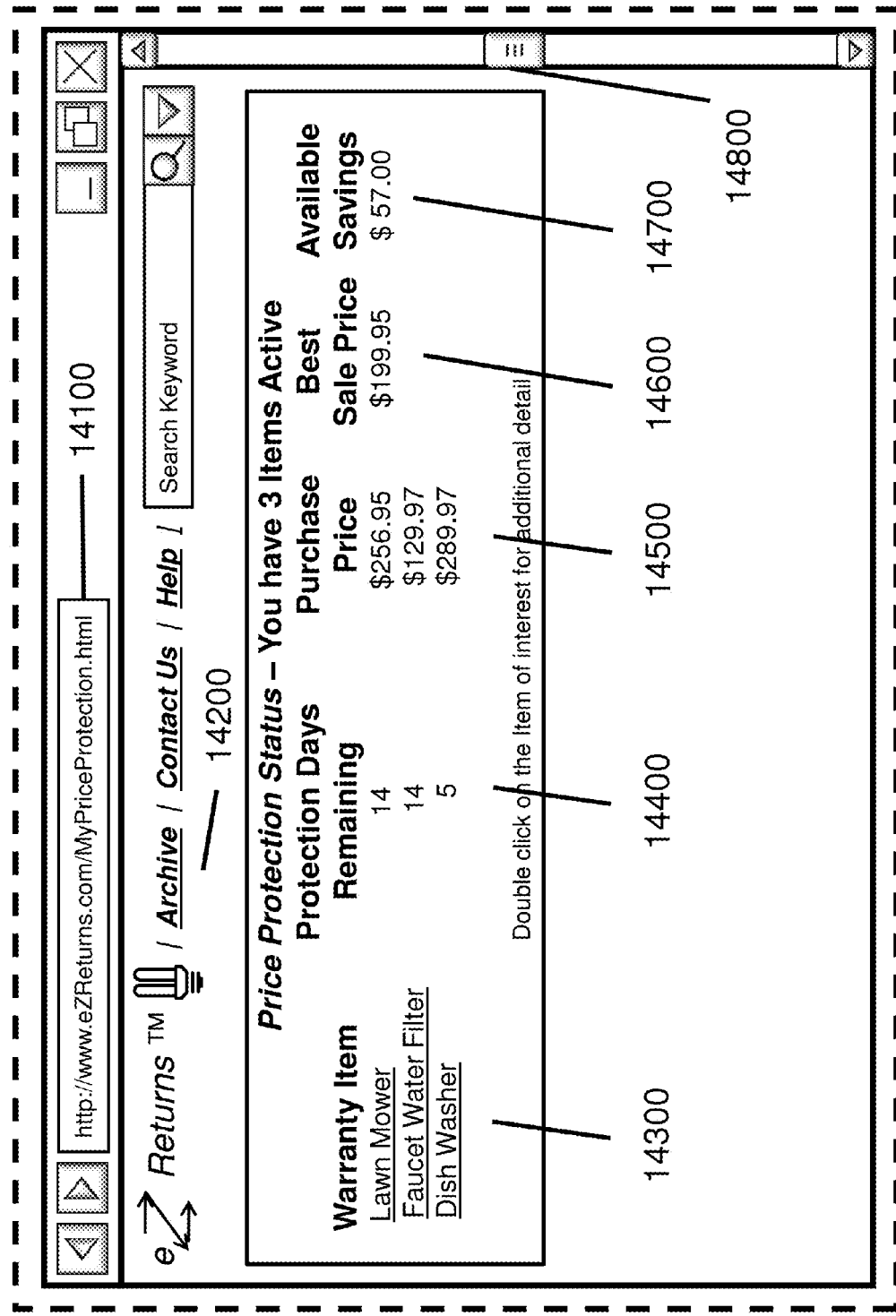
FIG. 14 illustrates another example Web-based user interface displaying a list of items eligible for sale refunds.

FIG. 14 illustrates an example Claims Management system user interface 14000 presented via a browser (or other interface application) to a user. The example user interface provides the top-level view of those items purchased by a user, tracked by the CM system, and eligible for a refund if any item is or goes on sale (or is discounted further than the original purchase price). Optionally, the browser user interface display includes a collection of web-site common controls including branding, an alert/notifier, contact and help information links, and a search function (search is described fully in the description of FIGS. 34 and 35). Optionally, if there are more active price protection items in the list than can fit in a single web page view, the browser includes a scroll control 14800. In this example user interface, three items in the display list 14300 are in an active state (with days remaining prior to price protection expiration). Each of the items in the list 14300 is a linked URL that when selected provides the user with additional detail regarding the price protection status of the selected item (see FIG. 15 for an example web page display). Optionally, for each item listed, the CM system determines and displays the number of days remaining before the price protection coverage of the item expires 14400. The number of days remaining is calculated by subtracting the current date from the date at which the price protection coverage expires. Optionally, for each item, the original purchase price 14500, determined from the purchase receipt, is also displayed. Optionally, for each item, the best sales price 14600 is displayed if it is determined that the item is for sale at the same or a different merchant at a lower price. Optionally, the best sales price is determined by the CM provider personnel searching merchant offers for the identical item at a lower price. Optionally, the CM system provider offers visitors (e.g., visitors to their website) and/or users the option to find a lower price for a listing of items. Incentives optionally are provided to users and visitors to become the first to find a lower price offer (e.g., $100 bounty or 1% of the refund returned to customers who invoke the price protection option, etc). Optionally, the CM system detects an available sale price when a user submits a refund request on a given item. Any user with a similar item who purchased the item at a higher price can optionally be notified/alerted to the refund. Optionally, the CM system only provides sale item notifications and displays a best sale price if the sale meets the terms and conditions of the price protection offering (e.g., there may be geographic restrictions). Optionally, the CM system displays the potential savings available to a user 14700 determined by subtracting the best available sales price from the original purchase price ($57 in the example in FIG. 14). Optionally the browser user interface also includes an archive link 14200. Selecting the Archive control displays a listing of all items which have previously been tracked within the CM system for the logged in user and are currently in an expired price protection period. While viewing the archived information, the name of the Archive control 14200 toggles to "Current" to allow the user to return to a listing of only active price protection items. Optionally, the "Days Remaining" column for archived items displays a negative number corresponding to the number of days since the protection program expired. Alternatively, the "Days Remaining" column could list the date that the protection program expired for the given item.

Figure 15:
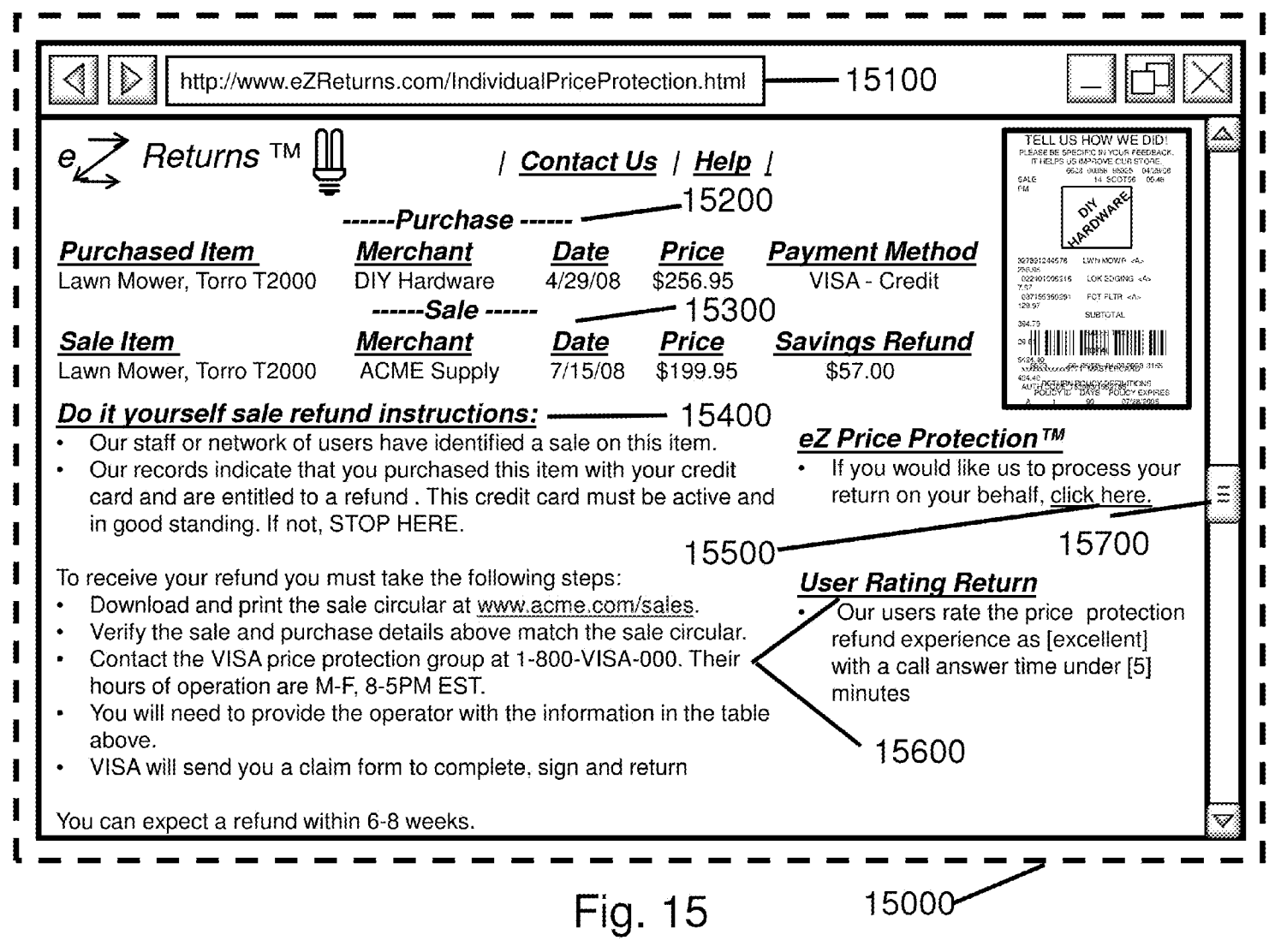

FIG. 15 illustrates an example Claims Management system user interface 15000 presented via a browser (or other interface application) to a user. The web page can optionally be accessed by selecting a control on a widget/gadget application program, by supplying the appropriate Uniform Resource Locator (URL) to the browser 15100, by selecting a link in response to a search query, by selecting a listed item 14300, or the like. The example user interface provides a detailed view of an item purchased by a user, tracked by the CM system, and eligible for a refund. In this example, the CM system has identified a lower price sale of the Torro Lawn Mower from the merchant ACME supply. Optionally, the browser user interface display includes a collection of web-site common controls including branding, an alert/notifier, and contact and help information links. Optionally, if there are more user instructions than can fit in a single web page view, the browser includes a scroll control 15700. In this example user interface display, the original item purchase description 15200 is listed including: the item name, manufacturer, model number, the retail merchant where the item was purchased, date item originally purchased, original purchase price, method of payment, and a thumbnail image of the original purchase receipt. Double clicking on a thumbnail image optionally activates a new browser with an expanded view of the receipt and conventional browser options (e.g., print option). In this example user interface display, the sale item description 15300 is also listed including: the item name, manufacturer, and model number, the retail merchant where the item is on sale, date item went on sale, sale price, and potential savings to the user (e.g., $57 savings). In this example user interface display, the CM system provides the user with explicit instructions on how they can apply for the price protection savings 15400. Optionally, the user can have the CM system provider process the refund request. The user selects this option by clicking on the eZ Price Protection™ link 15500 which displays a separate web page (see FIG. 16). Optionally, the browser user interface display also includes a summarized user rating of the do-it-yourself refund process 15600. Clicking on the user rating link 15600 optionally displays a separate web page with a web form enabling the user to blog/record their refund processing experience and/or to read more detailed user feedback/experiences.

Figure 16:
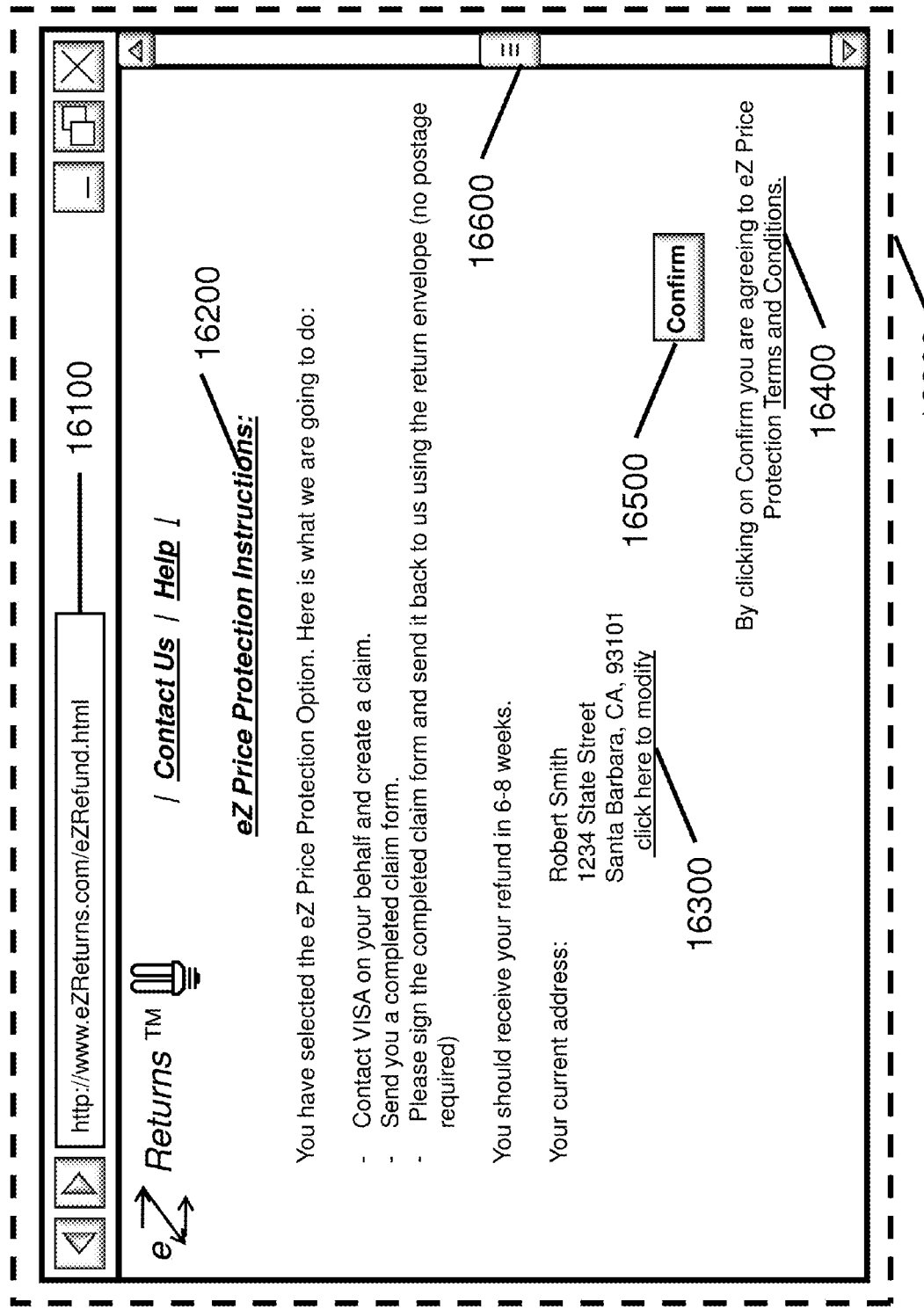
FIG. 16 illustrates another example Web-based user interface displaying user refund instructions when processed by the Claims Management system.

FIG. 16 illustrates an example Claims Management system user interface 16000 presented via a browser (or other interface application) to a user. The web page can optionally be accessed by selecting a control on a widget/gadget application program, by supplying the appropriate Uniform Resource Locator (URL) to the browser 16100, by selecting a link in response to a search query, by selecting the Easy Price Protection™ link 15500, or the like. The example user interface provides a response to a user's request for the CM provider to assist them in processing a price protection refund. The user is provided with instructional steps they must follow along with a confirmation button 16500 to initiate the process. If the user does not confirm, the CM system will not process the refund. Optionally, the browser user interface display includes a collection of web-site common controls including branding, an alert/notifier, and contact and help information links. Optionally, if there are more user instructions than can fit in a single web page view, the browser includes a scroll control 16600. Optionally, the user interface instructions also include the user's current address which is optionally stored in the customer database 900. The user can modify their current address by selecting a link 16300 which causes a new web page to be displayed with the user's current address displayed in editable fields. Optionally, the user interface includes a link 16400 to the CM provider's general terms and conditions or specific terms and conditions for processing a price protection return.

Figure 17:
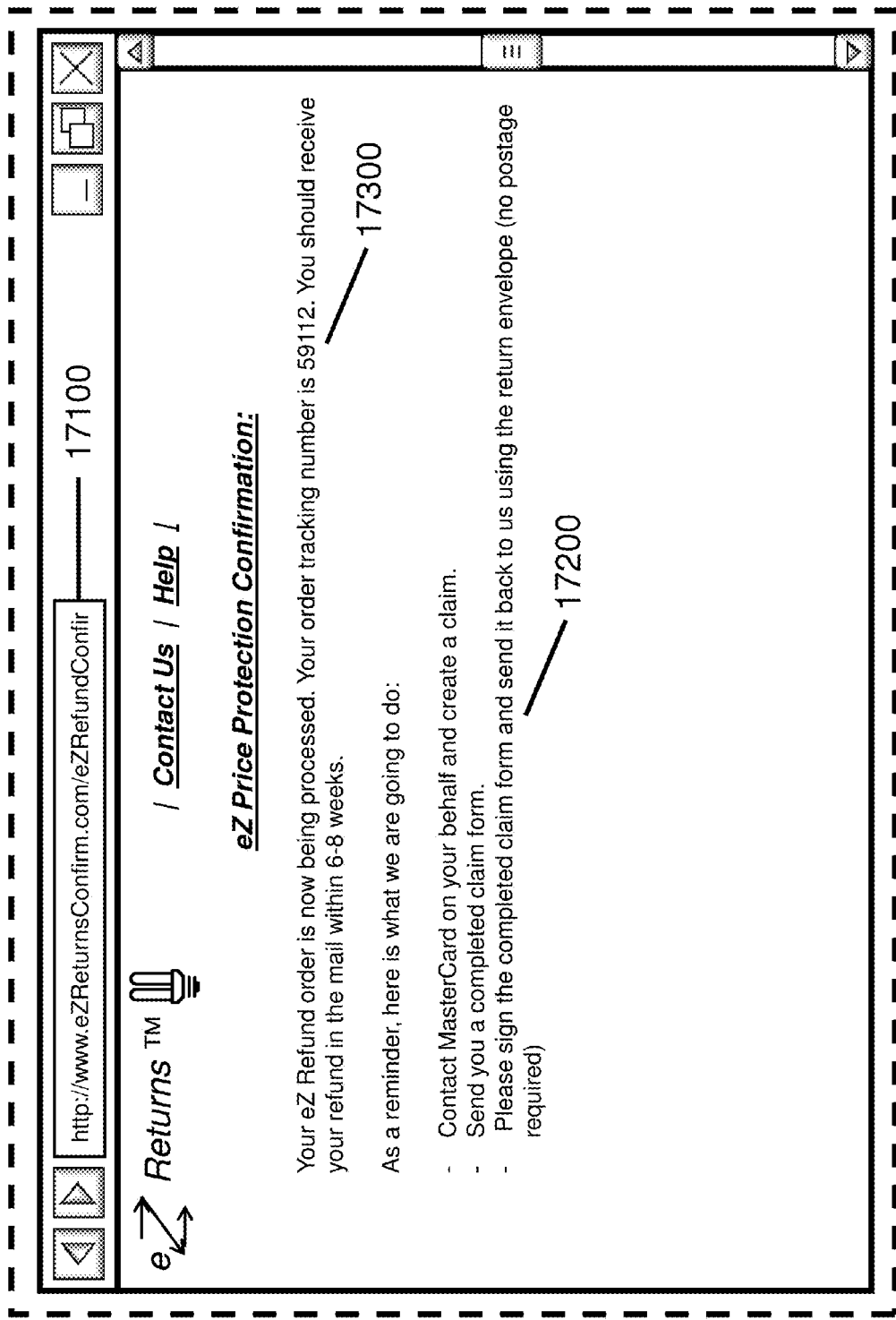
FIG. 17 illustrates another example Web-based user interface displaying an example confirmation page.

FIG. 17 is an example confirmation web page display 17000 in response to a user selecting the confirmation control 16500 in FIG. 16. In this example user interface, a confirmation message 17200 is displayed, including a reiteration of the user instructions 16200 from FIG. 16. Optionally, the CM system generates a price protection refund tracking number 17300 which is included in the confirmation message 17200.

Figure 18:
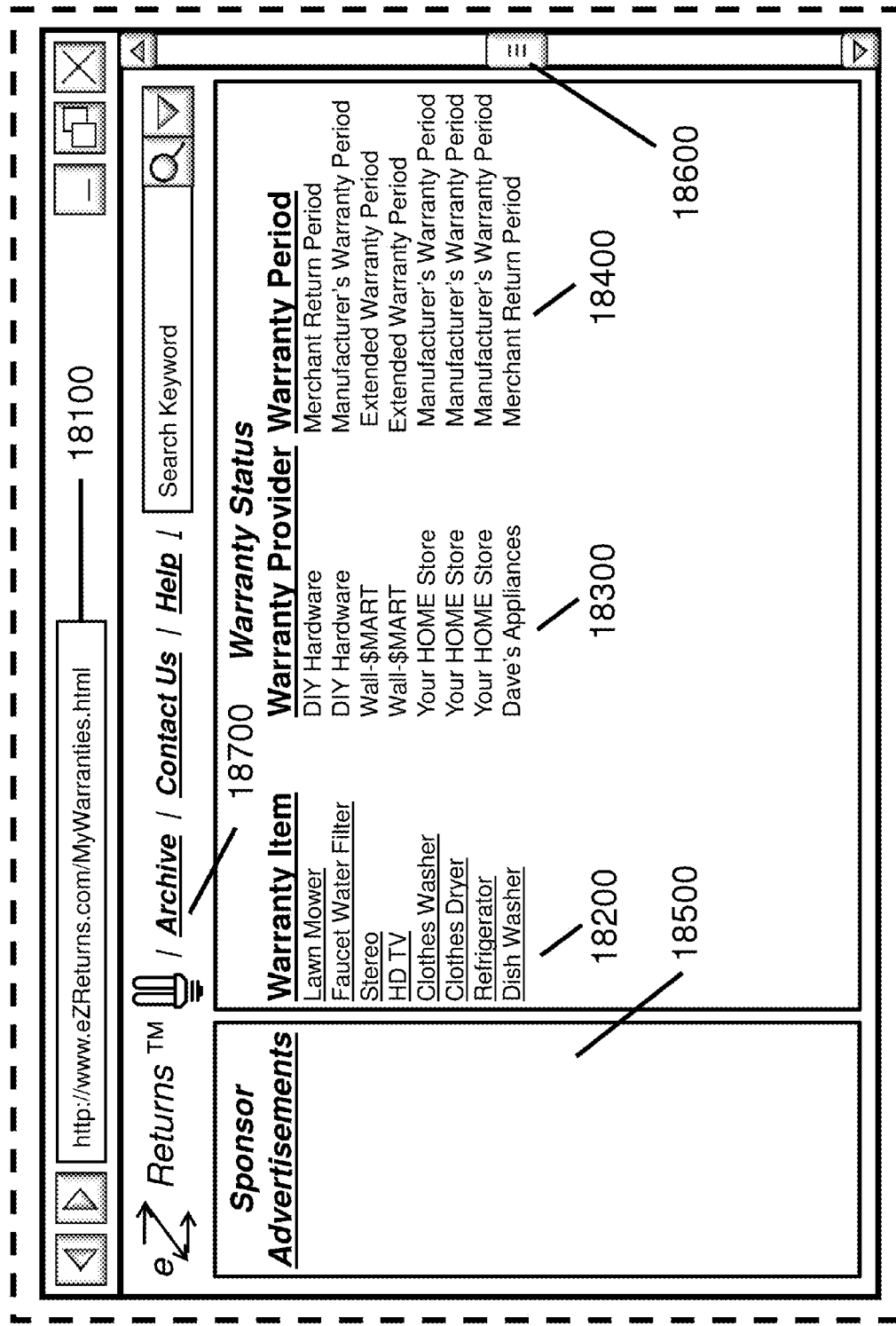
FIG. 18 illustrates another example Web-based user interface displaying items eligible for warranty coverage.

FIG. 18 illustrates an example Claims Management system user interface 18000 presented via a browser (or other interface application) to a user. The web page can optionally be accessed by selecting a control on a widget/gadget application program 4600 (see FIG. 4), by supplying the appropriate Uniform Resource Locator (URL) to the browser 18100, by selecting a link in response to a search query, or the like. The example user interface provides the top-level view of those items purchased by a user, tracked by the CM system, and still active within a warranty period (e.g., store return, manufacturer's warranty, and/or extended warranty periods). Optionally, the browser user interface display includes a collection of web-site common controls including branding, an alert/notifier, contact and help information links, and a search function (search is described fully in the description of FIGS. 34 and 35). Optionally, if there are more purchased items in the list than can fit in a single web page view, the browser includes a scroll control 18600. In this example user interface, eight list items 18200 are in an active warranty period. Each of the listed items 18200 is a linked URL that if selected provides the user with additional detail regarding the warranty status and return procedures of the selected item (see FIG. 19 for an example web page display). Optionally, the browser user interface displays the warranty provider 18300 for each item in the list. Optionally, the browser user interface also displays the warranty state 18400 for each item in the list. Example warranty states include but are not limited to: merchant return period—period in which a malfunction or failure of the item can be returned to the merchant for repair or replacement; manufacturer's return period—period in which a malfunction or failure of the item can be returned to the manufacturer for repair or replacement; extended warranty period—period in which a malfunction or failure of the item can be returned to the extended warranty provider for repair or replacement. The user interface also contains an optional advertisement section 18500 used by the CM service provider to promote goods and services. Optionally, the promotions on this web page have relevance to the items displayed on the page and/or search keywords entered by the user. Lastly, the browser user interface optionally contains an Archive link 18700 to update the web page contents to display a complete listing of all the items inventoried by a user but where the item warranty periods have expired. When the page is updated to display archived items, the Archive control is replaced with a control label "Current" which, when clicked, returns the user to the original mode (see FIG. 18 for an example display listing only those items where the warranty period has not yet expired).

Figure 19:
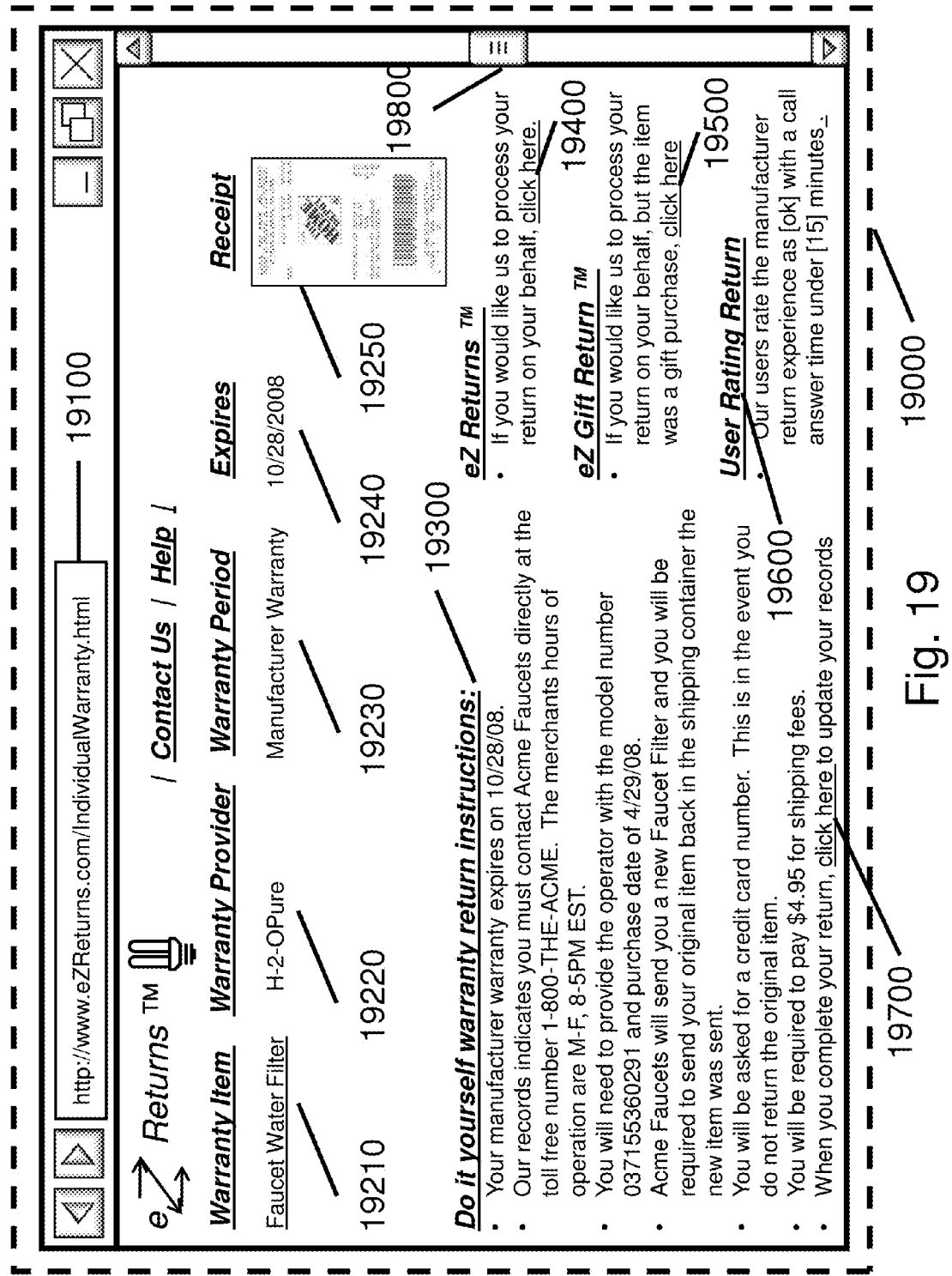
FIG. 19 illustrates another example Web-based user interface displaying refund instructions for a given item.

FIG. 19 illustrates another example user interface 19000 presented via a browser (or other interface application). The web page can optionally be accessed by selecting a control on a widget/gadget application program, by supplying the appropriate Uniform Resource Locator (URL) to the browser 19100, by selecting a link in response to a search query, by selecting an item in the warrantees list 18200, or the like. This user interface enables a user to obtain additional warranty detail on a product purchase including any specific warranty return procedures. Optionally, the browser user interface display includes a collection of web-site common controls including branding, an alert/notifier, and contact and help information links. Optionally, if there are more user instructions than can fit in a single web page view, the browser includes a scroll control 19800. The example user interface includes a description of the purchased item 19210, the provider of warranty coverage 19220, description of the active warranty state or period 19230 (e.g., store return, manufacturer's warranty, or extended warranty), and the expected expiration of the warranty period 19240. Optionally, the display includes a thumbnail of the original purchase receipt 19250 which if selected by a user activates a new browser with an expanded receipt and conventional browser controls (e.g., print control). Optionally, the user interface displays a set of instructions 19300 the user can follow to replace, repair, or be reimbursed if their item has malfunctioned or failed to perform to the manufacturer's specifications. Optionally, these return instructions are generated from a database created by the CM system (e.g., by the provider researching manufacturers and merchants and inputting the warranty procedures into the CM database). Optionally, the return instructions are generated by the CM system electronically accessing over a data network 400 the merchant and/or manufacturer's return/warranty databases. Optionally, the return instructions include relevant information for the user including: phone numbers, hours of operation, make and model number of the purchased item, shipping procedures, expected replacement and/or repair time frames, charges, exclusion, etc. These return instructions apply to merchants, manufacturers, extend warranty providers, etc. Optionally, the return instructions include a user control 19700 which enables a user to update warranty tracking information in the event that an item is returned (see FIG. 22). Optionally, the web-based user interface includes a gift return control 19500. This control enables a user to create a guest account for an individual who has received an item as a gift from the user. The guest account enables the CM system to process a return of a malfunctioning item with limited effort on behalf of the user (see FIG. 23 for additional information on Guest Accounts). Optionally, the user interface includes a user rating 19600. This rating optionally provides the user with a valuable overall assessment of the return process. Optionally, the rating can include attributes such as typical call center hold times. The ratings optionally are generated by users filling out online surveys regarding their return experience and/or the CM providers experience with returns. This information is collected and organized by the CM provider and stored in the CM database 900. Optionally, the user rating 19600 is a URL which links to another web page where individual user experiences are documented and shared with other users (e.g. via blogs). This linked web page also allows a user to share their return user experiences. Optionally, the linked user feedback web page can be moderated by the CM service provider, merchants, manufacturers, and/or third party warranty providers (e.g., credit card extended warranties). Optionally, the user interface includes a control 19400 that allows a user to select an option for the CM system to assist them in processing the warranty return (see FIG. 20).

FIG. 20 illustrates another example user interface 20000 presented via a browser (or other interface application). The web page can optionally be accessed by selecting a control on a widget/gadget application program, by supplying the appropriate Uniform Resource Locator (URL) to the browser, by selecting a link in response to a search query, by selecting a control link on another web page 19400, or the like. The example user interface provides a response to a user's request for the CM provider to process an item return on their behalf. The user is provided with instructional steps they must follow along with a confirmation control 20600. Optionally, if the user does not confirm, the CM system will not process the return. Optionally, the browser user interface display includes a collection of web-site common controls including branding, an alert/notifier, and contact and help information links. Optionally, if there are more user instructions than can fit in a single web page view, the browser includes a scroll control 20700. The browser user interface displays instructions 20200 that the user must follow in order for the return to be processed. Optionally, the user interface instructions include the user's current address which is optionally stored in the customer database 900. Optionally, the user can modify their current address by selecting an update link 20300 which causes a new web page to be displayed with the user's current address displayed in editable fields. Optionally, the user interface display includes a payment method and the last four digits of a user's credit card stored in the CM system database 20400. Optionally, if the user would prefer to use a different payment method or credit card, the user can select a link 20400 which causes a new secure web page to be displayed with credit card entry fields (or other payment options available to the user). Optionally, the user interface includes a link 20500 to the CM provider's general terms and conditions or specific terms and conditions for processing a return. Lastly, this example user display includes a confirmation control 20600 which when selected by the user sends a confirmation request to the CM system over the data network 400 for the server 800 to process the return.

Figure 21:
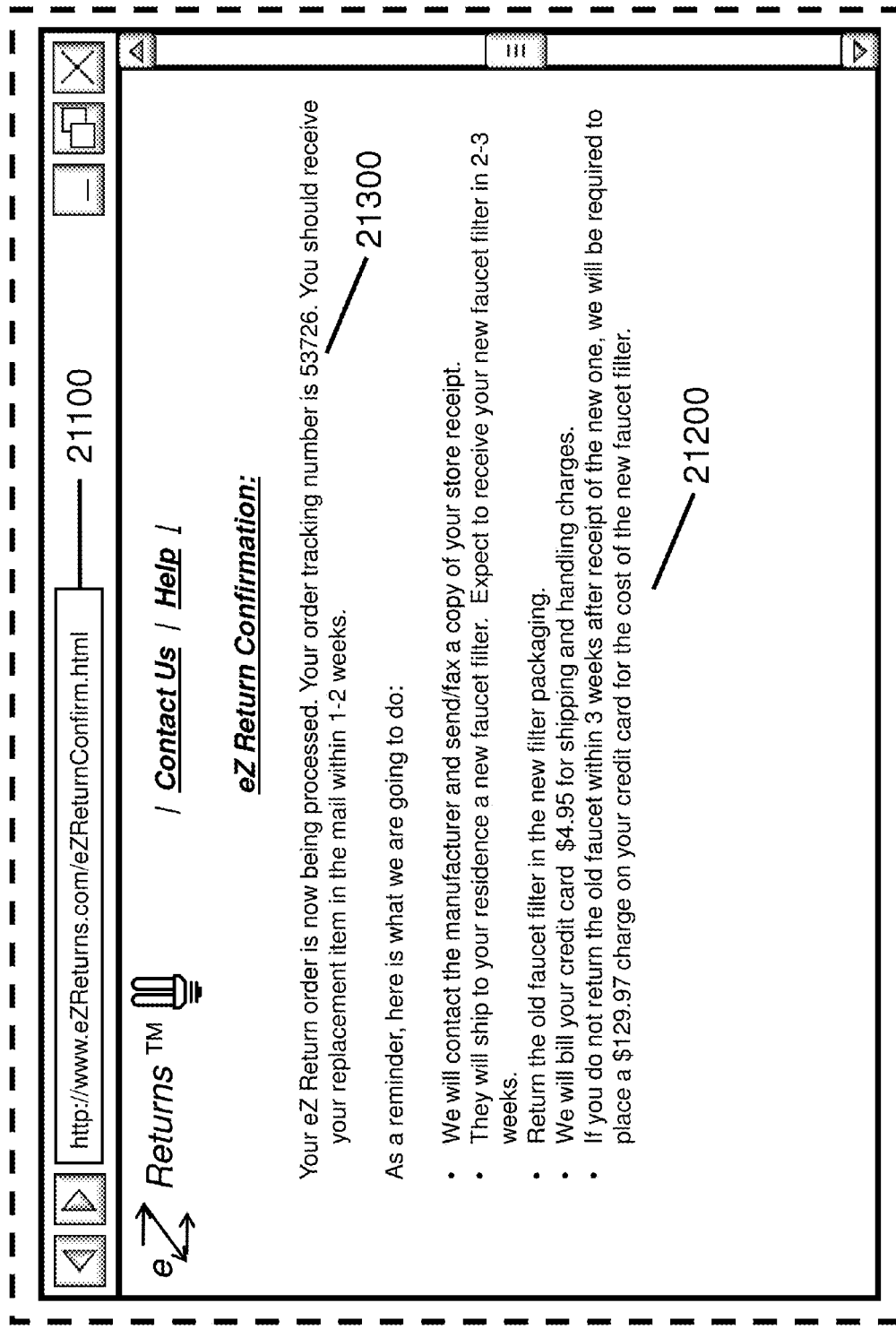
FIG. 21 illustrates another example Web-based user interface displaying an example confirmation message.

FIG. 21 is an example confirmation web page display 21000 in response to a user selecting the confirmation control 20600 in FIG. 20. In this example user interface, the instructions 20200 are repeated from FIG. 20 and a confirmation message 21200 is displayed. Optionally, the CM system generates a warranty return tracking number 21300 which is included in the confirmation message 21200.

Figure 22:
FIG. 22 illustrates another example Web-based user interface displaying update instructions in the event of a user returning an item.
Figure 23:
FIG. 23 illustrates another example Web-based user interface displaying an example guest account creation screen.

FIG. 22 illustrates another example user interface 22000 presented via a browser (or other interface application). The web page can optionally be accessed by selecting a control on a widget/gadget application program, by supplying the appropriate Uniform Resource Locator (URL) to the browser 22100, by selecting a link in response to a search query, by selecting an update link 19700 (see FIG. 19), or the like. The example user interface enables a user to update warranty tracking information in the event of an item return/replacement. Optionally, the browser user interface display includes a collection of web-site common controls 22200 including branding, an alert/notifier, and contact and help information links. Optionally, the browser user interface display includes detailed information 22300 of the warranty item returned/replaced by the user including: warranty item name, warranty provider, warranty period or state the item is currently in, and expiration date of the warranty coverage. Optionally, the browser user interface display includes a question to the user whether a return or replacement occurred. If the user selects the optional "yes" control 22400, additional instructions are optionally displayed requesting that the user enter the date of the replacement/return. If the user enters a date in the date field 22500 and selects the submit control 22600, the date information is transmitted to the CM server 800 over data network 400. The CM server 800 queries one or more databases to determine if the warranty period for a replacement item affects the warranty expiration date. If so, the replacement date is optionally stored in the customer account database and a new warranty expiration date is calculated and also stored in the database. For example, if a user replaces a defective car battery during the warranty period, the manufacturer optionally restarts the warranty period to begin on the date the replacement battery is issued.

Figure 26:
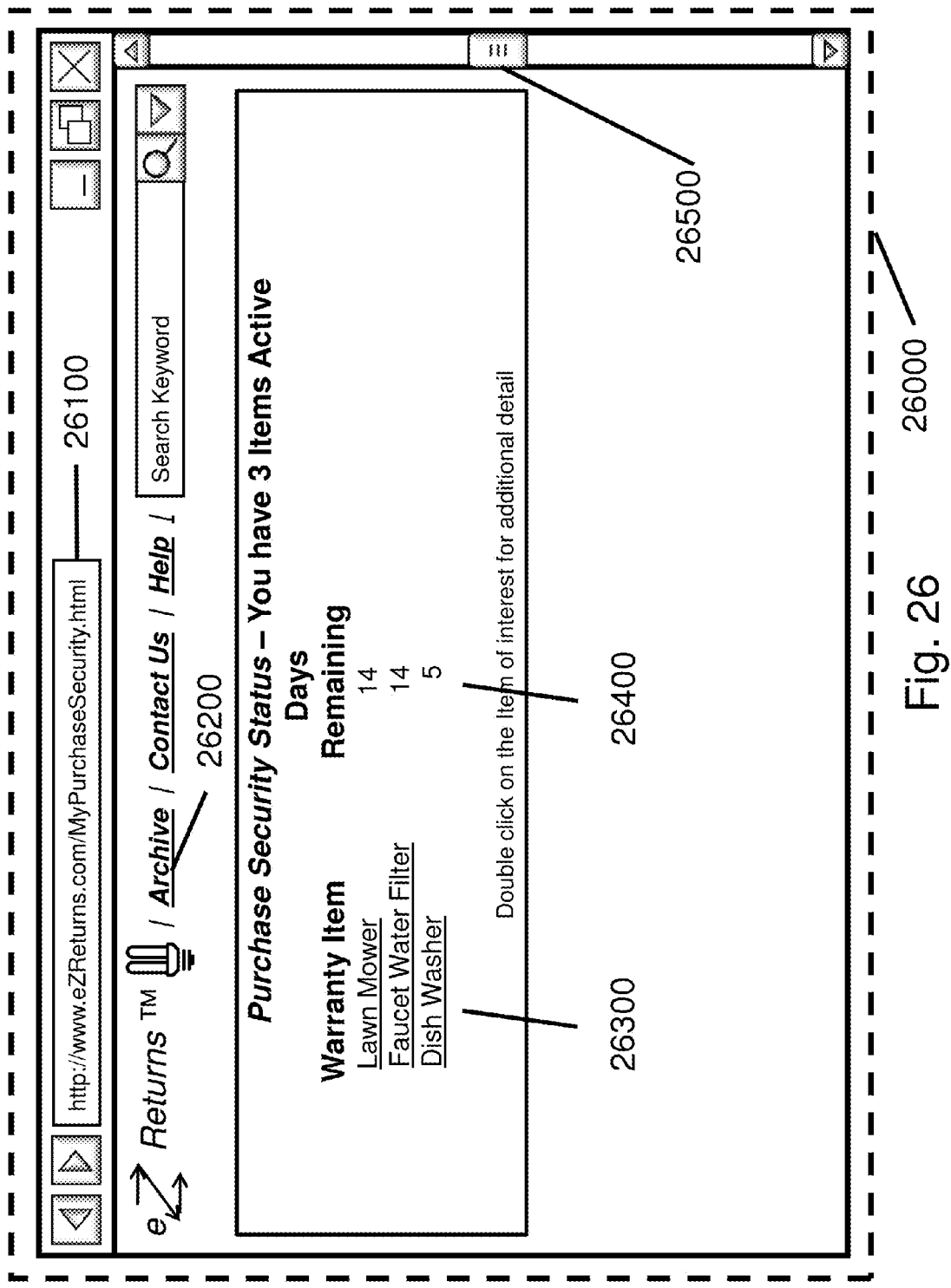
FIG. 26 illustrates another example Web-based user interface displaying items eligible for product loss coverage.

FIG. 26 illustrates an example Claims Management system user interface 26000 presented via a browser (or other interface application) to a user. The web page can optionally be accessed by selecting a control on a widget/gadget application program 4700 (see FIG. 4), by supplying the appropriate Uniform Resource Locator (URL) to the browser 26100, by selecting a link in response to a search query, or the like. The example user interface provides the top-level view of those items purchased by a user, tracked by the CM system, and eligible for a reimbursement or replacement if the item is lost, stolen, vandalized, destroyed due to weather, etc. Optionally, the browser user interface display includes a collection of web-site common controls including branding, an alert/notifier, contact and help information links, and a search function (search is described fully in the description of FIGS. 34 and 35). Optionally, if there are more active product loss items in the list than can fit in a single web page view, the browser includes a scroll control 26500. In this example user interface, a list 26300 of three items in an active state and the corresponding days remaining until product loss coverage expiration 26400 are displayed. Each of the list items 26300 is a linked URL that when selected provides the user with a new web page with additional detail regarding the product loss coverage status of the selected item (see FIG. 27 for an example web page display). Optionally the browser user interface also includes an archive link 26200. Selecting the Archive control 26200 displays a complete listing of all items which have been tracked within the CM system and which are no longer active. When displaying archived items, the label of the Archive control 26200 toggles to "Current" to allow the user to return to a listing of currently active purchase security protected items. Optionally, the "Days Remaining" column includes a negative number for days since the protection program was no longer available. Alternatively, the "Days Remaining" column could list the date the protection program expired for the given item.

Figure 27:
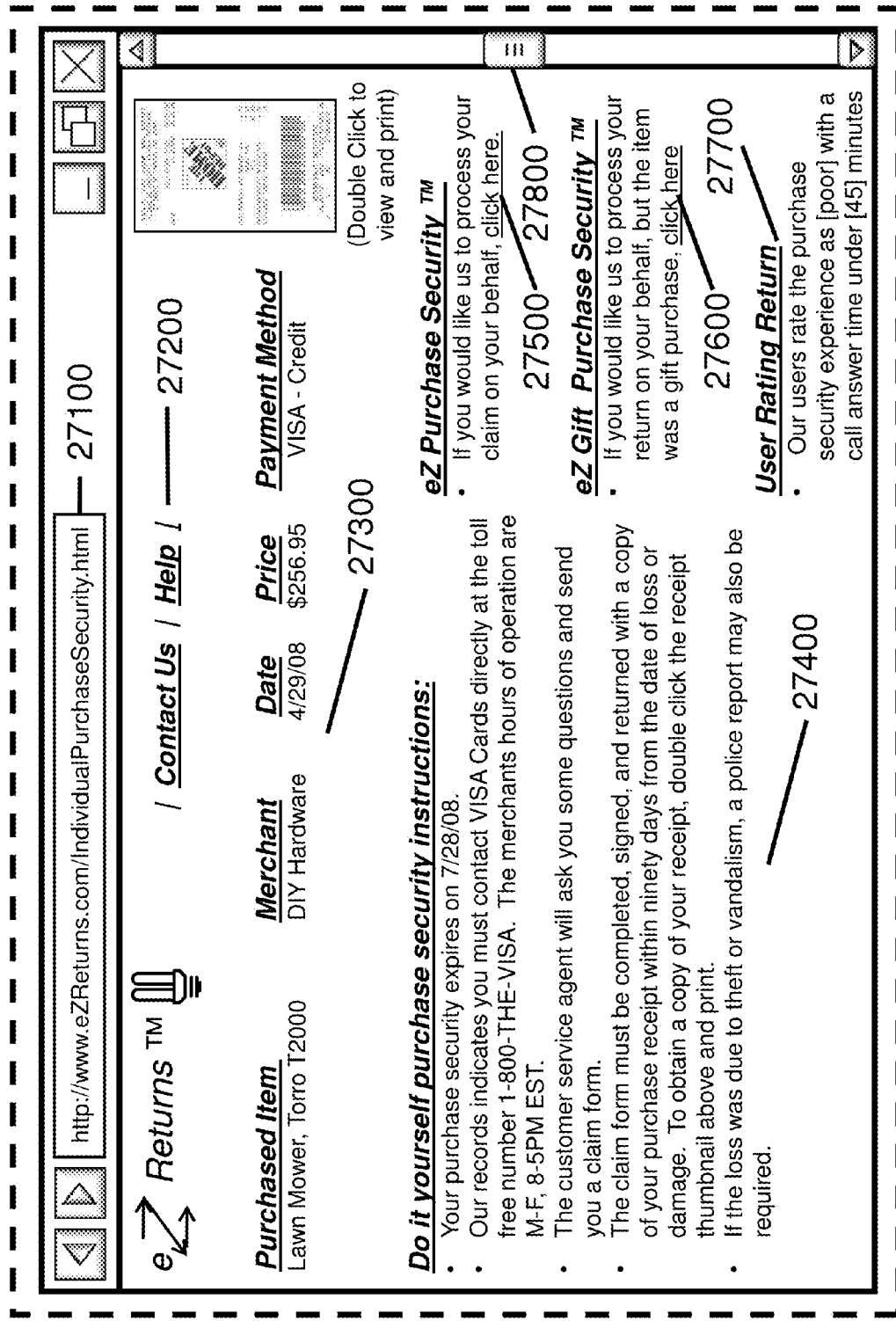
FIG. 27 illustrates another example Web-based user interface displaying product loss refund/replacement instructions for a given item.

FIG. 27 illustrates an example Claims Management system user interface 27000 presented via a browser (or other interface application) to a user. The web page can optionally be accessed by selecting a control on a widget/gadget application program, by supplying the appropriate Uniform Resource Locator (URL) to the browser 27100, by selecting a link in response to a search query, by selecting a listed item 26300 (see FIG. 26), or the like. The example user interface provides a detailed view of items purchased by a user, tracked by the CM system, and covered for product loss. Optionally, the browser user interface display includes a collection of web-site common controls 27200 including branding, an alert/notifier, and contact and help information links. Optionally, if there are more user instructions than can fit in a single web page view, the browser includes a scroll control 27800. In this example user interface display, the original item purchase description 27300 is listed including: the item name, manufacturer, model number, the retail merchant where the item was purchased, the date the item originally was purchased, original purchase price, method of payment, and a thumbnail image of the original purchase receipt. Double clicking on a thumbnail image optionally activates a new browser with an expanded view of the receipt and conventional browser options (e.g., print and print preview options). In this example user interface display, the CM system provides the user with explicit instructions 27400 on how they can apply for a product loss replacement or reimbursement. Optionally, the user can have the CM system provider process the replacement or reimbursement request. The user selects this option by clicking on the eZ Purchase Security™ link 27500 which displays a separate web page (see FIG. 28).

Optionally, the web-based user interface includes a gift return control 27600. This control enables a user to create a guest account for an individual who has received an item as a gift from the user. The guest account enables the CM system to process a refund with limited effort on behalf of the user. (The Gift Purchase Security process is very similar to the Gift Warranty Return process. The user begins by creating a guest account. The giftee next logs in to the CM system using the guest account credentials and can optionally process a return for a given item.) Optionally, the browser user interface display also includes a summarized user rating of the do-it-yourself refund process 27700. Clicking on the user rating link 27700 optionally displays a separate web page with a web form enabling the user to blog/record their refund processing experience and/or to read more detailed user feedback/experiences.

Figure 28:
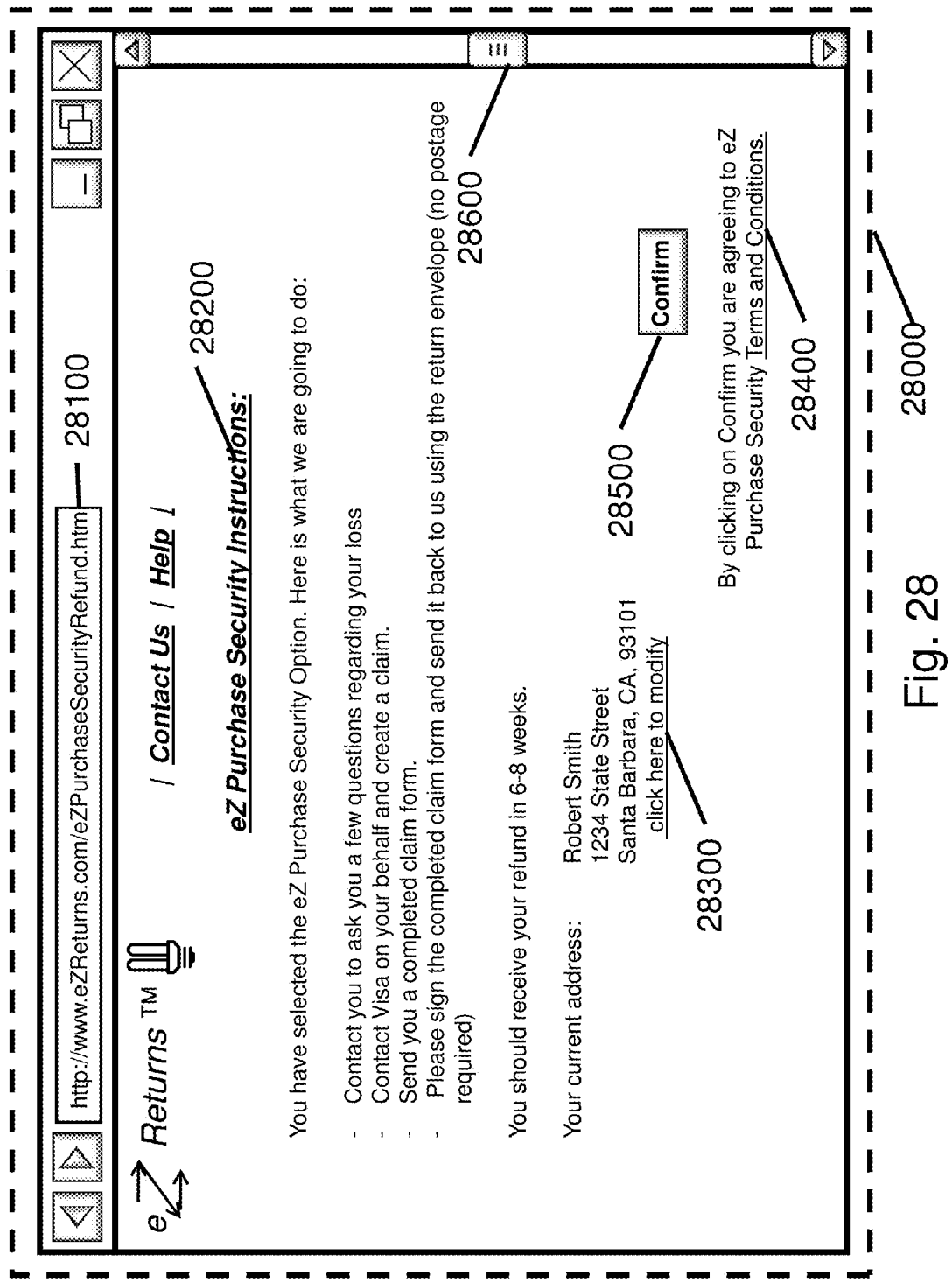
FIG. 28 illustrates another example Web-based user interface displaying user, product loss return instructions when processed by the Claims Management system.

FIG. 28 illustrates an example Claims Management system user interface 28000 presented via a browser (or other interface application) to a user. The web page can optionally be accessed by selecting a control on a widget/gadget application program, by supplying the appropriate Uniform Resource Locator (URL) to the browser 28100, by selecting a link in response to a search query, by selecting the eZ Purchase Security™ link 27500 (see FIG. 27), or the like. The example user interface provides a response to user's request for the CM provider to process a product loss replacement or reimbursement. The user is provided with instructional steps they must follow along with a confirmation. Optionally, if the user does not confirm, the CM system will not initiate the refund process. Optionally, the browser user interface display includes a collection of web-site common controls including branding, an alert/notifier, and contact and help information links. Optionally, if there are more user instructions than can fit in a single web page view, the browser includes a scroll control 28600. The browser user interface displays instructions 28200 that the user must follow in order for the refund to be processed. Optionally, the user interface instructions include the user's current address which is optionally stored in the customer database 900. Optionally, the user can modify their current address by selecting a link 28300 which causes a new web page to be displayed with the user's current address displayed in editable fields. Optionally, the user interface includes a link 28400 to the CM provider's general terms and conditions or specific terms and conditions for processing a product loss reimbursement or replacement. Lastly, this example user display includes a confirmation control 28500 which when selected by the user sends a confirmation request to the CM system over the data network 400 to process the product loss claim.

Figure 29:
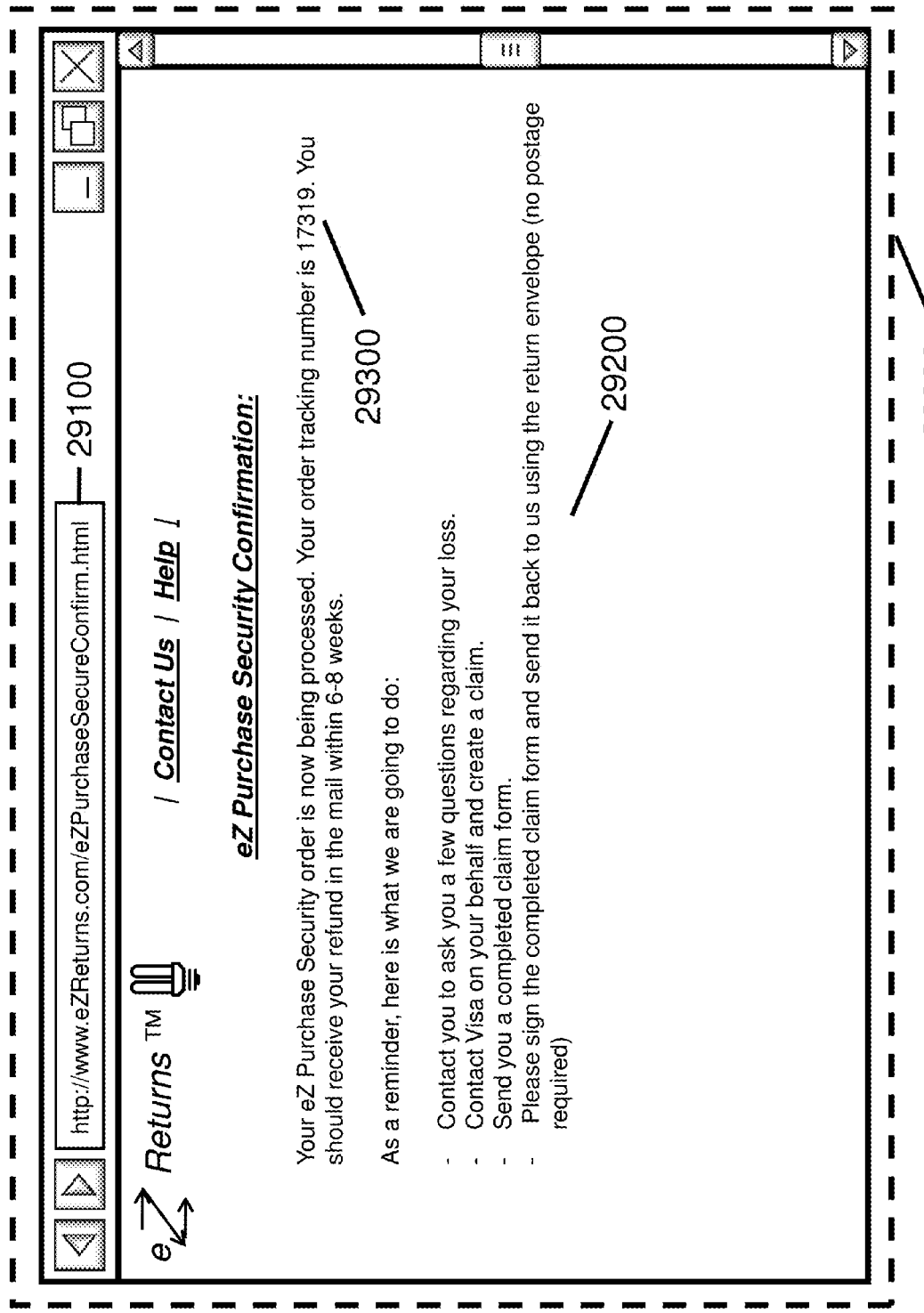
FIG. 29 illustrates another example Web-based user interface displaying an example product loss confirmation page.

FIG. 29 is an example confirmation web page display 29000 in response to a user selecting the confirmation control 28500 in FIG. 28. In this example user interface, a confirmation message is displayed, including a reiteration of the user instructions 28200 from FIG. 28. Optionally, the CM system generates a purchase security refund tracking number which is included in the confirmation message 29200.

Figure 30:
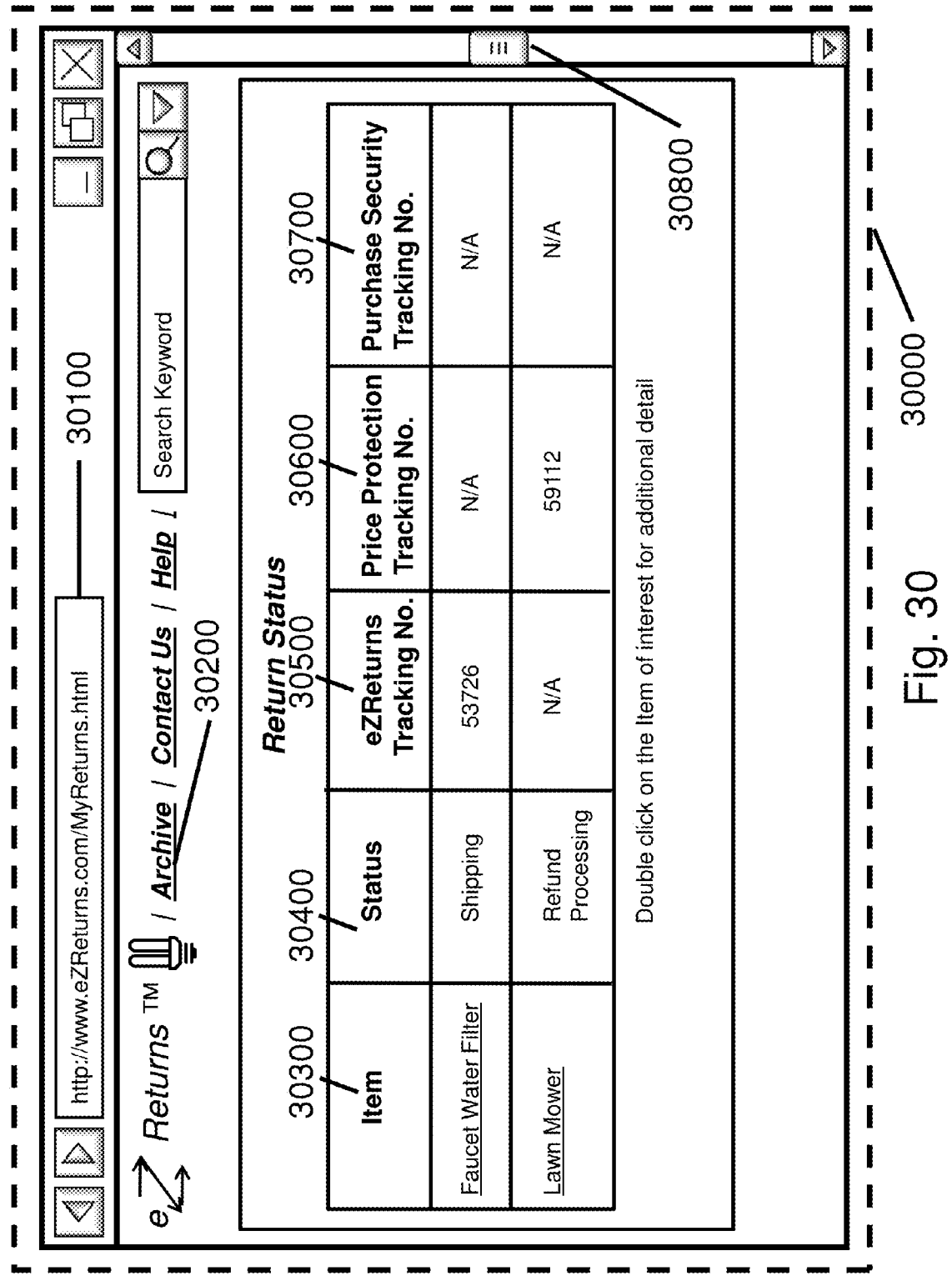
FIG. 30 illustrates another example Web-based user interface displaying those items in a return, refund, reimbursement processing state.

FIG. 30 illustrates an example Claims Management system user interface 30000 presented via a browser (or other interface application) to a user. The web page can optionally be accessed by selecting a control on a widget/gadget application program 4800 (see FIG. 4), by supplying the appropriate Uniform Resource Locator (URL) to the browser 30100, by selecting a link in response to a search query, or the like. The example user interface provides the top-level view of those items returned by the user using the CM system refund/returns processing. Optionally, the browser user interface display includes a collection of web-site common controls including branding, an alert/notifier, contact and help information links, and a search function (search is described fully in the description of FIGS. 34 and 35). Optionally, if there are more return items in the list that can fit in a single web page view, the browser includes a scroll control 30800. In this example user interface, two items, a water filter and lawn mower are in a return state. Each of the named items 30300 is a linked URL that when selected provide the user with additional detail regarding the status of the item return or refund (see FIG. 31 and FIG. 32 for example web page displays for each example item, respectively). Optionally, for each item listed, the CM system displays the status of the return 30400. "Shipping" or "Waiting return of defective item" are two example status states for a manufacturer's warranty return. "Refund processing" and "Awaiting claim form" are two example status states for a price protection refund. "Reimbursement processing" and "Awaiting claim form" are two example status states for a purchase security (or product loss) reimbursement. Optionally, the CM system assigned tracking number for warranty returns is displayed 30500. Optionally, the CM system assigned tracking number for price protection refunds is displayed 30600. Optionally, the CM system assigned tracking number for purchase security reimbursements and replacements is displayed 30700. Optionally the browser user interface also includes an archive link 30200. Selecting the Archive control 30200 displays a complete listing of all returns which have been tracked within the CM system and which are no longer active. When displaying archived items, the label of the Archive control toggles to "Current" to allow the user to return to a listing of only active returns items.

Figure 31:
FIG. 31 illustrates another example Web-based user interface displaying the refund status of a single item.

FIG. 31 illustrates another example user interface 31000 presented via a browser (or other interface application). The web page can optionally be accessed by selecting a control on a widget/gadget application program, by supplying the appropriate Uniform Resource Locator (URL) to the browser 31100, by selecting a link in response to a search query, by selecting a status item 30300, or the like. The example user interface enables a user to obtain additional detail on the status of a specific refund. Optionally, the browser user interface display includes a collection of web-site common controls including branding, an alert/notifier, and contact and help information links. Optionally the refund status includes the following: the item name 31200, the address 31300 (or email address, electronic routing instructions, etc) that the refund is to be delivered to, the refund amount 31400, the CM system generated tracking number 31500, and a tracking number created by the price protection provider 31600, if available. Optionally, the user interface display includes a time line 31700 depicting a series of expected events during the life cycle of the refund, and a progress bar 31800 highlighting the current status of the refund on the time line 31700.

Figure 32:
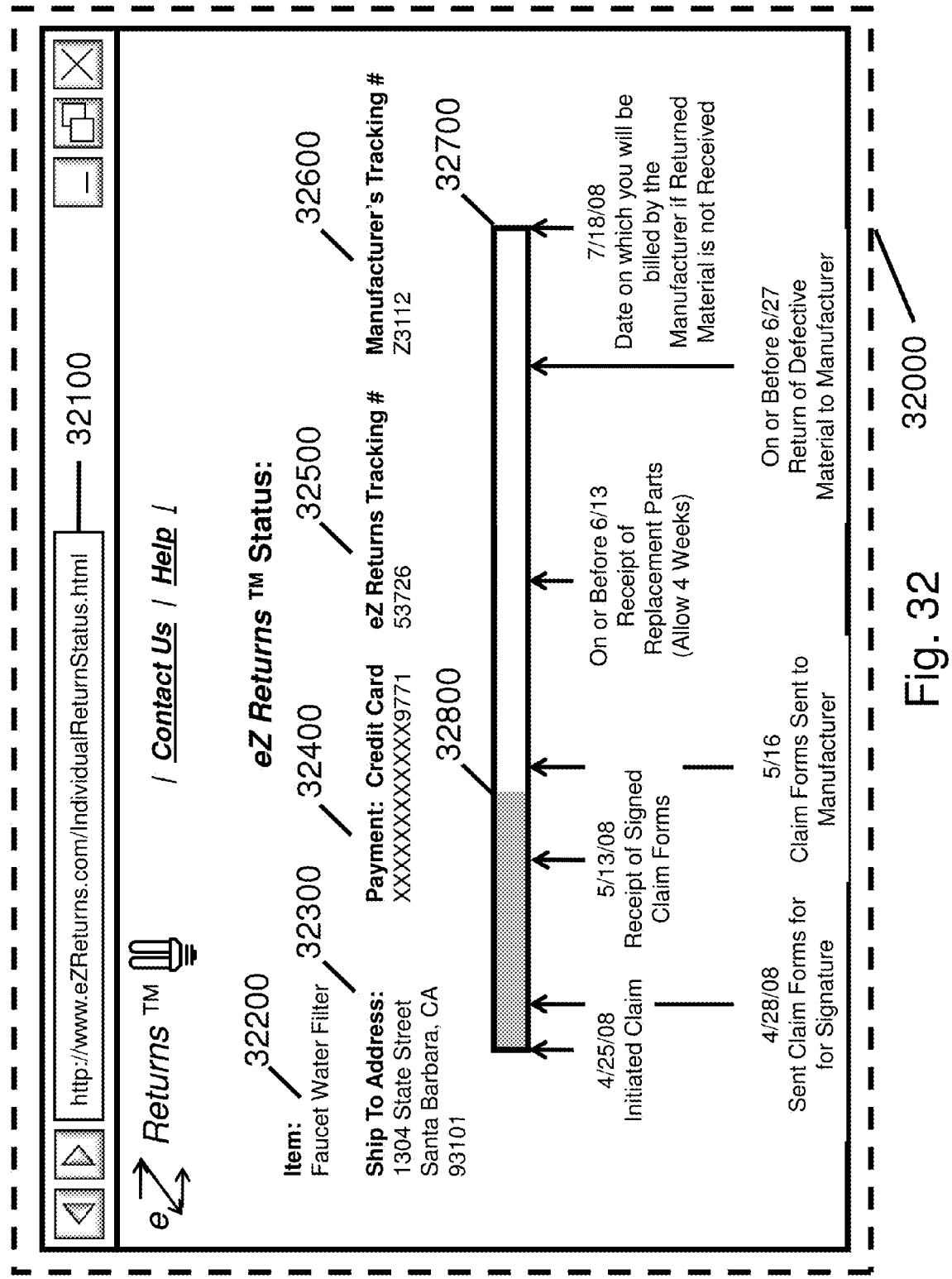
FIG. 32 illustrates another example Web-based user interface displaying the return status of a single item.

FIG. 32 illustrates another example user interface 32000 presented via a browser (or other interface application). The web page can optionally be accessed by selecting a control on a widget/gadget application program, by supplying the appropriate Uniform Resource Locator (URL) to the browser 32100, by selecting a link in response to a search query, by selecting a status item 30300, or the like. The example user interface enables a user to obtain additional detail on the status of a specific warranty return. Optionally, the browser user interface display includes a collection of web-site common controls including branding, an alert/notifier, and contact and help information links. Optionally, the warranty return status includes the following: the item name 32200, the address the replacement or repaired item is to be delivered to 32300, the payment method 32400 (for any incidental charges like shipping and handling), the CM system generated tracking number 32500, and a tracking number created by the warranty provider 32600 if available. Optionally, the user interface includes a time line display 32700 including a series of expected events during the life cycle of the warranty return, and a progress bar 32800 highlighting the current status of the return on the time line 32700.

Figure 33:
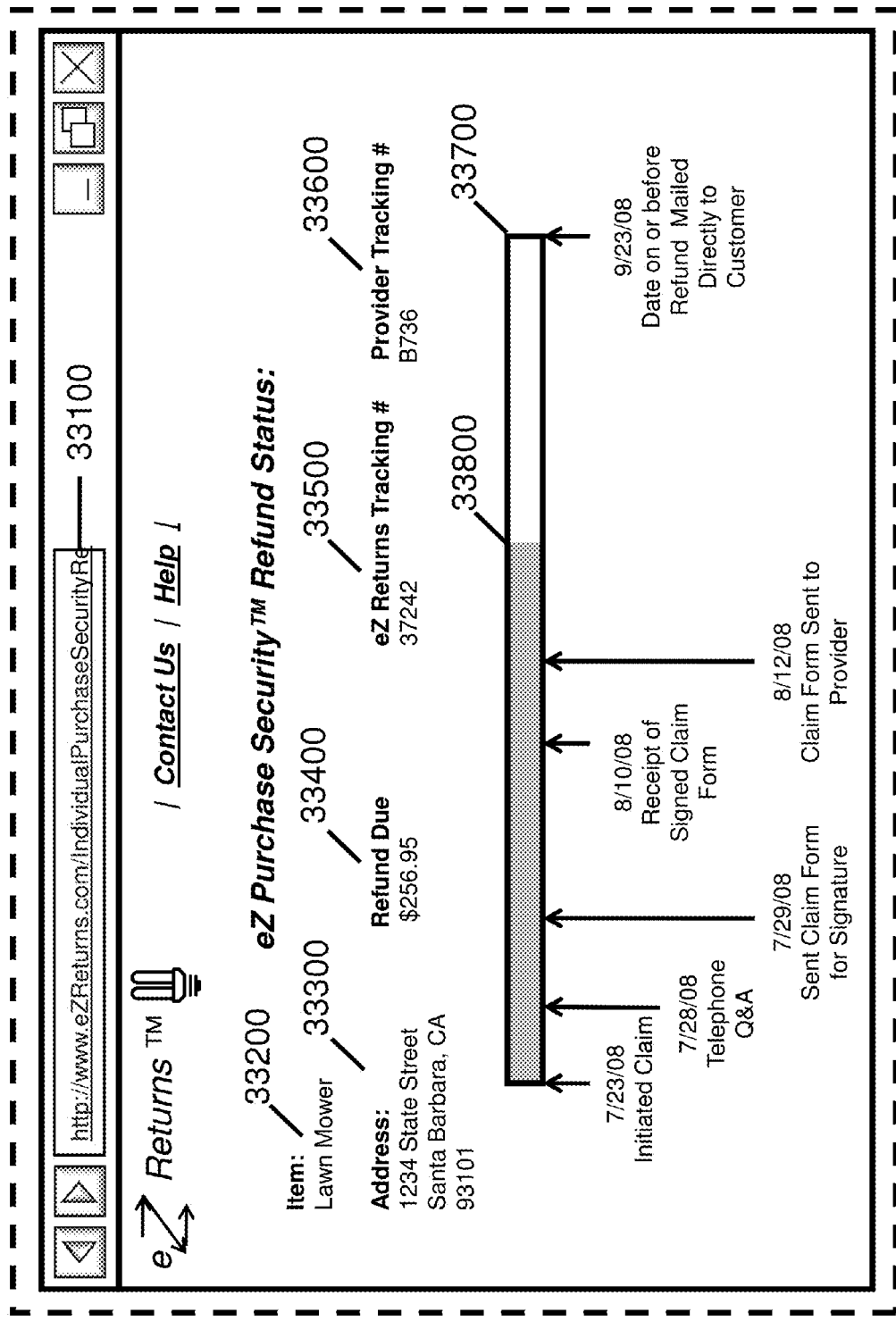
FIG. 33 illustrates another example Web-based user interface displaying the product loss return status of a single item.

FIG. 33 illustrates another example user interface 33000 presented via a browser (or other interface application). The web page can optionally be accessed by selecting a control on a widget/gadget application program, by supplying the appropriate Uniform Resource Locator (URL) to the browser 33100, by selecting a link in response to a search query, by selecting a status item 30300 (see FIG. 30) from a list, or the like. The example user interface enables a user to obtain additional detail on the status of a specific product loss (purchase security) reimbursement/replacement. Optionally, the browser user interface display includes a collection of website common controls including branding, an alert/notifier, and contact and help information links. Optionally, the product loss refund status includes the following: the item name 33200, the address the replacement or reimbursement is to be delivered to 33300, the reimbursement amount 33400, the CM system generated tracking number 33500, and a tracking number created by the product loss provider 33600 if available. Optionally, the user interface includes a time line 33700 that shows expected events during the life cycle of the replacement or reimbursement, and a progress bar 33800 highlighting the current status of the replacement or reimbursement on the time line 33700.

Figure 34:
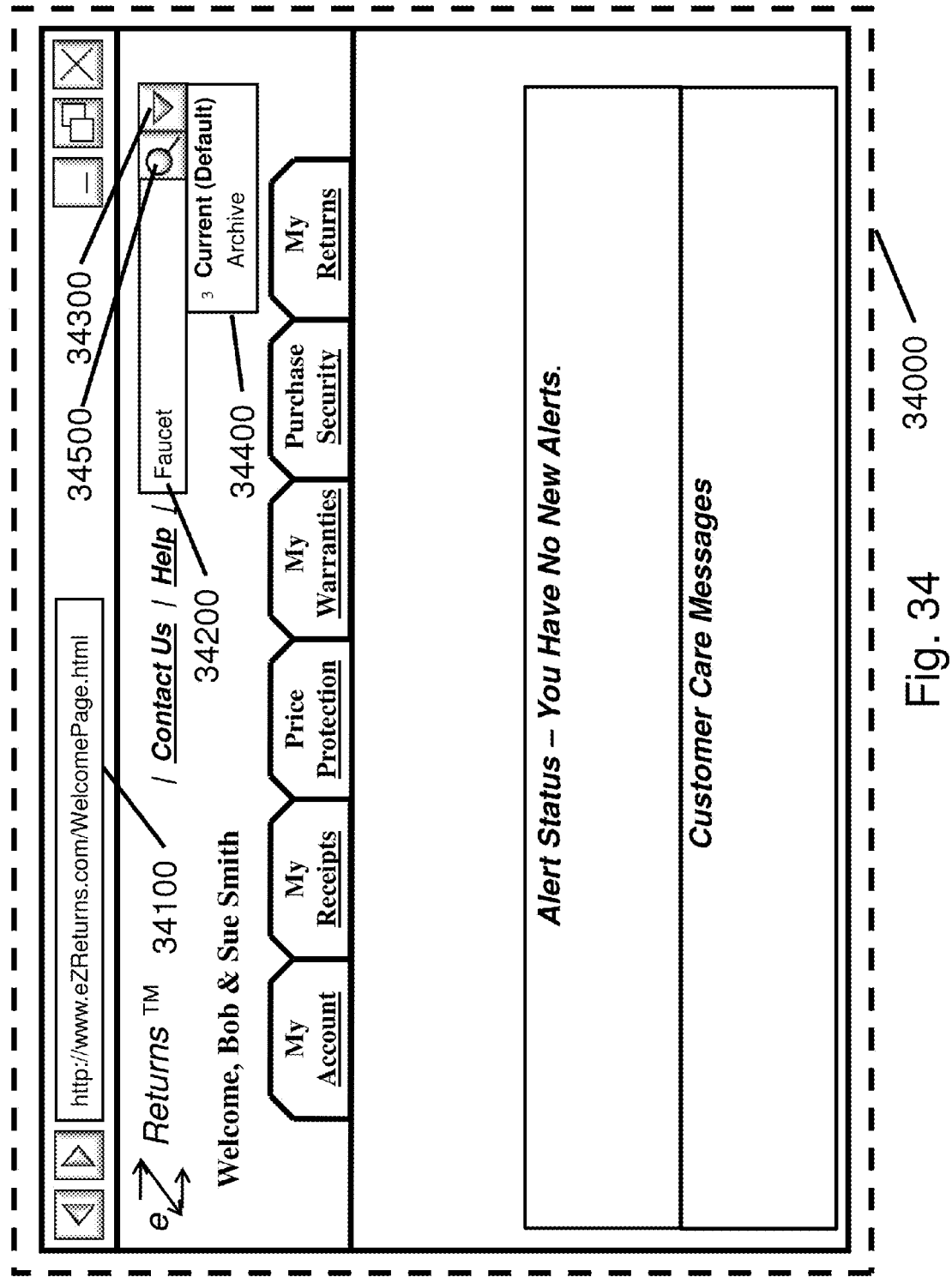
FIG. 34 illustrates another example Web-based user interface displaying an example search.
Figure 35:
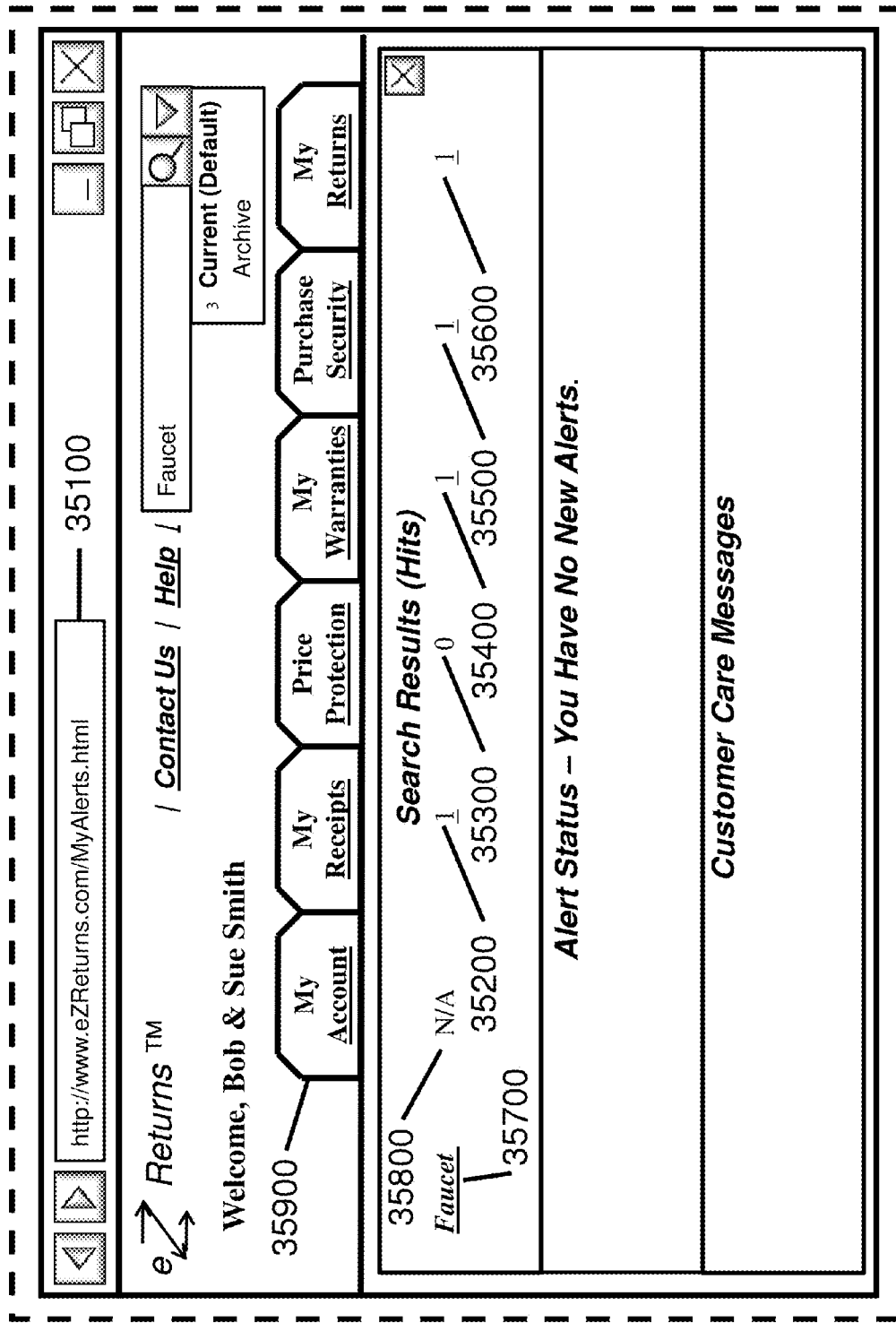
FIG. 35 illustrates another example Web-based user interface displaying search results.

FIGS. 34 and 35 illustrate an example Claims Management system user interface 34000 presented via a browser (or other interface application) to a user. The web page can optionally be accessed by selecting a control on a widget/gadget application program, by supplying the appropriate Uniform Resource Locator (URL) 34100 to the browser, by selecting a link in response to a search query, or the like. The example user interface provides a search function. Optionally, the browser user interface display includes a collection of website common controls including branding, an alert/notifier, and contact and help information links. The user enters search terms in the search key word field 34200, optionally opens the search record type pull down menu by clicking control 34300 and selecting either current or archive records from the menu 34400, and then clicks on the search control 34500. The CM server 800 performs an exhaustive search of the user's profile, stored receipts, and all the items which are in an active or current warranty, warranty return, purchase security, purchase security replacement/reimbursement, price protection, and price protection refund state. Searching Archived records produces an exhaustive search on all items which have been logged to the CM system but are now in a warranty, purchase security, and price protection expired state and any receipts in a similarly expired state. (Alternatively, the search menu also includes an entry which searches all items both current and inactive/expired.)

FIG. 35 illustrates an example Claims Management system user interface 35000 presented via a browser (or other interface application) to a user. The web page can optionally be accessed by selecting a control on a widget/gadget application program, by supplying the appropriate Uniform Resource Locator (URL) to the browser 35100 by selecting a link in response to a search query, by entering a keyword search as illustrated in FIG. 34, or the like. Optionally, the browser user interface display includes a collection of website common controls including branding and contact and help information links. If a search term, keyword, date, price range, etc. is located by the search engine, the results will be displayed underneath the corresponding navigation tabs 35900. In this example user interface, the searched term is listed to the left 35700 and the number of hits are listed under each tab respectively as shown in FIG. 35. In this example search for the word faucet, there are no possible search results under "My Accounts", one hit under "My Receipts" 35200, zero hits under "Price Protection" 35300, one hit under "My Warranties" 35400, one hit under "Purchase Security" 35500, and one hit under "My Returns" 35600. Clicking on any of the search results with a hit (in this example, My Receipts, My Warranties, Purchase Security, and My Returns) directs the user to the corresponding top-level web page display (see example top-level displays FIGS. 9, 14, 18, 26, and 30) with the searched keyword term (e.g., faucet) displayed in bold (or other manner of highlighting the searched term, e.g. italics, color, etc).

Figure 36:
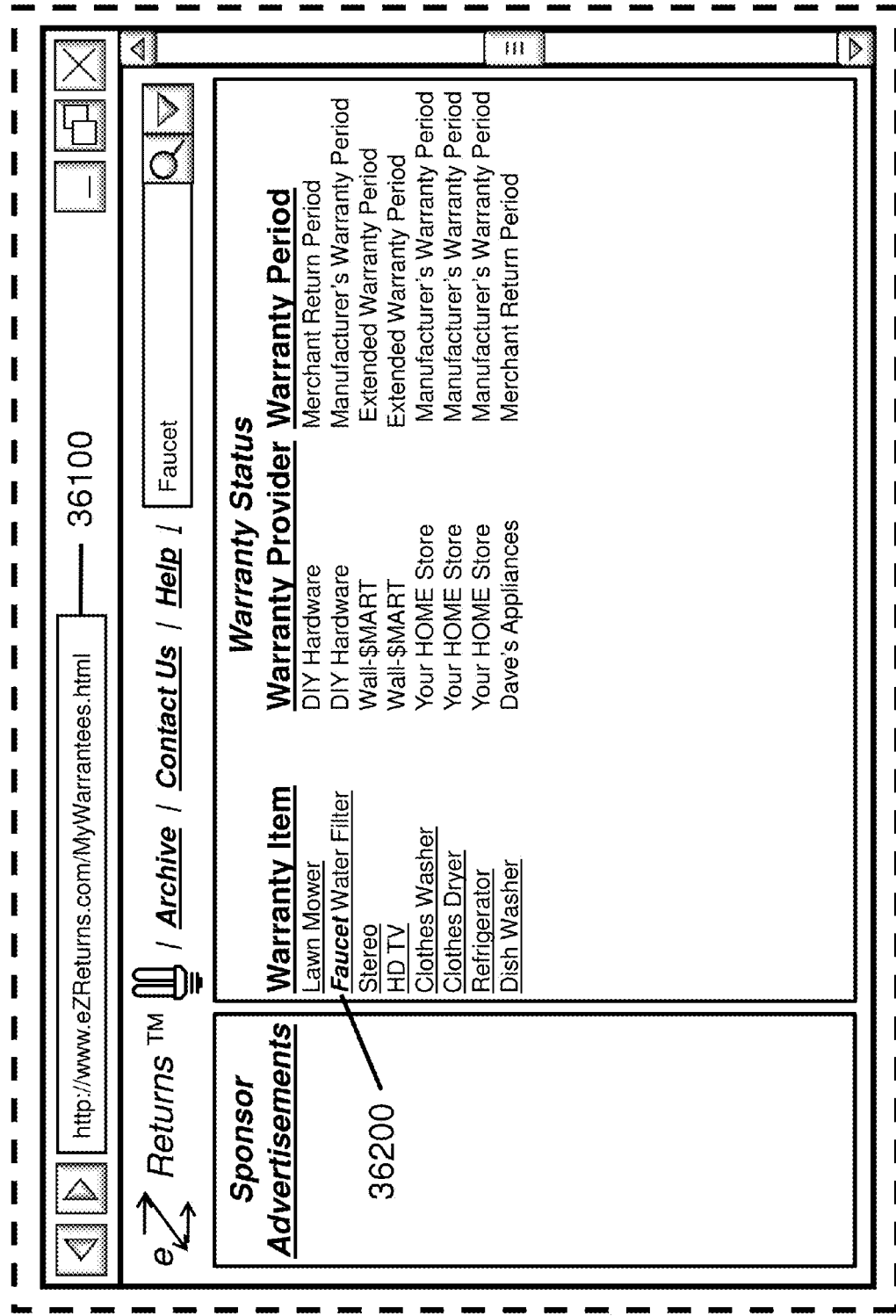
FIG. 36 illustrates another example Web-based user interface displaying a searched term in a list of warrantee covered items.

FIG. 36 (detailed in FIG. 35 description above; also see FIG. 14 description) illustrates the user interface display in response to the user selecting the search results/URL link under "My Warranties" 35500. The search term faucet is bolded 36200 in the example web page display 36000.

Each user account includes a personalized search term dictionary linked to their account in the customer CM database 900. This personal dictionary is initially populated with default parameters from a global system wide dictionary when the account is first registered. As the user creates or logs new warranty items, the personal dictionary is automatically updated. Search keywords specified or used previously by a user are also entered into the personal dictionary. The Claims Management system 900 periodically (e.g., daily) mines personal user dictionaries to refine the global dictionary contents.

Example Embodiments

See FIGS. 37-45

FIGS. 37 through 46 illustrate example workflows of operation of a Claims Management system described in detail above in this document. Process states are listed on the left and major elements of the operating environment of FIG. 1 are listed across the top. Using solid lines with arrows to signify the direction of information flow, the diagram pictorially represents process flow and interactions between the elements in each example embodiment. Dashed lines are used to highlight nonstandard delivery mechanisms. For example, electronic claims forms delivery is depicted using solid lines while transmission of offline, hardcopy claims forms is shown using dashed lines.

Figure 37:
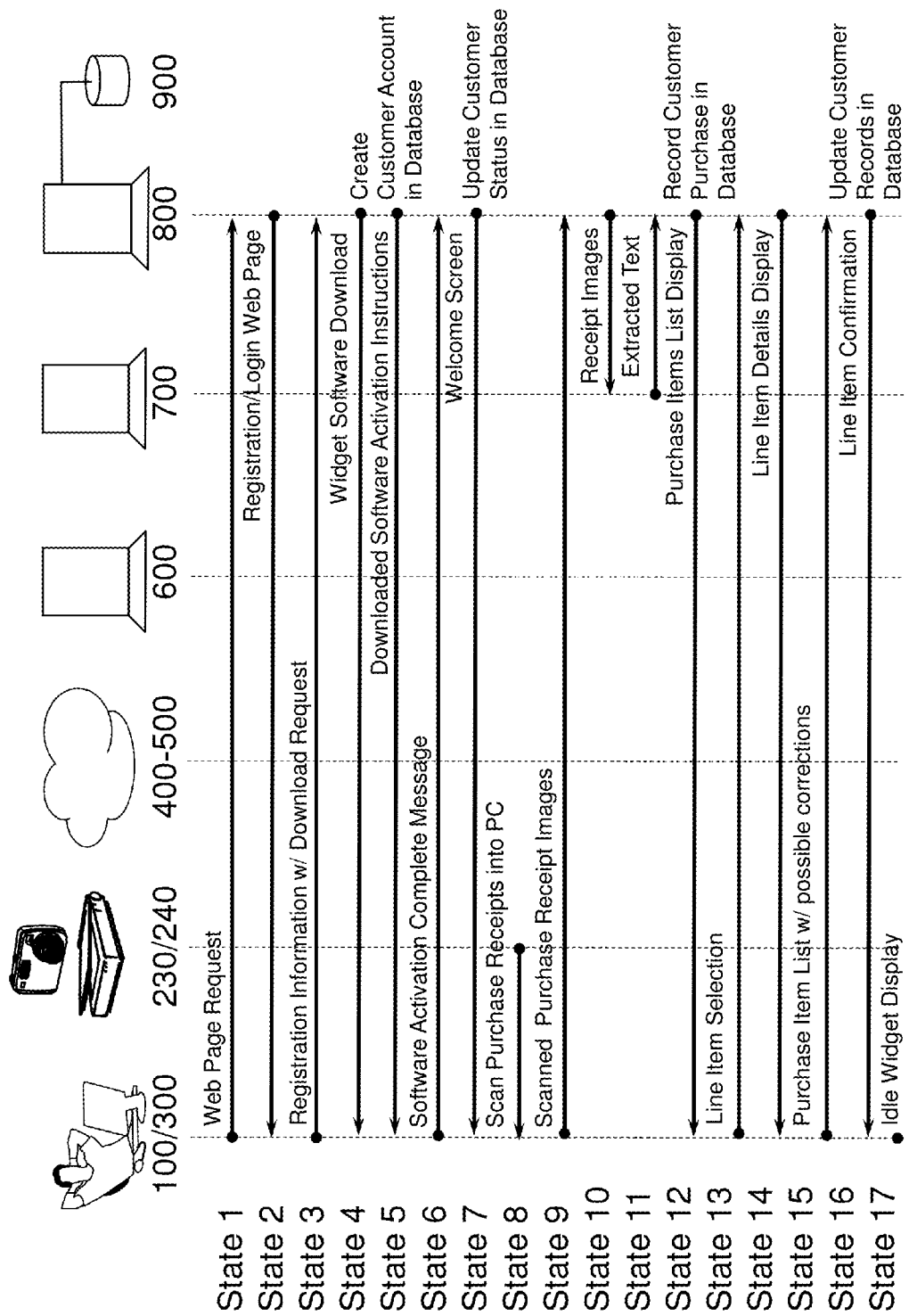
FIG. 37 illustrates the first seventeen states of an example operating environment/process for a Claims Management system
Figure 38:
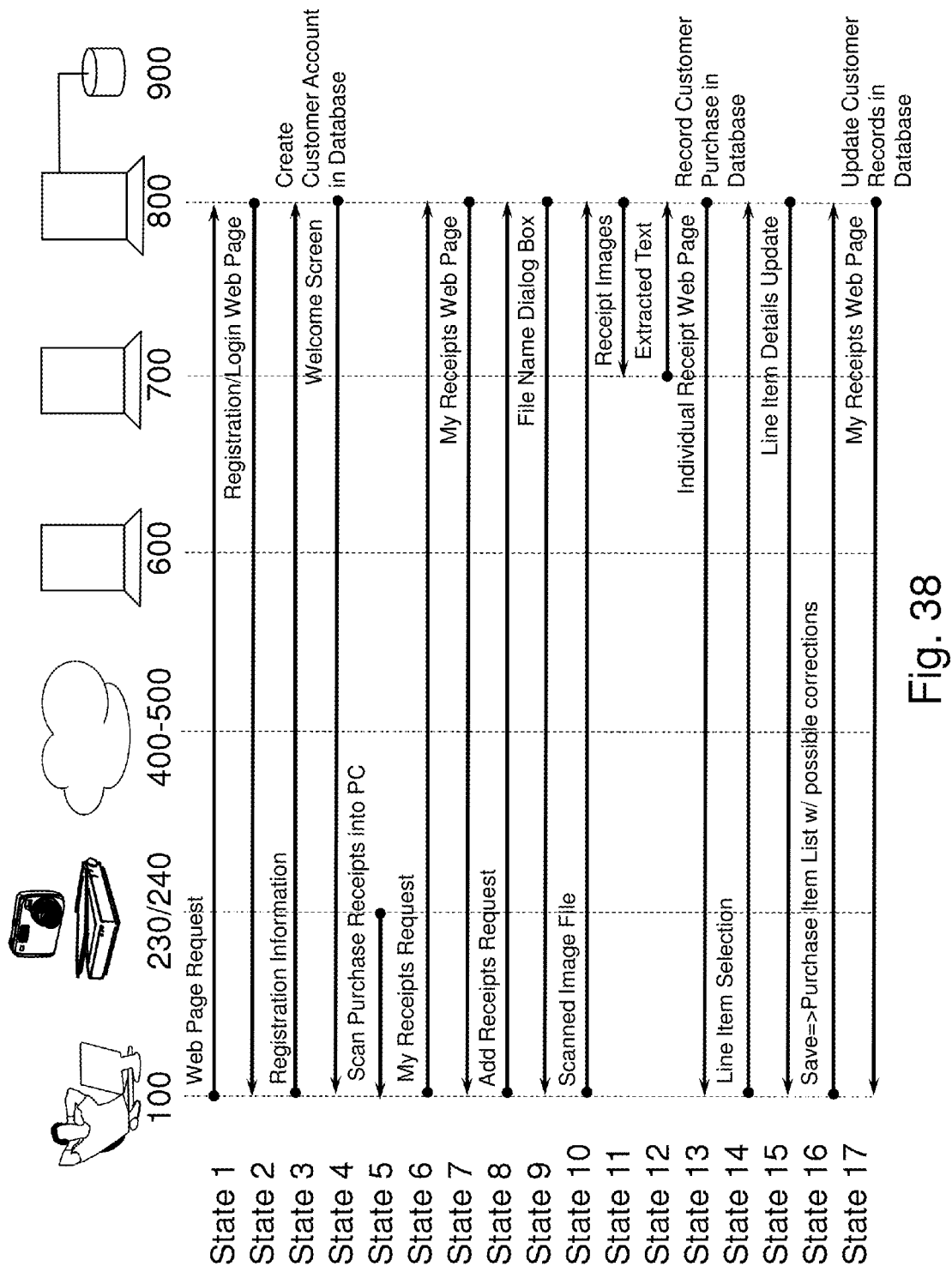
FIG. 38 illustrates the first seventeen states of a second example operating environment/process for a Claims Management system.
Figure 39:
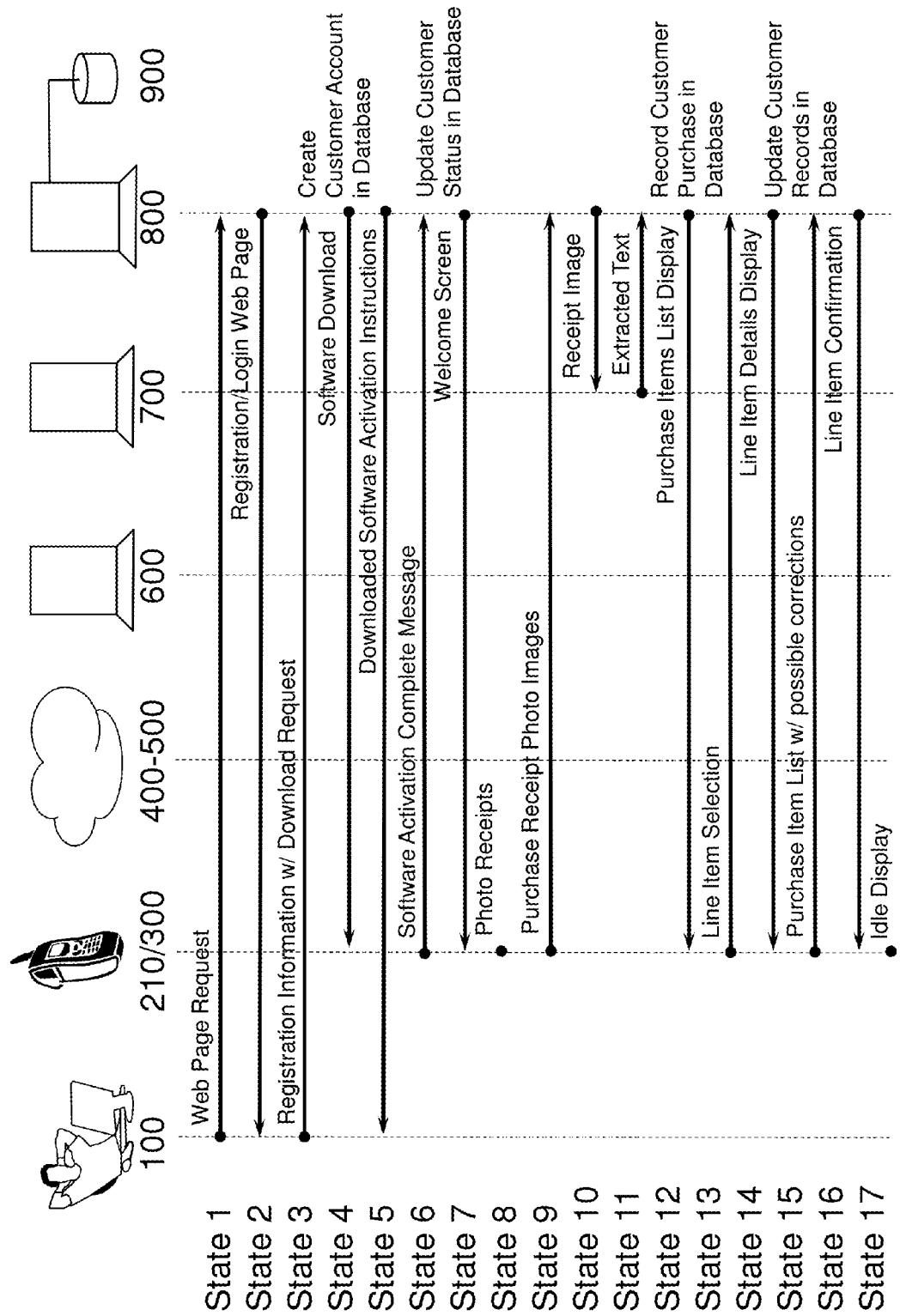
FIG. 39 illustrates the first seventeen states of a third example operating environment/process for a Claims Management system.
Figure 40:
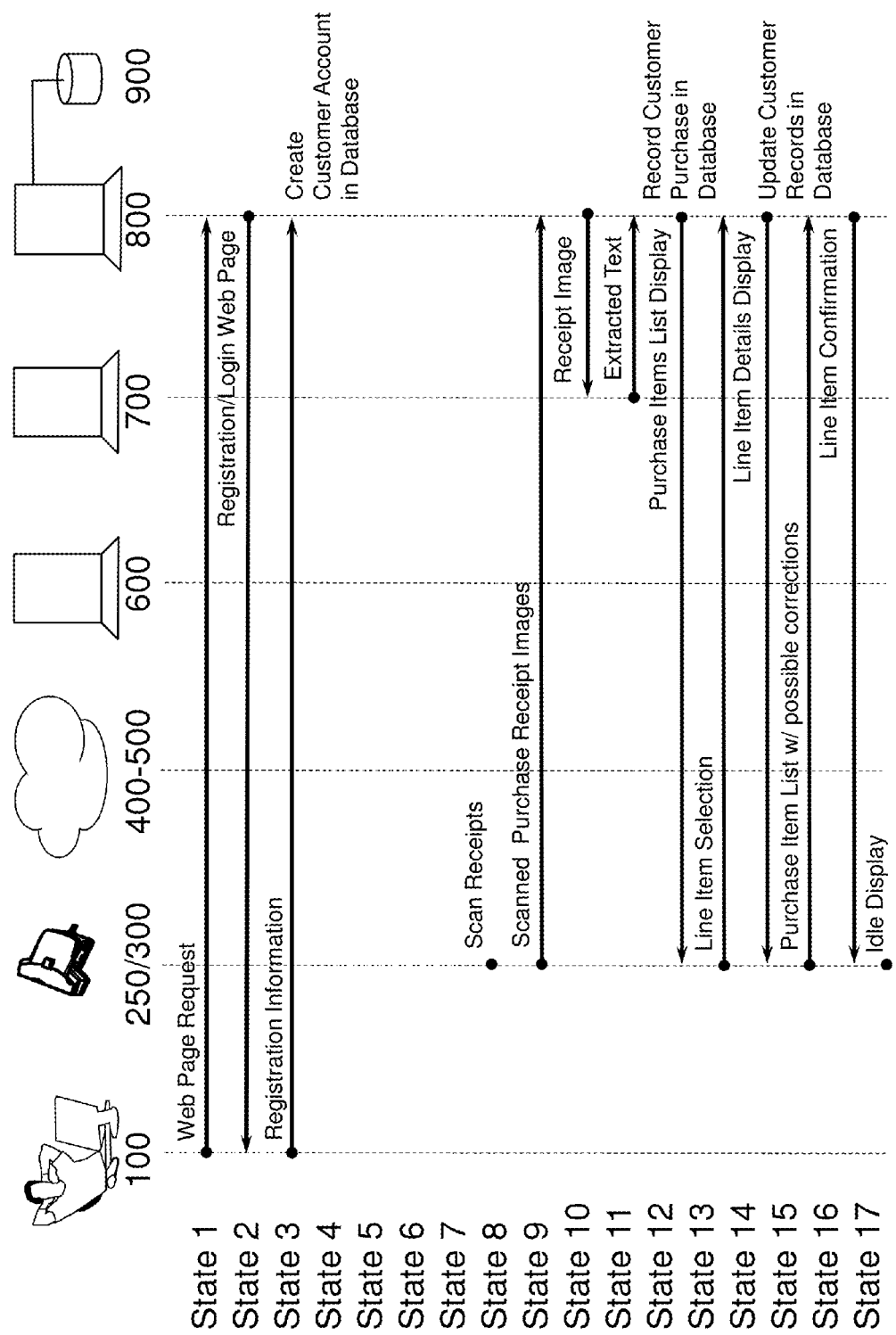
FIG. 40 illustrates the first seventeen states of a fourth example operating environment/process for a Claims Management system.

FIGS. 37-40 depict alternative example embodiments where a user purchases a faucet filter from a retail merchant which they record in the Claims Management system for price and loss protection and warranty tracking. FIG. 37 details the scenario where the user utilizes a standard scanner 230 or digital camera 240 interfaced to their PC 100 to capture purchase receipts. In this case, the optional client software 300 runs on the PC 100. FIG. 38 is a nearly identical configuration to the example in FIG. 37 except that no client software is used. FIG. 39 details the scenario where the user utilizes a standard mobile phone with digital camera 210 or Fax machine 220 to capture purchase receipts. In this case, the optional client software runs either on the PC 100 or on the smart mobile phone 210. A fourth scenario where the purchase records are captured using a network attached special purpose receipt scanner 250 that has been preinstalled with client software 300 is illustrated in FIG. 40.

The example embodiments are continued in FIGS. 41-42 which depicts the situation where the user later receives a notification from the CM system that they are due a price protection refund because a local merchant has offered the identical product for a lower price. The user reviews their options and elects to have the CM system process the refund for them.

Figure 43:
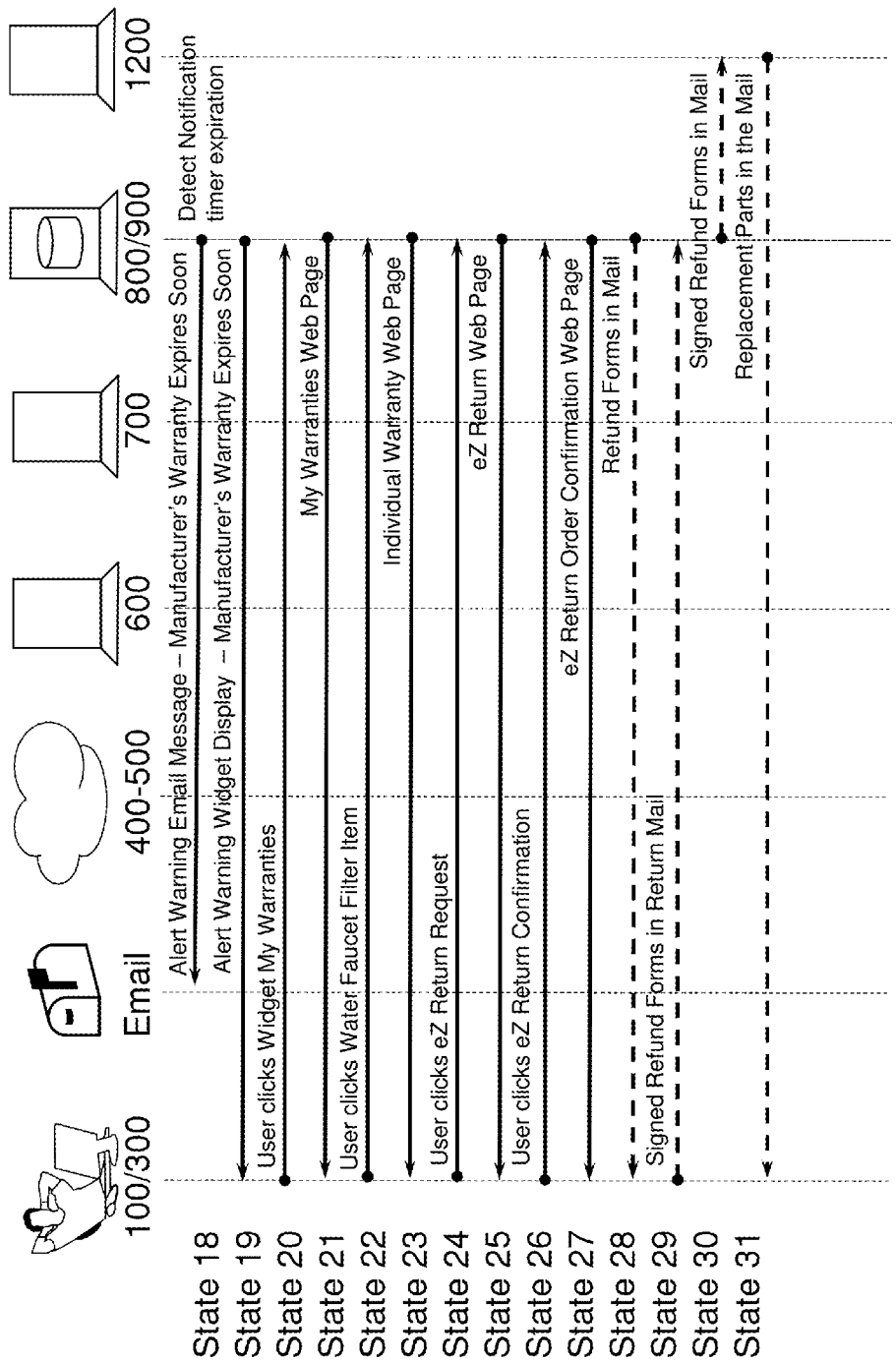
FIG. 43 illustrates a second example set of states eighteen through thirty-one common to the first, second, third and fourth example operating environment/process for a Claims Management system.
Figure 44:
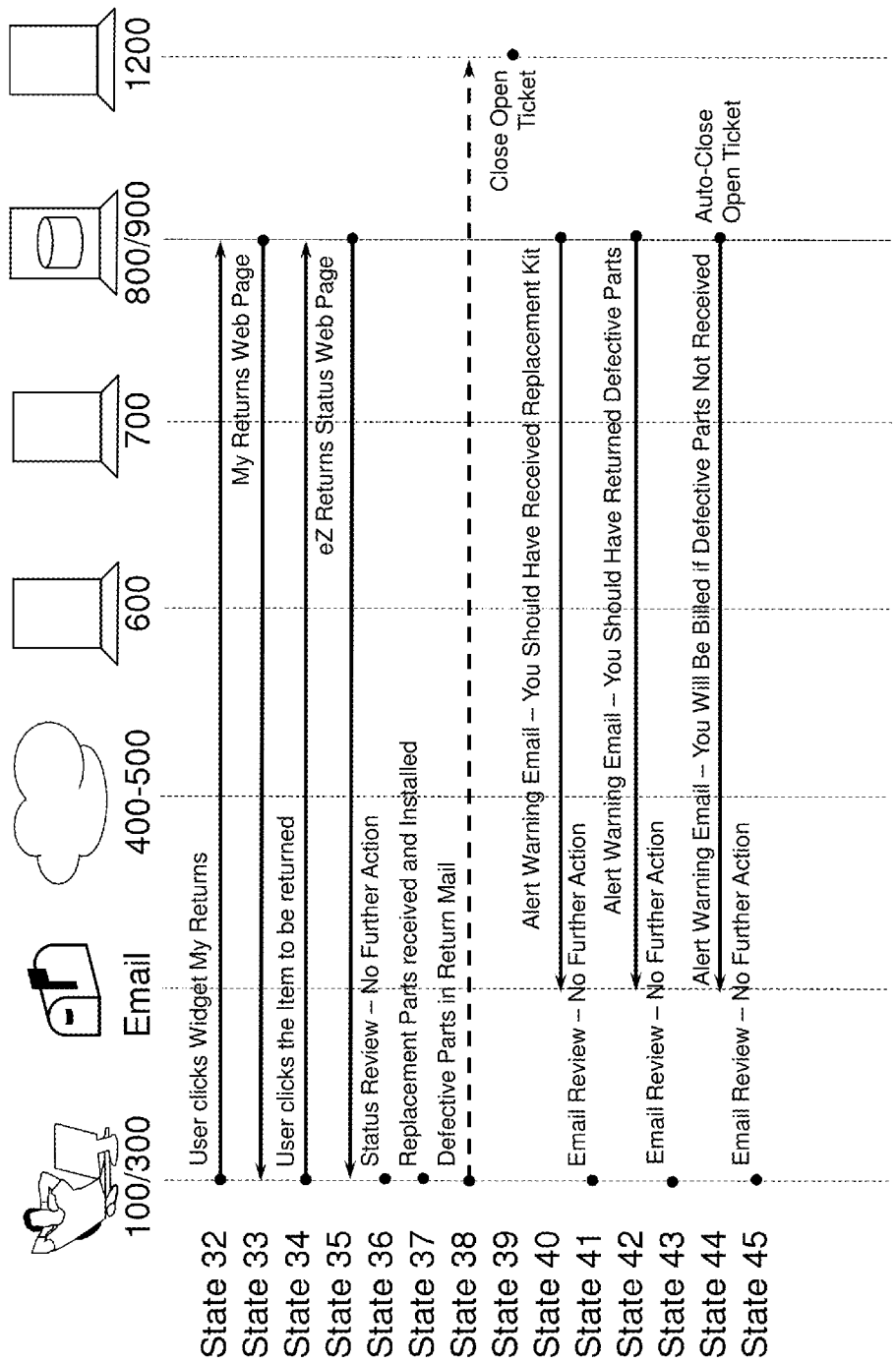
FIG. 44 illustrates the states thirty-two through forty-five of an example operating environment/process for a Claims Management system.

In a similar fashion, FIGS. 43-44 depicts the situation where the user receives a warning notification from the CM system prior to the expiration of the manufacturer's warranty. In this example, the item has been malfunctioning so the user requests that the CM system process a return on their behalf.

Figure 45:
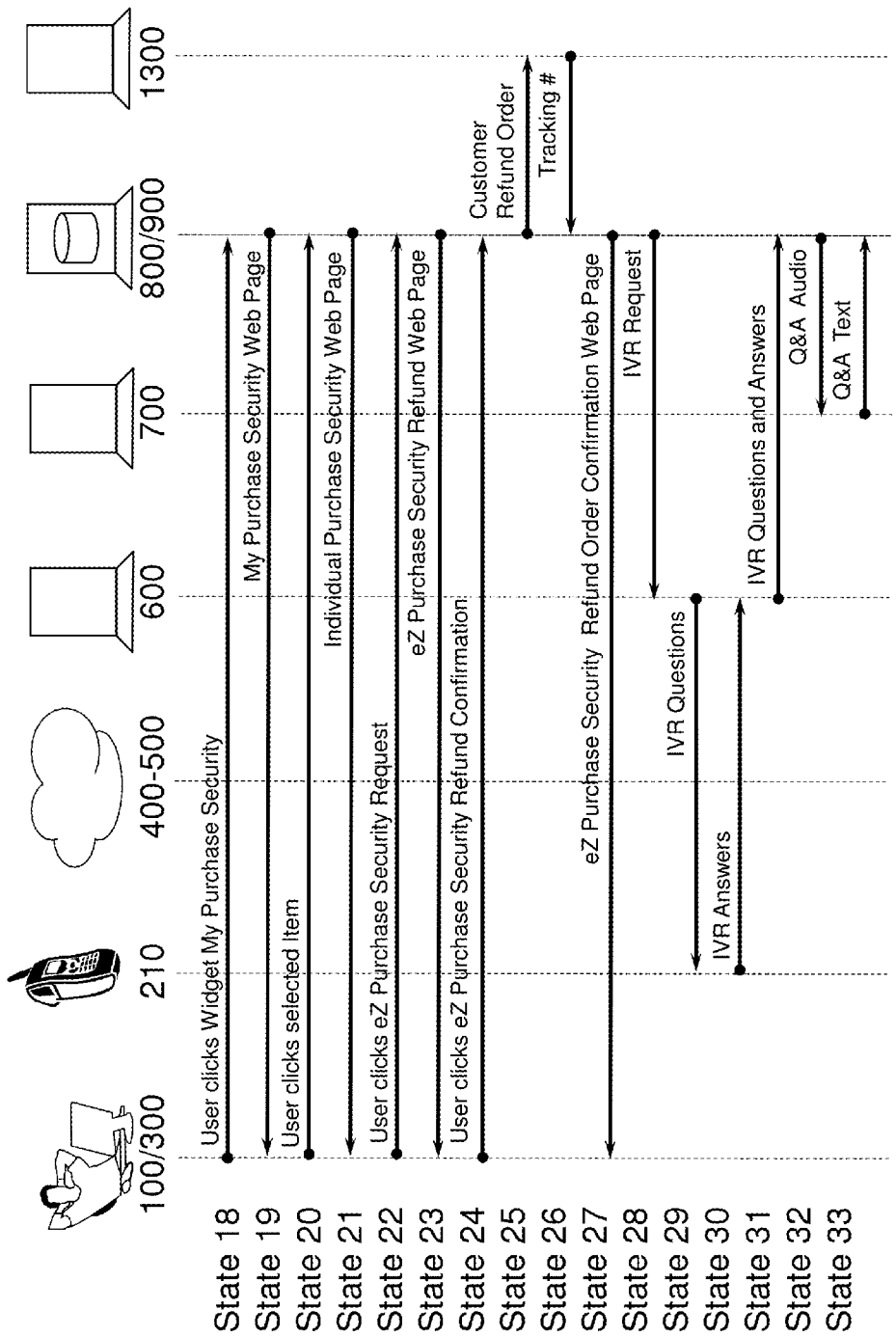
FIG. 45 illustrates a third example set of states eighteen through thirty-three common to the first, second, third and fourth example operating environment/process for a Claims Management system.
Figure 46:
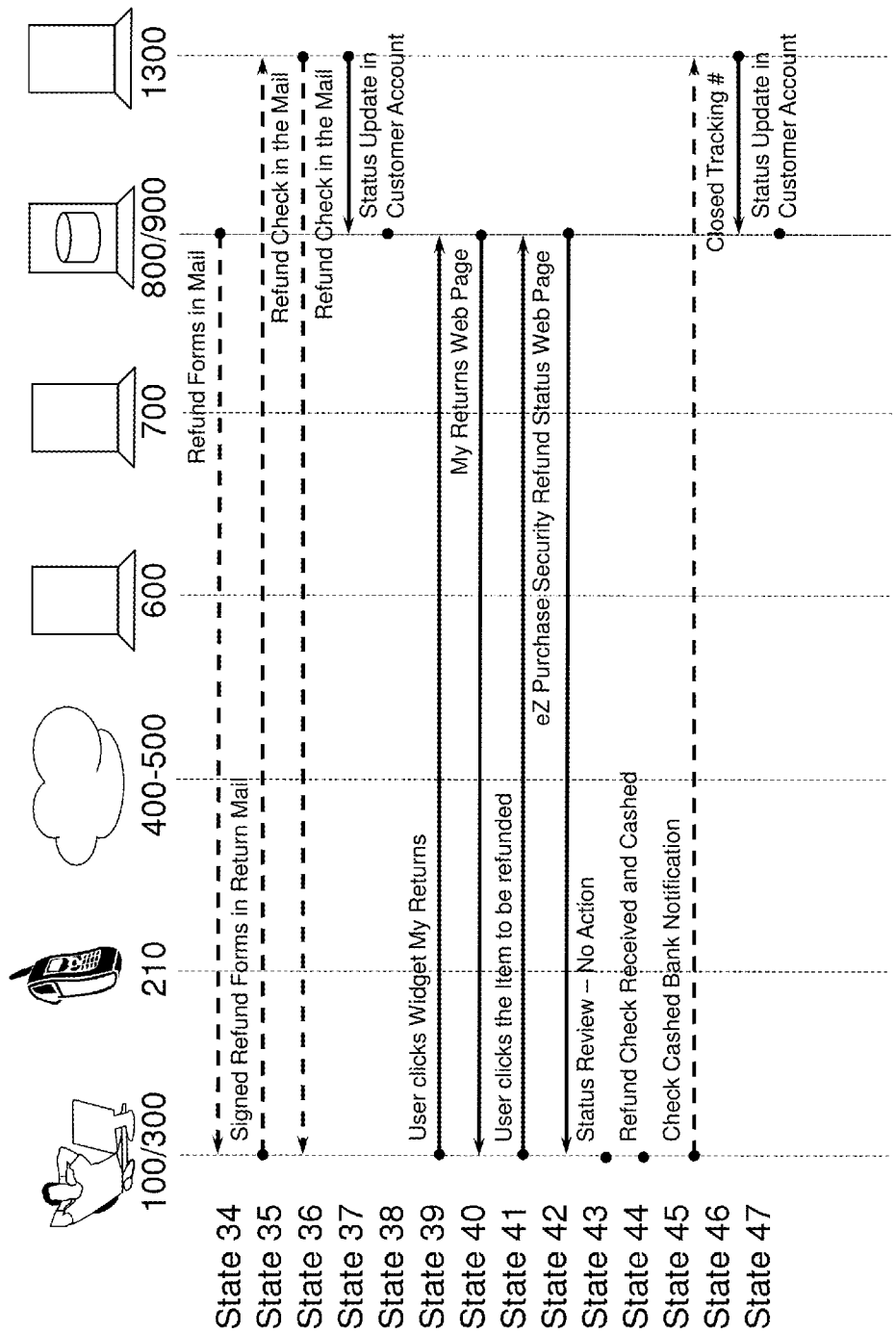
FIG. 46 illustrates the states thirty-four through forty-seven of an example operating environment/process for a Claims Management system.

Lastly, FIGS. 45-46 depicts the situation where the user's purchased item has been destroyed in a fire prior to the expiration of the credit card company's purchase security period. The user reviews their options and requests that the CM system assist them with requesting a refund from the credit card company.

First Example Embodiment of Receipt Capture

See FIG. 37

In this example, the user deploys a standard scanner 230 or digital camera 240 to capture an electronic image of their purchase receipts. PC connected scanner/camera types can optionally include a pull through scanner, a flatbed scanner, a handheld scanning wand, a fax machine, a mobile phone camera, a digital camera, etc. Purchase item selection is managed by client software 300 that runs on the user's PC 100.

State 1 of FIG. 37. The user accesses the Claims Management (CM) service provider web site. In this example, the user browses to the CM web site using a PC 100 connected to data network 400. Optionally, any data networking capable device can be used by the user including for example, a mobile phone with data networking capabilities.

State 2. The CM service provider's web hosting server 800 receives the web page URL and presents a login/registration web page to the user.

State 3. The user fills in the user ID and password fields in the web form and clicks a register and/or download button. Optionally, the user is requested to enter their major credit card information. The credit card information is optionally not used for billing but rather for determining features of the user's credit card service.

State 4. The hosting web server 800 receives the information entered by the user and in this example creates a new customer account in the Claims Manager Database 900. In this example, one or more software programs 300 are next downloaded from the CM server 600 over the data network 400 and installed on the user's PC 100. These application programs 300 can be native client software, web browser plug-ins, or a standalone widget/gadget.

State 5. The web server 800 notifies the user over the data network 400 at the PC 100 that the software program download (e.g., widget or gadget) is complete and provides instructions to the user on how to activate the software program 300.

State 6. The user follows the provided instructions to activate the downloaded software program 300 on their PC 100. The software 300 optionally acknowledges the activation by sending a message to the web server 800.

State 7. The CM server 800 records that the user account is operational and optionally causes a Welcome web page to be displayed on the user's PC 100. In addition, the client widget 300 is also launched (see FIG. 4, note a Welcome web page is not displayed in this example FIG. 4).

State 8. At some point in the future, the user purchases an item from a conventional bricks-and-mortar store (e.g. a kitchen faucet mounted water filter from a local hardware store). The user next optionally scans the merchant purchase receipt and (if separate) credit card slip into their PC 100 where they are optionally stored in a folder C:\MyDocuments\eZReturns\ScannedFiles 5100 (see FIG. 5). In this example, the scanned receipt is labeled CM_2008-04-29-1.pdf 5200.

State 9. The user then optionally drags-and-drops the scanned image file 5200 onto the widget 6100 running on their desktop (see FIG. 6). This causes the widget 6100 to transmit the scanned image file 5100 of the purchase receipts along with any and all necessary user account login and password information to the CM server 800. The widget display 6100 notifies the user that information processing is under way and that they should wait a moment before proceeding further. Alternatively, the user emails the scanned image of their receipts to the CM provider server 800 and adds their login credentials/account information to the email body or subject line. In another alternative embodiment, the user faxes a copy of the receipt to the CM service provider's Phone Server 600 with user account information on an attached cover page.

State 10. The CM web server 800 optionally forwards the receipt image file on to the DSP server 700 for image processing.

State 11. The scanned receipt is optionally converted into a text document by the DSP servers 700 which it returns to the web 800.

State 12. The CM server 800 optionally parses the text document to extract key parameters about the purchase. The server 800 then optionally stores the receipt image and its extracted text fields in the registered customer's account in the CM database 900 or server file system. The web server 800 next optionally creates a rendition of a list of the purchased items from the extracted information which it transmits to the user's widget 300. Purchased items are listed on the form for the user to review.

State 13. Upon receipt of the rendition, the widget 300 optionally changes its display mode (e.g., visually flips over) and displays the text-based purchased item list 7100 (see FIG. 7) and prompts the user to select individual items that are to be organized, stored, and tracked by the Claims Manager. The user clicks the desired check boxes 7300 and the widget 7000 optionally immediately transmits the user's item selections to the server 800 for additional processing.

Alternatively, the CM server 800 analyzes the receipt image and extracted text and automatically selects items to be managed. Optionally, the user then confirms or edits the system's suggestions. For example, a dollar threshold is established and any item on the receipt with a price greater than the threshold is automatically selected. Or, a user highlights on the receipt those items the CM system is to track.

State 14. Upon receipt of the selected purchase list item, the web server 800 performs a database conversion/lookup using the received brief description of the purchase item on the receipt and/or the associated merchant SKU and purchase price to determine the product manufacturer and model. In addition, the CM system 1000 creates a user friendly generic description of the product name (e.g. a "faucet water filter" is the user friendly description for the terse abbreviation "FCT FLTR" extracted from the sales receipt). The web server 800 transmits the additional purchased item details to the widget for display.

State 15. Upon receipt of the new information, the widget 300 inserts the additional details 8130, 8140, and 8150 (see FIG. 8) into the display and updates the user instruction panel 8200. The user is instructed to select additional purchase items as appropriate 8110 and to review and correct the product name as it is updated in the widget display 8000. When the user has completed their selection and review, they submit the final list by clicking the submit button 8700. This causes the widget to return the entire list including user corrections to the server 800.

State 16. Upon receipt of the updated list from the widget 300, the server 800 optionally parses the selected items and records them in the customer database 900. The server 800 optionally analyzes the OCR output of the merchant receipt and queries one or more databases to collect price protection, warranty, and product loss insurance (purchase security), related information associated with the items selected by the user In this example, the server 800 optionally further analyzes the receipt and/or queries a database to determine if there is a merchant policy regarding returns. As can be seen in the example receipt in FIG. 2, the merchant's return policy 2600 on the receipt is ninety days. The return policy of the item is recorded in the customer account database.

The server 800 also optionally queries one or more databases to determine if there is a manufacturer's warranty with respect to the selected item. In this example, there is a six month manufactures warranty. The terms of the manufacturer's warranty are stored in the customer account database 900.

The server 800 optionally further analyzes the receipt to determine if an extended warranty was purchased at the same time as the item was purchased. Optionally during state 13, the widget 300 requires the user to identify selected items for which an extended warranty or service contract was purchased with the item. In this example, no extended warranty was purchased.

The server 800 optionally further analyzes the receipt to determine if the purchase transaction was made using a major credit card. If so, the credit card number (or last 4 digits) is compared with the credit card numbers stored in the account database. In this example, a match is found and the credit card provides an extended warranty (doubling of the manufacturer's warranty). The terms of the extended warranty are stored in the customer account database.

In addition, some credit card services provide price protection and purchase security product loss insurance. The server 800 optionally queries one or more databases to determine if the merchant provides price protection and product loss insurance (purchase security). If so, this information is also recorded in the customer's account 900.

For each item identified above, the CM server 800 optionally creates a series of notification events. In this example, the user selected the option to be text notified to his/her mobile device one week prior to the expiration of any warranty and upon warranty expiration. In addition, they requested to be informed when a price protection refund greater than $5.00 is available. When a condition is triggered, the CM server 800 sends an SMS text message to alert the user. Other users can select to be notified by Email or by receiving a phone call with an appropriate audio message.

The web server 800 notifies the user that the selected items have been successfully processed by sending a confirmation message to the widget 300.

State 17. Upon acknowledgement of the completion of warranty item selection and recording, the widget 300 optionally returns to its idle display state 4000 (see FIG. 4).

Second Example Embodiment of Receipt Capture

See FIG. 38

In this example, the user deploys a standard scanner 230 or digital camera 240 to capture an electronic image of their purchase receipts. No client software 300 is required in this example. Purchase item selection is managed using a web browser that runs on the user's PC 100 to interface with the CM server 800.

State 1 of FIG. 38. The user accesses the CM service provider web site. In this example, the user browses to the CM web site using a PC 100 connected to data network 400. Optionally, any data networking capable device can be used by the user including for example, a mobile phone with data networking capabilities.

State 2. The CM service provider's web hosting server 800 receives the web page URL and presents a login/registration web page to the user.

State 3. The user fills in the user ID and password fields in the web form and clicks a register button. Optionally, the user is requested to enter their major credit card information. The credit card information is optionally not used for billing but rather for determining features of the user's credit card service.

State 4. The hosting web server 800 receives the information entered by the user and in this example creates a new customer account in the Claims Manager Database 900. The server 800 logs the user into their account and causes a Welcome web page 13000 (see FIG. 13) to be displayed on the user's PC 100.

State 5. At some point in the future, the user purchases an item from a conventional bricks-and-mortar store (e.g. a kitchen faucet mounted water filter from a local hardware store). The user next optionally scans the merchant purchase receipt and (if separate) credit card slip into their PC 100.

State 6. The user next clicks the My Receipts control 13900 on the Welcome web page 13000 (see FIG. 13).

State 7. The CM server 800 receives the My Receipts URL request from the user's browser and returns the My Receipts web page 9000 (see FIG. 9).

State 8. The user clicks the Add Receipt control 9510 on the My Receipts web page 9000 (see FIG. 9).

State 9. The CM server 800 causes a pop-up dialog box to be displayed on the user's PC screen to capture the file path name on the user's PC 100.

State 10. The user either directly enters the full scanned file path name or browses to its location using the pop-up dialog box. This causes the browser to upload the scanned image file to the CM server 800 over data network 400.

State 11. The CM web server 800 optionally forwards the receipt image file on to the DSP server 700 for image processing.

State 12. The scanned receipt is optionally converted into a text document by the DSP servers 700 which it returns to the web 800.

State 13. The CM server 800 optionally parses the text document to extract key parameters about the purchase. The server 800 then optionally stores the receipt image and its extracted text fields in the registered customer's account in the CM database 900 or server file system. The web server 800 next optionally creates a rendition of a list of the purchased items from the extracted receipt information which it causes to be displayed on the user's PC 100 on the Individual Receipt web page 10000 (see FIG. 10).

State 14. The user reviews the list and clicks the desired check boxes 10300 of purchased items that the user wants to be managed by the CM system 1000. The user's browser immediately transmits the user's item selections to the server 800 for additional processing.

State 15. Upon receipt of the selected purchase list item, the web server 800 performs a database conversion/lookup using the received brief description of the purchase item on the receipt and/or the associated merchant SKU and purchase price to determine the product manufacturer and model. In addition, the CM system 1000 creates a user friendly generic description of the product name (e.g. a "faucet water filter" is the user friendly description for the terse abbreviation "FCT FLTR" extracted from the sales receipt). The web server 800 transmits the additional purchased item details to the browser for display.

State 16. Upon receipt of the new information, the user's browser inserts the additional details 11330, 11340, and 11350 (see FIG. 11) into the displayed list and updates the user instruction panel 11320. The user is instructed to select additional purchase items as appropriate 11311 and 11312 and to review and correct the product name as it is updated in the displayed list 11360. When the user has completed their selection and review, they submit the final list by clicking the save link 11510. This causes the browser to return the entire list including user corrections to the server 800.

State 17. Upon receipt of the updated list from the browser, the server 800 optionally parses the selected items and records them in the customer database 900. The server 800 optionally analyzes the OCR output of the merchant receipt and queries one or more databases to collect price protection, warranty and product loss insurance (purchase security) and related information associated with the items selected by the user.

For each item identified above, the CM server 800 optionally creates a series of notification events. In this example, the user selected the option to be text notified to his/her mobile device one week prior to the expiration of any warranty and upon warranty expiration. In addition, they requested to be informed when a price protection refund greater than $5.00 is available.

The web server 800 notifies the user that the selected items have been successfully processed by causing the My Receipts web page 9000 (see FIG. 9) to be displayed by the user's browser. The newly added receipt is included in the now updated display.

Third Example Embodiment of Receipt Capture

See FIG. 39

In this example, the user deploys a smart mobile phone with digital camera 210 to capture an electronic image of their purchase receipts. Purchase item selection is managed by client software 300 that runs in the smart phone 210.

State 1 of FIG. 39. The user accesses the Claims Management (CM) service provider web site. In this example, the user browses to the CM web site using a PC 100 connected to data network 400. Optionally, any data networking capable device can be used by the user including for example, a mobile phone with data networking capabilities.

State 2. The CM service provider's web hosting server 800 receives the web page URL and presents a login/registration web page to the user.

State 3. The user fills in the user ID and password fields in the web form and clicks a register and/or download button. Optionally, the user is requested to enter their major credit card information. The credit card information is not used for billing but rather for determining features of the user's credit card service.

State 4. The hosting web server 800 receives the information entered by the user and in this example creates a new customer account in the Claims Manager Database 900. In this example, one or more software programs 300 are next downloaded from the CM server 800 over the data network 400 and wireless network 500 and installed on the user's mobile device 210.

State 5. The web server 800 optionally notifies the user over the data network 400 at the PC 100 that the software program download is complete and optionally provides instructions to the user on how to activate the software program 300.

State 6. The user follows the provided instructions to activate the downloaded software program 300 on their mobile device 210. The software 300 acknowledges the activation by sending a message to the web server 800.

State 7. The CM server 800 records that the user account is operational and optionally causes a Welcome message to be displayed on the user's smart mobile phone 210 under control from the downloaded phone software 300.

State 8. At some point in the future, the user purchases a kitchen faucet mounted water filter from a local hardware store. The user next photographs the merchant purchase receipt and (if separate) credit card slip using the camera in their mobile phone 210.

State 9. The user launches the downloaded software 300 on their mobile phone 210 and the smart phone software 300 transmits the photo image of the purchase receipts along with any and all necessary user account login and password information to the CM server 800. The smart phone software 300 optionally notifies the user that information processing is under way and that they should wait a moment before proceeding further.

State 10. The CM server 800 optionally forwards the receipt image file on to the DSP server 700 for image processing.

State 11. The receipt photograph is optionally converted into a text document by the DSP servers 700 which is returned to the server 800.

State 12. The CM server 800 optionally parses the text document to extract key parameters about the purchase. The server 800 then optionally stores the receipt image and its extracted text fields in the registered customer's account in the CM database 900. The server 800 creates a rendition of a list of the purchased items from the extracted information which it transmits to the user's phone software 300.

State 13. The phone software 300 displays the text-based purchased item list and prompts the user to select individual items that are to be organized, stored, and tracked by the Claims Manager. The phone software 300 transmits the items selected by the user to the web server 800.

Alternatively, the CM server 800 analyzes the receipt image and extracted text and automatically selects items to be managed. Optionally, the user then confirms or edits the system's suggestions. For example, a dollar threshold is established and any item on the receipt with a price greater than the threshold is automatically selected. Or, a user highlights on the receipt those items the CM system is to track.

State 14. Upon receipt of the selected purchase list item, the server 800 performs a database conversion/lookup using the received brief description of the purchase item on the receipt and/or the associated merchant SKU and purchase price to determine the product manufacturer and model. In addition, the CM system 1000 creates a user friendly generic description of the product name. The server 800 transmits the additional purchased item details to the phone software for display.

State 15. Upon receipt of the new information, the phone software 300 inserts the additional details into the displayed list and updates user instructions on the phone display. The user is instructed to select additional purchase items as appropriate and to review and correct the additional new information as it is updated in the expanded list. When the user has completed their selection and review, they submit the final list by clicking a soft key on the smart phone display. This causes the phone software 300 to return the entire list including user corrections to the server 800.

State 16. Upon receipt of the updated list, the server 800 optionally parses the selected items and optionally records them in the customer database 900. The server 800 optionally analyzes the OCR output of the merchant receipt and optionally queries one or more databases to collect price protection and warranty related information associated with the items selected by the user.

The server 800 optionally further analyzes the receipt and/or queries a database to determine if there is a merchant policy regarding returns. In this example, the merchant's return policy is ninety days. The return policy of the item is recorded in the customer account database.

The server 800 also optionally queries one or more databases to determine if there is a manufacturer's warranty with respect to the selected item. In this example, there is a six month manufactures warranty. The terms of the manufacturer's warranty are stored in the customer account database 900.

The server 800 optionally further analyzes the receipt to determine if an extended warranty was purchased at the same time as the item was purchased. Optionally during state 13, the phone software 300 requires the user to identify selected items for which an extended warranty or service contract was purchased with the item. In this example, no extended warranty was purchased.

The server 800 optionally further analyzes the receipt to determine if the purchase transaction was made using a major credit card. If so, the credit card number (or last 4 digits) is compared with the credit card numbers stored in the account database. In this example, a match is found and the credit card provides an extend warranty (doubling of the manufacturer's warranty). The terms of the extended warranty are stored in the customer account database.

In addition, some credit card services provide price protection and product loss insurance. The server 800 optionally queries one or more databases to determine if the merchant provides price protection and product loss insurance. If so, this information is also recorded in the customer's account 900.

For each item identified above, the CM server 800 optionally creates a series of notification events. In this example, the user selected the option to be text notified to his/her mobile device one week prior to the expiration of any warranty and upon warranty expiration. In addition, they requested to be informed when a price protection refund greater than $5.00 is available. When an alarm condition is triggered, the CM server 800 sends an SMS text message to alert the user.

The server 800 optionally notifies the user that the selected items have been successfully processed by sending a confirmation message to the phone software 300.

State 17. Upon acknowledgement of the completion of warranty item selection and recording, the phone software 300 optionally returns to its idle display state 4000.

Optionally, the receipt rendition display and item selection described in States 13-15 is performed on a desktop widget user interface or a browser interface.

Fourth Example Embodiment of Receipt Capture

See FIG. 40

In this example, the user purchases or leases a special purpose receipt scanner 250 with preinstalled software from the CM service provider which is cable or wifi connected to the user's Internet connection. Purchase item selection is managed by client software 300 that runs in the special purpose scanner 250.

State 1 of FIG. 40. The user accesses the Claims Management (CM) service provider web site. In this example, the user browses to the CM web site using a PC 100 connected to data network 400. Optionally, any data networking capable device can be used by the user including for example, a mobile phone with data networking capabilities.

State 2. The CM service provider's web hosting server 800 receives the web page URL and presents a login/registration web page to the user.

State 3. The user fills in the user ID and password fields in the web form and clicks a register button. Optionally, the user is requested to enter their major credit card information. The credit card information is not used for billing but rather for determining features of the user's credit card service.

State 4. The hosting server 800 receives the information entered by the user and in this example creates a new customer account in the Claims Manager Database 900.

States 5-7. Because the scanner 250 comes with preinstalled software 300, these states are not required in this scenario.

State 8. At some point in the future, the user purchases a kitchen faucet mounted water filter from a local hardware store. The user next scans the merchant purchase receipt and (if separate) credit card slip using the receipt scanner 250.

State 9. The user presses a record receipt button on the receipt scanner 250 and the software 300 running in the scanner 250 optionally transmits the scanned image of the purchase receipts along with any and all necessary user account login and password information to the CM server 800. The receipt scanner software 300 notifies the user that information processing is under way and that they should wait a moment before proceeding further.

State 10. The CM server 800 forwards the receipt image file on to the DSP server 700 for image processing.

State 11. The scanned receipt is optionally converted into a text document by the DSP servers 700 which is returned to the server 800.

State 12. The CM server 800 optionally parses the text document to extract key parameters about the purchase. The server 800 then optionally stores the receipt image and its extracted text fields in the registered customer's account in the CM database 900. The server 800 optionally creates a rendition of a list of the purchased items from the extracted information which it transmits to the user's receipt scanner software 300.

State 13. The receipt scanner software 300 displays the text-based purchased item list and prompts the user to select individual items that are to be organized, stored, and tracked by the Claims Manager. The scanner software 300 transmits the items selected by the user to the server 800.

Alternatively, the CM server 800 optionally analyzes the receipt image and extracted text and automatically selects items to be managed. Optionally, the user then confirms or edits the system's suggestions. For example, a dollar threshold is established and any item on the receipt with a price greater than the threshold is automatically selected. Or, a user highlights on the receipt those items the CM system is to track.

State 14. Upon receipt of the selected purchase list item, the server 800 optionally performs a database conversion/lookup using the received brief description of the purchase item on the receipt and/or the associated merchant SKU and purchase price to determine the product manufacturer and model. In addition, the CM system 1000 optionally creates a user friendly generic description of the product name. The server 800 optionally transmits the additional purchased item details to the receipt scanner software for display.

State 15. Upon receipt of the new information, the receipt scanner software 300 optionally inserts the additional details into the displayed list and updates user instructions on the scanner display. The user is instructed to select additional purchase items as appropriate and to review and correct the additional new information as it is updated in the expanded list. When the user has completed their selection and review, they submit the final list by clicking a soft key on the receipt scanner display. This causes the scanner software 300 to return the entire list including user corrections to the server 800.

State 16. Upon receipt of the updated list, the server 800 optionally parses the selected items and records them in the customer database 900. The server 800 optionally analyzes the OCR output of the merchant receipt and optionally queries one or more databases to collect price protection and warranty related information associated with the items selected by the user.

The server 800 optionally further analyzes the receipt and/or queries a database to determine if there is a merchant policy regarding returns. In this example, the merchant's return policy is ninety days. The return policy of the item is recorded in the customer account database.

The server 800 also optionally queries one or more databases to determine if there is a manufacturer's warranty with respect to the selected item. In this example, there is a six month manufactures warranty. The terms of the manufacturer's warranty are stored in the customer account database 900.

The server 800 optionally further analyzes the receipt to determine if an extended warranty was purchased at the same time as the item was purchased. Optionally during state 13, the scanner software 300 requires the user to identify selected items for which an extended warranty or service contract was purchased with the item. In this example, no extended warranty was purchased.

The server 800 further analyzes the receipt to determine if the purchase transaction was made using a major credit card. If so, the credit card number (or last 4 digits) is compared with the credit card numbers stored in the account database. In this example, a match is found and the credit card provides an extend warranty (doubling of the manufacturer's warranty). The terms of the extended warranty are optionally stored in the customer account database.

In addition, some credit card services provide price protection and product loss insurance. The server 800 optionally queries one or more databases to determine if the merchant provides price protection and product loss insurance. If so, this information is also optionally recorded in the customer's account 900.

For each item identified above, the CM server 800 optionally creates a series of notification events. In this example, the user selected the option to be text notified to his/her mobile device one week prior to the expiration of any warranty and upon warranty expiration. In addition, they requested to be informed when a price protection refund greater than $5.00 is available. When an alarm condition is triggered, the CM server 800 sends an SMS text message to alert the user.

The server 800 optionally notifies the user that the selected items have been successfully processed by sending a confirmation message to the receipt scanner software 300.

State 17. Upon acknowledgement of the completion of warranty item selection and recording, the scanner software 300 optionally returns to its idle state.

Optionally in the four examples above, the receipt OCR application runs on the user's desktop, phone, or receipt scanner and stores and organizes the information on the local device (desktop PC, phone, or receipt scanner). Also, optionally, the CM system notifies the user if one or more of the received receipts are unreadable.

Example Embodiment of Price Protection Sales Refund

Figure 41:
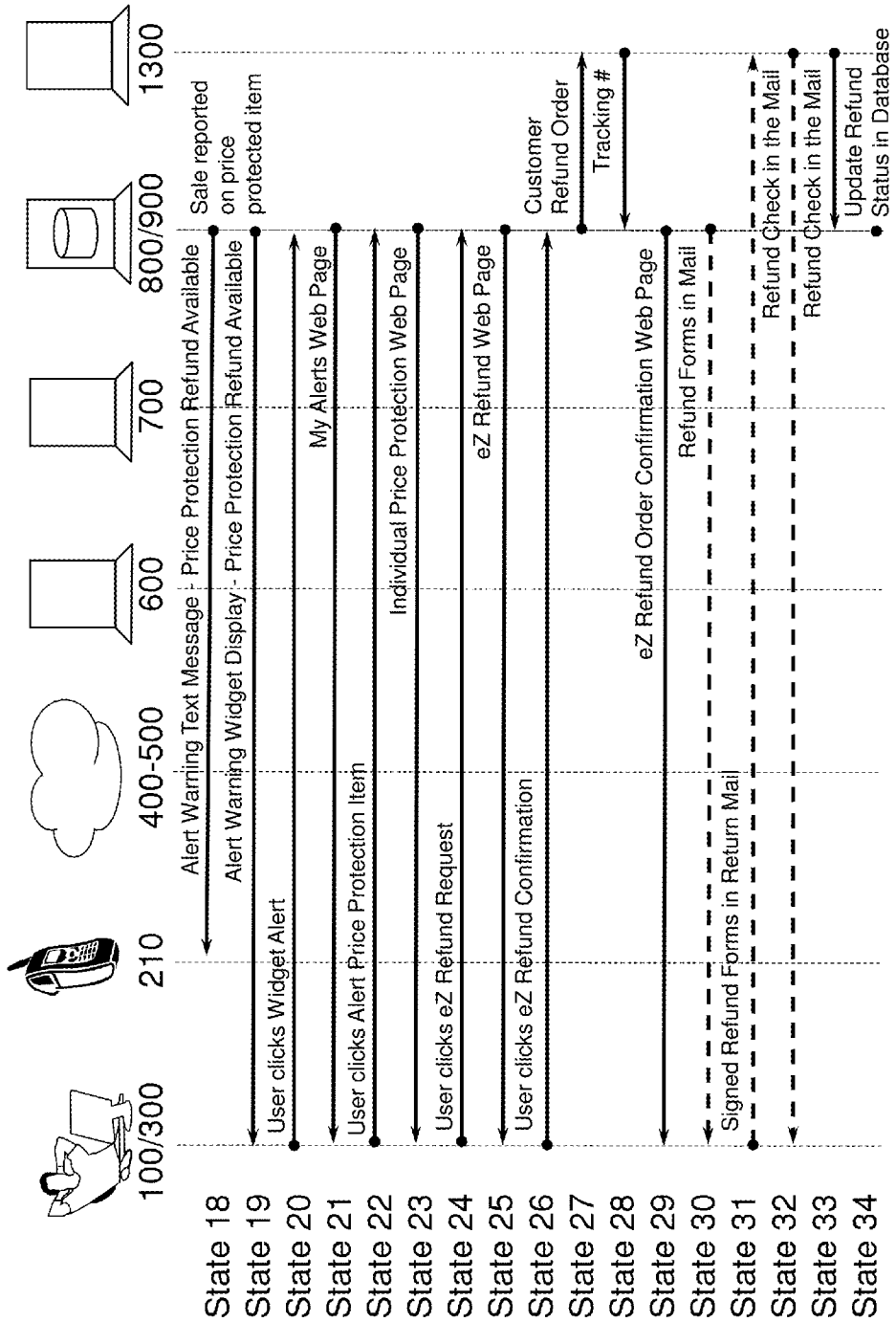
FIG. 41 illustrates an example set of states eighteen through thirty-four common to the first, second, third and fourth example operating environment/process for a Claims Management system.
Figure 42:
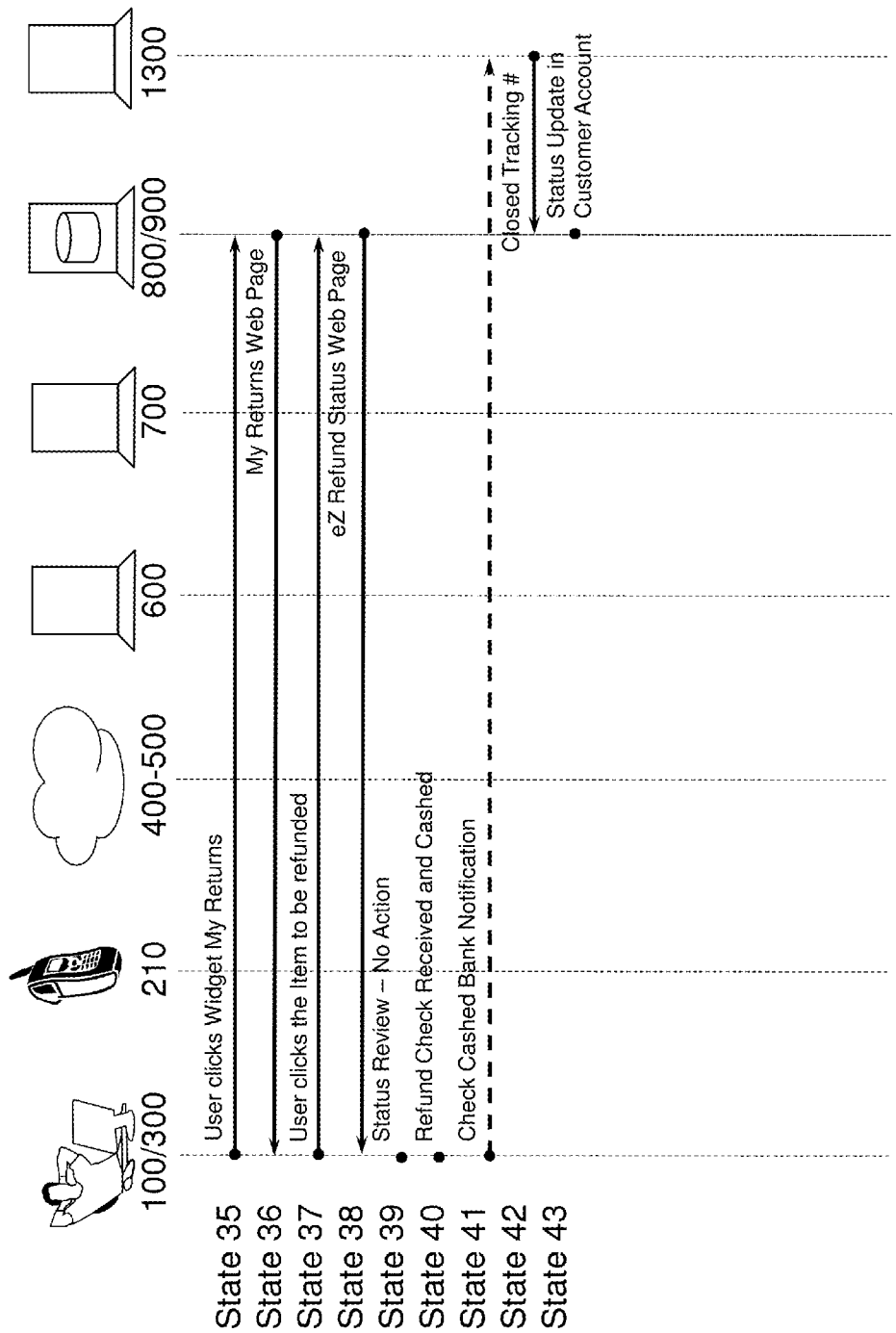
FIG. 42 illustrates the states thirty-five through forty-three of an example operating environment/process for a Claims Management system.

See FIGS. 41-42

In this example, one of the user's purchases (the lawn mower) has gone on sale at a local store near the user. The CM system 1000 alerts the user to the fact that their credit card service provides price protection and that a refund is available to them. The user views the price protection status and requests that the CM system 1000 process the refund for them. This example embodiment assumes the user previously scanned their lawn mower receipt and transferred it into the CM system 1000 for tracking using one of the example embodiment methods described above in FIGS. 37-40. The example further assumes that the CM system 1000 has a direct electronic interface with the credit card company to facilitate refund processing.

State 18 of FIG. 41. In this example, the user is sent a text message notification 12100 (see FIG. 12) from the CM system 1000 to alert them to the fact that a price protection refund is available to them from their credit card company.

State 19. The CM server 800 optionally activates the alert indicator on the widget 300 by sending it a message over data network 400. This causes the widget 300 display to illuminate the Alert indicator 12200 (see FIG. 12) in its display.

State 20. These alerts cause the user to follow-up. The user logs into his CM account by selecting the alert control 12200 (see FIG. 12) on the CM widget 300 running on the user's data terminal 100 (the user could have chosen an alternative method of access, for example, by selecting the "Price Protection" control 12300). In this example, the user's login credentials are transmitted to the server 800 by the desktop widget 300.

State 21. The server 800/widget 300 optionally causes a web browser to be launched on the data terminal 100 and the user's active alert notification status to be displayed.

FIG. 13 illustrates an example web page presentation of a CM alert status. In this example, the user has two active warnings—an impending warranty expiration warning 13400 and a price protection refund notification 13300.

State 22. The listed items are optionally active web links. The user selects the list item Lawn Mower 13300.

State 23. The server 800 looks up the selected item price protection status and causes a new web page to be displayed. FIG. 15 is an example web page illustrating the price protection status 15300 and associated steps 15400 specific to the lawn mower refund.

State 24. In this example, there is an option 15500 on the web page 15000 (see FIG. 15) for the CM service provider to assist the user in processing the item refund. In this example, the user selects the CM service provider eZ Refund option 15500.

State 25. Upon receipt of the request to assist in processing the eZ Refund, the server 800 optionally accesses the credit card refund instructions from the database 900, which it optionally sends to the user's terminal 100.

State 26. FIG. 16 displays an example web page illustrating the user instructions generated by the CM system associated with the assisted refund process. In this example, the user reads the instructions 16200, verifies the shipping address 16300 and approves the request for refund by clicking the confirm button 16500.

State 27. Upon receipt of the eZ Refund confirmation/request, the server 800 optionally generates the initial credit card refund documentation and optionally transmits it to the user's credit card company. In this example, the CM system 1000 has an electronic interface with the major credit card companies. The server 800 transmits a request to process a refund for this user for this item. In this example, the request includes the user's name, address, an electronic copy of the original receipt and an electronic copy of the sale brochure. Further in this example, the credit card company requires that the user review the documentation and approve it by signing the refund forms. Alternatively, the credit card company may not require the user's signature or may allow a previously recorded digital signature to be affixed to the forms by the CM system 1000 and submitted without additional user interaction. Optionally, or in addition, customer support personnel within the CM service provider contact the credit card company directly on behalf of the user.

State 28. The credit card company logs the refund request and optionally generates a tracking number which it returns to the CM server 800.

State 29. The CM server 800 optionally generates an internal CM system tracking number and optionally stores the refund status (including both tracking numbers) in the user's database records 900. The CM server 800 then optionally notifies the user that the process is successfully underway via an eZ Refund confirmation web page (see FIG. 17). Optionally, the confirmation web page includes a CM system tracking number.

State 30. The CM server 800 optionally completes the required credit card eZ refund forms and mails them to the user for their review and signature.

State 31. The user receives the completed forms, signs them and returns them in the self addressed stamped envelope.

State 32. The credit card company receives the completed refund forms from the user, processes the request, and issues a refund check to the user. Alternatively, the refund amount can be credited to the user's credit card account.

State 33. The credit card company then sends an electronic message to the CM server 800 to report the progress in the refund process.

State 34. The CM server 800 optionally updates the user's refund status in the database 900.

State 35 of FIG. 42. In this example, the user has not yet received their refund check. The user queries the CM system 1000 to determine the status of his/her request by clicking the My Returns link 4800 (see FIG. 4) in the widget 300 display.

State 36. The server 800 queries the database 900 to determine the status of all outstanding returns and refunds and displays the result in a web page on the user's PC 100 (see FIG. 30).

State 37. The user reviews the return and refund status and requests additional detail on the price protection refund status of the lawn mower by clicking link the lawn mower link in the list of items 30300.

State 38. The server 800 optionally displays the status of the selected price protection refund on a web page 31000 (see FIG. 31) on the user's PC 100.

State 39. The user is satisfied with the progress of the refund and takes no further action.

State 40. Several weeks later the user receives and cashes their refund check.

State 41. The credit card company is notified that their refund check has been cashed.

State 42. The credit card company closes out the refund request (open tracking ticket) and sends an electronic notification to the CM provider that the refund check has been cashed by the user.

State 43. The CM service provider optionally updates the user's account with the refund status and closes the open case and associated tracking number. The CM provider database 900 is also optionally updated with data associated with the refund (e.g., length of processing, amount of refund, etc.) for post transaction data mining and processing.

Example Embodiment of Warranty Return

See FIGS. 43-44

In this example, one of the user's purchases (the faucet water filter) is cracked and has been dripping for several months. The CM system 1000 alerts the user to the fact that the manufacturer's warranty period is nearly up. The user investigates the manufacturer's warranty return policy and requests that the CM system 1000 assist them in replacing the faulty unit with a new one. The example assumes that the CM system 1000 does not have a direct electronic interface with the manufacturer to facilitate the warranty return processing.

State 18 of FIG. 43. In this example, the user was sent Email message alerts from the CM system 1000 a week prior to and immediately after the expiration of the merchant return period. The product was working fine at the time and so the user ignored the messages and took no action. The user is now being sent another Email message alert that in one week the manufacturer's warranty period will be up.

State 19. The CM server 800 optionally activates the alert indicator on the widget 300 sending it a message over data network 400. This causes the widget display 4000 to illuminate the Alert indicator 4200 (see FIG. 4) in its display.

State 20. These alerts cause the user to recall that the faucet water filter has been leaking. The user logs into his/her CM account by selecting the My Warranties control 4600 (see FIG. 4) on the CM widget display 4000 running on the user's data terminal 100. In this example, the user's login credentials are transmitted to the server 800 by the desktop widget 300.

State 21. The server 800 causes a web browser to be launched on the data terminal 100 and the user's current warranty status to be displayed. FIG. 18 illustrates an example web page presentation of a CM warranty status.

State 22. The listed items are active web links. The user selects the item faucet water filter from the list 18200.

State 23. The CM server 800 looks up the selected item warranty status and causes a new web page to be displayed.

State 24. FIG. 19 displays an example web page illustrating the warranty status (19210, 19220, 19230, and 19240) and associated user return steps 19300 specific to the faucet water filter return. In this example, there is an option for the user to update 19700 the CM records after manually completing the Do-It-Yourself (DIY) return process. Further in this example, there are also options 19400 and 19500 on the web page 19000 for the CM service provider to assist the user in processing the item return. In this example, the user selects the CM service provider eZ Return option 19400.

State 25. Upon receipt of the request to assist in processing the eZ Return, the server 800 accesses the assisted version of the manufacturer's warranty return instructions from the database 900, which it sends to the user's terminal 100.

State 26. FIG. 20 displays an example web page illustrating the user instructions 20200 generated by the CM system associated with the assisted return process. In this example, the user reads the instructions, verifies the shipping address 20300 and approves the shipping charges to be placed against their credit card by clicking the confirm button 20600.

State 27. The CM server 800 optionally generates a CM system internal tracking number and optionally logs the return status (including the tracking number) in the user's database records 900. In this example, the CM server 800 then places a $4.95 charge on the user's credit card and notifies the user that the process is successfully underway via an eZ Return confirmation web page (see FIG. 21).

State 28. The CM server 800 then optionally completes the required manufacturer's warranty return claim forms and mails them to the user for their review and signature.

State 29. The user receives the completed claim forms, signs them and returns them in the self addressed stamped envelope.

State 30. The CM system 1000 receives the signed claim forms, forwards them to the manufacturer, and optionally updates the warranty return status in the user's database record 900.

State 31. In this example, upon receipt of the signed warranty return claim form from the CM server 800, the manufacturer of the faucet water filter processes the request, assigns a Return Material Authorization (RMA) number, sends a new faucet filter to the user, and charges the CM provider for shipping and handling.

State 32 of FIG. 44. In this example, the user has not yet received the new filter. The user queries the CM system 1000 to determine the status of his request by clicking the My Returns link 4800 (see FIG. 4) in the widget 300 display.

State 33. The server 800 queries the database 900 to determine the status of all outstanding returns and refunds and displays the result in a web page on the user's PC 100 (see FIG. 30).

State 34. The user reviews the return and refund status and requests additional detail on the warranty return status of the faucet water filter by clicking the Faucet Water Filter link 30300.

State 35. The server 800 optionally displays the status of the selected warranty return on a web page 32000 (see FIG. 32) on the user's PC 100.

State 36. The user is satisfied with the progress of the return and takes no further action.

State 37. Several weeks later the user receives a repair kit from the manufacturer (this may be a new filter or replacement parts). The user repairs/replaces the defective filter.

State 38. The user return mails the defective parts to the manufacturer.

State 39. A week later the filter manufacturer receives the defective filter from the user and closes their warranty RMA ticket.

State 40. Four weeks after mailing the warranty forms to the manufacturer, the CM server 800 sends an Email notification to the user to alert them to the fact that they should have received the replacement kit by now. The user is given a toll free CM system telephone number to call if they have not yet received the replacement kit.

State 41. Since the user has received the replacement kit, they discard the Email message and take no further action.

State 42. Six weeks after mailing the warranty forms to the manufacturer, the CM server 800 optionally sends an Email notification to the user to alert them to the fact that they should have returned the defective parts by now. They are also warned that if the manufacturer does not receive the returned defective parts within the next two weeks that they will be charged full price for a new filter. The user is optionally given a toll free CM system telephone number to call if they are having problems.

State 43. Since the user is not having problems, they discard the Email message and take no further action.

State 44. Nine weeks after mailing the warranty forms to the manufacturer, the CM server 800 closes out the open CM system warranty return tracking ticket and optionally sends an Email notification to the user to alert them to the fact that if the manufacturer has not received the returned defective parts by now that they will be charged full price for a new filter. The user is optionally given a toll free CM system telephone number to call if they are having problems.

State 45. Since the user is not having problems, they discard the Email message and take no further action.

Example Embodiment of Purchase Security Reimbursement

See FIGS. 45-46

In this example, one of the user's purchases (the lawn mower) has been destroyed in a fire. The user logs into the CM system 1000 to determine if their credit card service provides purchase security and whether a loss replacement refund is available to them. The user views the purchase security status and, determining that a refund is available, requests that the CM system 1000 assist them in processing the refund request with their credit card company. This example embodiment assumes the user previously scanned their lawn mower receipt and transferred it into the CM system 1000 for tracking using one of the example embodiment methods described above in FIGS. 37-40. The example further assumes that the CM system 1000 has a direct electronic interface with the credit card company to facilitate the reimbursement processing.

State 18 of FIG. 45. In this example, the user checks the CM system 1000 to determine if a purchase security reimbursement is available to them from their credit card company by clicking the My Purchase Security control 4700 on the widget display 4000 (see FIG. 4). The widget 300 transmits this request, along with the user's login credentials to the server 800 over a data network 400.

State 19. The server 800 logs the user into their CM account, looks up their current purchase security status in the database 900, and returns a web page display of that status (see FIG. 26).

State 20. The listed items in the display 26300 are active web links. The user selects the list item Lawn Mower, causing a new web page URL request to be sent to the CM server 800.

State 21. The server 800 looks up the selected item's purchase security status and causes a new web page to be displayed. FIG. 27 is an example web page illustrating the detailed purchase security status 27300 and associated reimbursement instructions 27400 specific to the lawn mower purchase security refund available from their credit card company.

State 22. In this example, there is a control 27500 on the web page 27000 for the CM service provider to assist the user in processing the item refund. There is also a control 27600 to assist the user in the case where the purchased item is a gift. In this example, the user selects the CM service provider eZ Purchase Security option 27500.

State 23. Upon receipt of the request to assist in processing the eZ Purchase Security refund, the server 800 accesses the credit card purchase security instructions from the database 900, which it sends to the user's terminal 100.

State 24. FIG. 28 displays an example web page illustrating the user instructions 28200 generated by the CM system 1000 associated with the assisted purchase security refund process. In this example, the user reads the assisted refund instructions 28200, verifies the shipping address 28300, optionally reads the applicable Terms and Conditions by clicking the associated link 28400, and approves the request for refund by clicking the confirm button 28500.

State 25. Upon receipt of the eZ Purchase Security refund confirmation/request, the server 800 optionally generates the initial credit card purchase security reimbursement documentation and delivers it to the user's credit card company. In this example, the CM system 1000 has an electronic interface with the major credit card companies. The server 800 optionally transmits a request to process a purchase security refund for this user for this item. In this example, the request optionally includes the user's name, address, credit card number, and electronic copy of the original purchase receipt. Further in this example, the credit card company requires that the user review the documentation and approve it by signing the refund forms. Alternatively, the credit card company may not require the user's signature or may allow a previously recorded digital signature to be affixed to the forms by the CM system 1000 and submitted without additional user interaction. Optionally, or in addition, customer support personnel within the CM service provider contact the credit card company directly on behalf of the user.

State 26. The credit card company logs the refund request and generates a tracking number which it returns to the CM server 800.

State 27. The CM server 800 generates an internal CM system tracking number and logs the purchase security refund status (including both tracking numbers) in the user's database records 900. The CM server 800 optionally then notifies the user that the process is successfully underway via an eZ Purchase Security confirmation web page (see FIG. 29).

State 28. The CM server 800 optionally passes a message to the phone server 600 requesting that the user be contacted by phone and additional information be collected by an Interactive Voice Response (IVR) service.

State 29. The phone server 600 optionally calls the user phone number 210 and verbally queries the user with additional questions.

State 30. The user responds to the IVR questions using the phone keypad and/or spoken audio responses.

State 31. The phone server 600 optionally returns the IVR questions and associated responses to the CM server 800.

State 32. The CM server 800 optionally forwards the IVR files to the DSP server 700 for post processing.

State 33. The DSP server 700 optionally converts the audio questions and answers to an equivalent textual rendering and returns these results to the CM server 800.

State 34 of FIG. 46. The CM server 800 optionally records the addition questions and answers in the user's database account 900, completes the required credit card eZ Purchase Security refund forms, and mails them to the user for their review and signature.

State 35. The user receives the completed forms, signs them and returns them in the self addressed stamped envelope.

State 36. The credit card company receives the completed refund forms from the user, processes the request, and issues a refund check to the user. Alternatively, the refund amount can be credited to the user's credit card account.

State 37. The credit card company then sends an electronic message to the CM server 800 to report the progress in the reimbursement process.

State 38. The CM server 800 optionally updates the user's reimbursement status in the database 900.

State 39. In this example, the user has not yet received their refund check. The user queries the CM system 1000 to determine the status of his request by clicking the My Returns link 4700 (see FIG. 4) in the widget 300 display.

State 40. The server 800 optionally queries the database 900 to determine the status of all outstanding returns and refunds and optionally displays the result in a web page on the user's PC 100 (see FIG. 30).

State 41. The user reviews the return and refund status and requests additional detail on the purchase security refund status of the lawn mower by clicking the Lawn Mower item in the list 30300.

State 42. The server 800 optionally displays the status of the selected purchase security reimbursement on a web page 33000 (see FIG. 33) on the user's PC 100.

State 43. The user is satisfied with the progress of the refund and takes no further action.

State 44. Several weeks later the user receives and cashes their refund check.

State 45. The credit card company is notified that their refund check has been cashed.

State 46. The credit card company closes out the refund request (open tracking ticket) and sends an electronic notification to the CM provider that the refund check has been cashed by the user.

State 47. The CM service provider optionally updates the user's account with the refund status and optionally closes the open case and associated tracking number. The CM provider database 900 is also optionally updated with data associated with the refund (e.g., length of processing, amount of refund, etc.) for post transaction data mining and processing.

Embodiments of the CM system also provide methods and system to enable a service provider to offer sales refund (price protection), warranty return and loss reimbursement (purchase security) facilitation services when a user purchases an item as a gift. Merchants, manufacturers, and extended warranty providers have different policies regarding the handling of refunds, returns and reimbursements which may require the gifted party's involvement in the handling of any return or refund as described below.

If an item is purchased as a gift, later malfunctions, and the return is managed by the original buyer, the state flows described above are not changed and there is limited involvement on the part of the gifted party. The user queries the system for warranty status and either submits a return directly to the merchant, manufacturer, or extended warranty provider or requests the CM to facilitate the return using the eZReturns process. The user/buyer will likely need to return the malfunctioning item and pay for any incidental costs (e.g., shipping and handling).

If an item is purchased as a gift, later malfunctions, and the return is managed by the gifted party, the state flows described above are changed. In the case of a merchant return for example, the user/buyer can optionally print (or email) the "Do-it-Yourself" instructions and merchant receipt and give them to the gifted party to return to the merchant. Some merchants may require the original buyer to be present along and with their original credit card.

In the case of an item purchased as a gift that later malfunctions during the manufacturer's warranty period, the user/buyer can optionally print (or email) the "Do-it-Yourself" instructions and merchant receipt and give them to the gifted party. Optionally, the gifted party can use the eZReturn method but the buyer would need to provide the gifted party with access to the CM system by creating a guest-account. A guest-account is created by the user selecting the "Gift eZReturn" control 19500 in FIG. 19. The CM system displays a web page 23000 (see FIG. 23) prompting the user/buyer to create a unique user login identification (User ID) 23200 and password 23300 for the gifted party. Once a guest identification and password is created, the user selects the submit control 23400 which causes a transmission of the login credentials to the server 800 over a data network 400 and a guest account linked to the user/buyer is created in the CM system database 900. The guest account is linked to a specific item 23500 (e.g., Faucet Water Filter). Optionally, the example user interface shown in FIG. 23 includes a collection of website common controls including branding, an alert/notifier, and contact and help information links.

Figure 24:
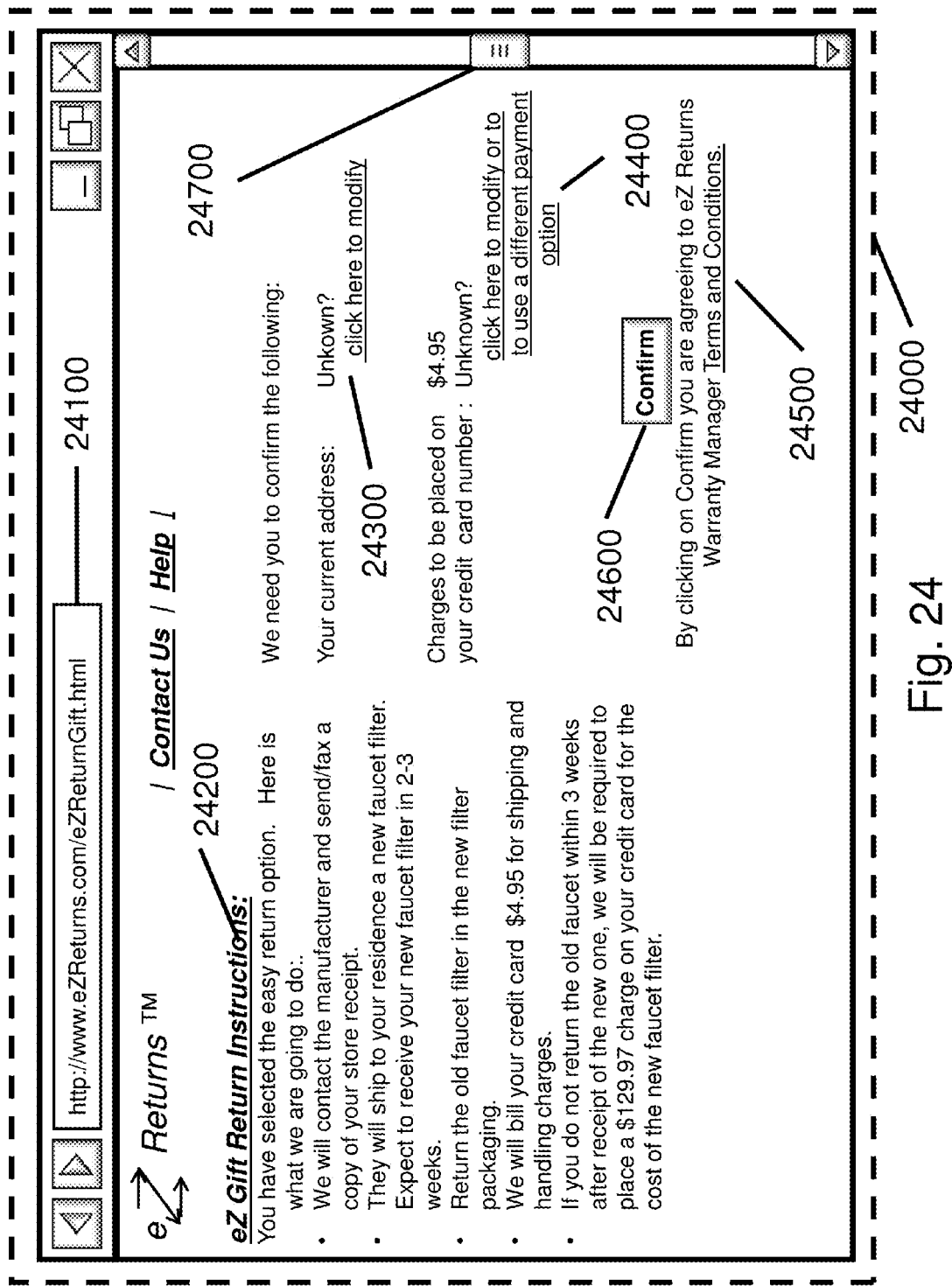
FIG. 24 illustrates another example Web-based user interface displaying an example guest account warranty return instructions.

In an example embodiment, when the gifted party logs into the CM system using a data terminal 100 over a data network 400, a web page 24000 is displayed. FIG. 24 illustrates another example user interface 24000 presented via a browser (or other interface application). The web page can optionally be accessed by selecting a control on a widget/gadget application program, by supplying the appropriate Uniform Resource Locator (URL) to the browser, by selecting a link in response to a search query, by logging in using guest account credentials, or the like. The example user interface provides an optional CM assisted warranty return for a gifted party. The gifted party is provided with instructional steps 24200 they must follow along with a confirmation control 24600. Optionally, if the gifted party does not confirm, the CM system will not process the return. Optionally, the browser user interface display includes a collection of web-site common controls including branding and help information links. Optionally, if there are more user instructions than can fit in a single web page view, the browser includes a scroll control 24700. Optionally, the user interface instructions do not initially include the gifted party's current address. The gifted party optionally must select the modify current address control 24300 which causes a new web page to be displayed with current address editable fields. Optionally, the user interface display initially does not include a payment method. The gifted party optionally must select the modify payment method control 24400 which causes a new secure web page to be displayed with credit card entry fields (or other payment options available to the user). Optionally, the user interface includes a link 24500 to the CM provider's general terms and conditions or specific terms and conditions for processing a return. Lastly, this example user display includes a confirmation control 24600 which when selected by the gifted party sends a confirmation request to the CM system over the data network 400 to the server 800 to process the return.

Figure 25:
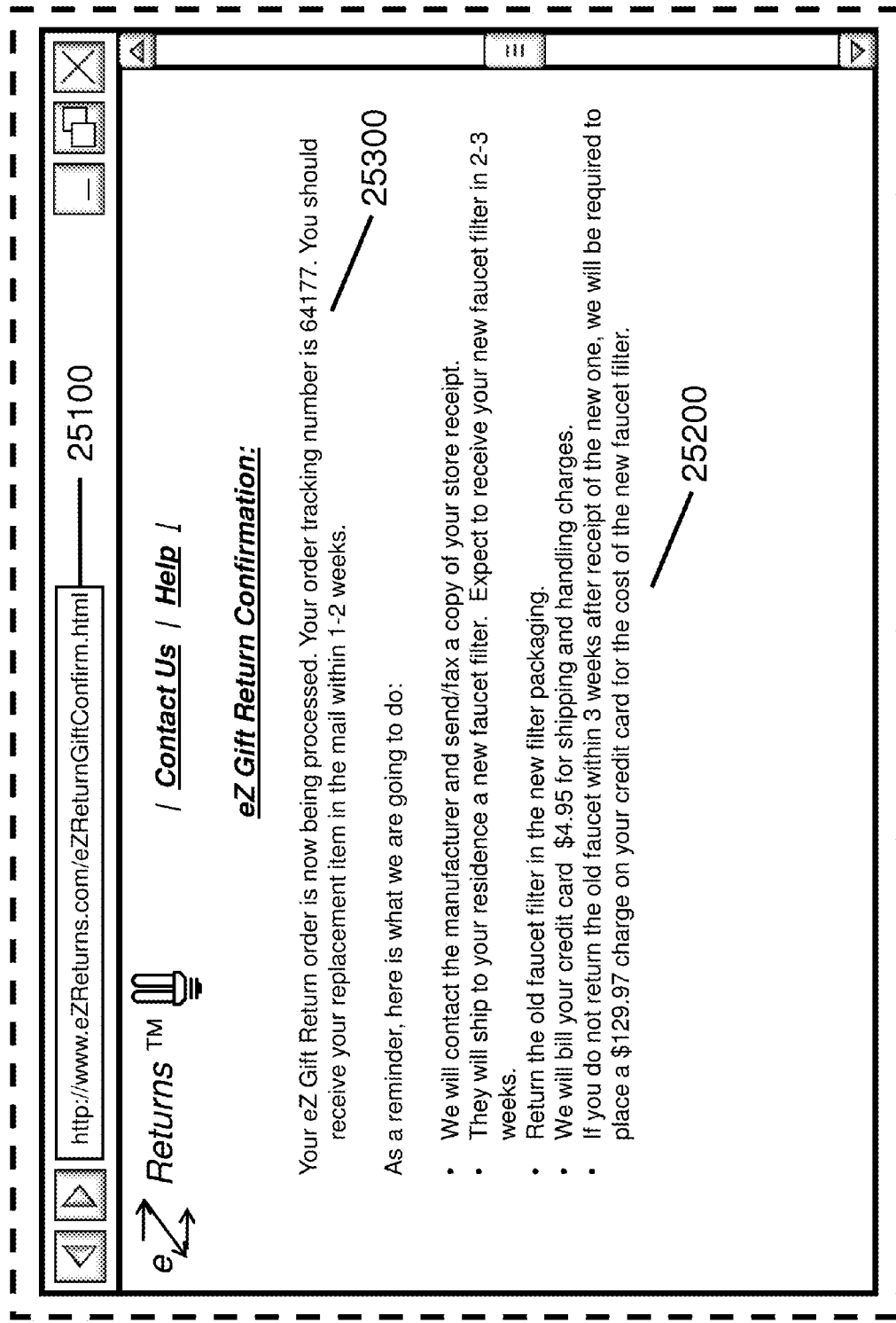
FIG. 25 illustrates another example Web-based user interface displaying an example guest account confirmation page.

FIG. 25 is an example confirmation web page display 25000 in response to a user selecting the confirmation control 24600 in FIG. 24. In this example user interface, the instructions 24200 are repeated from FIG. 24 and a confirmation message 25200 is displayed. Optionally, the CM system generates a warranty return tracking number 25300 which is included in the confirmation message 25200.

In the case of an item purchased as a gift which later malfunctions during the extended warranty period, in most cases the claim will have to be processed by the original buyer. Optionally, Extended Warranty provider's return and reimbursement policies are compiled and stored in the CM system. If the extended warranty provider allows the gifted party to manage the claim, then the CM system can provide for an optional guest-account capability as detailed above in FIGS. 24 and 25 descriptions.

Embodiments of the CM system also provide methods and system to enable a service provider to offer sales refund (price protection), warranty return and loss reimbursement (purchase security) facilitation services when a user purchases an item online. Conventionally, when an item is purchased an order confirmation and/or receipt is emailed to a user/buyer. The user can forward the electronic order confirmation and/or receipt to a designated email address (e.g., OnlineOrders@eZReturns.com) hosted by the CM system. Optionally, the user is further requested to designate their CM system user identification in the subject or message body field. The CM system will parse the incoming email and create a textual receipt rendition optionally listing the purchased items, price, common name, manufacturer, and make/model number similar to the receipt renditions illustrated in FIGS. 7 and 11. Optionally, if the CM system is unable to automatically determine the necessary information for storing and tracking an online receipt, the output from the CM system may be routed to CM service personnel for review and/or manual data entry. Optionally, an incomplete data transaction may cause the CM system to route a response email to the user/buyer to complete the data entry (e.g., by providing a link in the response email enabling the user to access a partially completed Price Protection/Warranty/Purchase Security form). Optionally, other methods of online receipt capture can be employed. For example, a user can print and fax their online purchase receipt or order confirmation. Similar to the process described above, the CM system can OCR the inbound facsimile to collect the user's account information and warranty/price protection data. If the OCR output is incomplete and/or of low confidence, the facsimile is routed to a human operator. Alternatively, the CM system automatically routes an email or sends a fax (e.g., to the fax number associated with a user's profile or to the calling fax number) requesting additional information as described above.

These example embodiments have illustrated methods and systems for facilitating the management of claims associated with products purchased by a user.

In addition, it should be understood that certain variations and modifications of the systems and processes described herein would suggest themselves to one of ordinary skill in the art. The scope of the present invention is not to be limited by the illustrations or the foregoing descriptions thereof.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of facilitating warranty monitoring and claims processing comprising:
providing a warranty monitoring and claims processing software program associated with a warranty monitoring and claims processing system to a mobile device associated with a first user;
providing to the first user from the warranty monitoring and claims processing software program, instructions directing the first user regarding how to select some or all items to be monitored from a one or more purchase receipts;
receiving at the warranty monitoring and claims processing software program, a first image wherein the first image is taken using the first user's mobile device and the first image includes a picture of one or more purchase receipts of one or more items purchased by the first user at a first merchant;
determining at least in part from the first image by the warranty monitoring and claims processing system, a first list of one or more items purchased by the first user at the first merchant wherein the first list of purchased items includes a purchase price per item;
recording in computer readable memory, the first list of purchased items;
determining at least in part from the first image by the warranty monitoring and claims processing system, a first user selection of one or more items from the first list of purchased items;
determining, for each item selected from the first list of purchased items, if there is at least a one low price guarantee period, and if there is at least one low price guarantee period, then determining a duration for each of the said low price guarantee periods at least in part by accessing (a) information recorded in the warranty monitoring and claims processing system computing device, (b) over a data network coupled to the warranty monitoring and claims processing system computing device information stored by the first merchant (c) over the data network coupled to the warranty monitoring and claims processing system computing device information stored by a low price guarantee provider, (a) and (b), (a) and (c), (b) and (c), or (a) and (b) and (c);
recording in computer readable memory, for each item selected, the determined one or more low price guarantee periods;
providing by the warranty monitoring and claims processing system computing device, a user interface wherein the first user can view a low price guarantee status for each item selected from the first list of purchased items wherein the low price guarantee status includes a current position within the low price guarantee period if at least one of the low price guarantees for the selected item is currently active;
receiving at the warranty monitoring and claims processing system, a second image wherein the second image is taken using a mobile device of a second user and the second image includes a picture of one or more purchase receipts of one or more items purchased by the second user at the first merchant or at a second merchant;
determining at least in part from the second image by the warranty monitoring and claims processing system, a second list of one or more items purchased by the second user at the first merchant or at a second merchant wherein the second list of purchased items includes a purchase price per item;
recording in computer readable memory, the second list of purchased items;
comparing by the warranty monitoring and claims processing system computing device, the purchase price for each selected item from the first list of purchased items if at least one of the low price guarantees for the selected item is currently active wherein the comparison is based at least in part on prices of the selected items at the first merchant, at the second merchant, or at a third merchant;
providing by the warranty monitoring and claims processing system computing device, a low price guarantee notification to the first user if a one or more of the comparisons detects that a selected item from the first list of purchased items was purchased by the first user at a higher price than the prices of the selected items at the first merchant, at the second merchant, or at a third merchant during one or more of the associated low price guarantee periods;

providing by the warranty monitoring and claims processing system computing device, a claim processing instruction to the first user for the one or more of the selected items from the first list of purchased items that are offered at a lower price wherein the claim processing instruction directs the first user regarding how to provide the claim processing instruction response;

receiving at the warranty monitoring and claims processing system computing device, the claim processing instruction response from the first user for the one or more of the selected items from the first list of purchased items that are offered at a lower price; and transmitting to at least one of the low price guarantee providers from the warranty monitoring and claims processing system computing device, a low price claim for the one or more selected items from the first list of purchased items that are offered at a lower price wherein the transmission includes at least in part identification of the first user, the one or more selected items, and the lower prices.

2. The method as defined in claim 1, wherein the second user is a plurality of users.

3. The method as defined in claim 1, wherein the second merchant and the third merchant are a plurality of merchants.

4. The method as defined in claim 1, wherein the low price guarantee provider is the first merchant or a credit card provider.

5. The method as defined in claim 1, wherein the one or more items purchased are purchased online, offline, or any combination of online and offline.

6. The method as defined in claim 5, wherein the items purchased offline are purchases made by the first user or the second user visiting the first merchant or the second merchant in person.

7. The method as defined in claim 1, wherein the second user is the first user.

8. A system comprising:
at least one computer processor and
a non-transitory memory, which is operably connected to the at least one computer processor, and embodied with a computer program comprising instructions when executed by the at least one computer processor perform the steps of:

providing a software program to a mobile device associated with a first user;

providing to the first user instructions directing the first user regarding how to select some or all items to be monitored from a one or more purchase receipts;

receiving a first image wherein the first image is taken using the first user's mobile device and the first image includes a picture of one or more purchase receipts of one or more items purchased by the first user at a first merchant;

determining at least in part from the first image, a first list of one or more items purchased by the first user at the first merchant wherein the first list of purchased items includes a purchase price per item;

recording the first list of purchased items;

determining at least in part from the first image, a first user selection of one or more items from the first list of purchased items;

determining for each item selected from the first list of purchased items, if there is at least a one low price guarantee period, and if there is at least one low price guarantee period, then determining a duration for each of the said low price guarantee periods at least in part by accessing (a) information recorded in the warranty monitoring and claims processing system computing device, (b) over a data network coupled to the warranty monitoring and claims processing system computing device information stored by the first merchant (c) over the data network coupled to the warranty monitoring and claims processing system computing device information stored by a low price guarantee provider, (a) and (b), (a) and (c), (b) and (c), or (a) and (b) and (c);

recording for each item selected the determined one or more low price guarantee periods;

providing a user interface wherein the first user can view a low price guarantee status for each item selected from the first list of purchased items wherein the low price guarantee status includes a current position within the low price guarantee period if at least one of the low price guarantees for the selected item is currently active;

receiving a second image wherein the second image is taken using a mobile device of a second user and the second image includes a picture of one or more purchase receipts of one or more items purchased by the second user at the first merchant or at a second merchant;

determining at least in part from the second image, a second list of one or more items purchased by the second user at the first merchant or at the second merchant wherein the second list of purchased items includes a purchase price per item;

recording the second list of purchased items;

comparing the purchase price for each selected item from the first list of purchased items if at least one of the low price guarantees for the selected item is currently active wherein the comparison is based at least in part on prices of the selected items at the first merchant, at the second merchant, or at a third merchant;

providing a low price guarantee notification to the first user if a one or more of the comparisons detects that a selected item from the first list of purchased items was purchased by the first user at a higher price than the prices of the selected items at the first merchant, at the second merchant, or at the third merchant during one or more of the associated low price guarantee periods;

providing a claim processing instruction to the first user for the one or more of the selected items from the first list of purchased items that are offered at a lower price wherein the claim processing instruction directs the first user regarding how to provide the claim processing instruction response;

receiving the claim processing instruction response from the first user for the one or more of the selected items from the first list of purchased items that are offered at a lower price; and transmitting to at least one of the low price guarantee providers, a low price claim for the one or more selected items from the first list of purchased items that are offered at a lower price wherein the transmission includes at least in part identification of the first user, the one or more selected items, and the lower prices.

9. The system as defined in claim 8, wherein the second user is a plurality of users.

10. The system as defined in claim 8, wherein the second merchant and the third merchant are a plurality of merchants.

11. The system as defined in claim 8, wherein the low price guarantee provider is the first merchant or a credit card provider.

12. The system as defined in claim 8, wherein the one or more items purchased are purchased online, offline, or any combination of online and offline.

13. The system as defined in claim 12, wherein the items purchased offline are purchases made by the first user or the second user visiting the first merchant or the second merchant in person.

14. The system as defined in claim 8, wherein the second user is the first user.

15. A non-transitory computer readable medium embodied with a computer program comprising instructions when executed perform the steps of:

providing a software program to a mobile device associated with a first user;

providing to the first user instructions directing the first user regarding how to select some or all items to be monitored from a one or more purchase receipts;

receiving a first image wherein the first image is taken using the first user's mobile device and the first image includes a picture of one or more purchase receipts of one or more items purchased by the first user at a first merchant;

determining at least in part from the first image, a first list of one or more items purchased by the first user at-the first merchant wherein the first list of purchased items includes a purchase price per item;

recording the first list of purchased items;

determining at least in part from the first image, a first user selection of one or more items from the first list of purchased items;

determining for each item selected from the first list of purchased items, if there is at least a one low price guarantee period, and if there is at least one low price guarantee period, then determining a duration for each of the said low price guarantee periods at least in part by accessing (a) information recorded in the warranty monitoring and claims processing system computing device, (b) over a data network coupled to the warranty monitoring and claims processing system computing device information stored by the first merchant (c) over the data network coupled to the warranty monitoring and claims processing system computing device information stored by a low price guarantee provider, (a) and (b), (a) and (c), (b) and (c), or (a) and (b) and (c);

recording for each item selected the determined one or more low price guarantee periods;

providing a user interface wherein the first user can view a low price guarantee status for each item selected from the first list of purchased items wherein the low price guarantee status includes a current position within the low price guarantee period if at least one of the low price guarantees for the selected item is currently active;

receiving a second image wherein the second image is taken using a mobile device of a second user and the second image includes a picture of one or more purchase receipts of one or more items purchased by the second user at the first merchant or at a second merchant;

determining at least in part from the second image, a second list of one or more items purchased by the second user at the first merchant or at the second merchant wherein the second list of purchased items includes a purchase price per item;

recording the second list of purchased items;

comparing the purchase price for each selected item from the first list of purchased items if at least one of the low price guarantees for the selected item is currently active wherein the comparison is based at least in part on prices of the selected items at the first merchant, at the second merchant, or at a third merchant;

providing a low price guarantee notification to the first user if a one or more of the comparisons detects that a selected item from the first list of purchased items was purchased by the first user at a higher price than the prices of the selected items at the first merchant, at the second merchant, or at the third merchant during one or more of the associated low price guarantee periods;

providing a claim processing instruction to the first user for the one or more of the selected items from the first list of purchased items that are offered at a lower price wherein the claim processing instruction directs the first user regarding how to provide the claim processing instruction response;

receiving the claim processing instruction response from the first user for the one or more of the selected items from the first list of purchased items that are offered at a lower price; and transmitting to at least one of the low price guarantee providers, a low price claim for the one or more selected items from the first list of purchased items that are offered at a lower price wherein the transmission includes at least in part identification of the first user, the one or more selected items, and the lower prices.

16. The non-transitory computer readable medium as defined in claim 15, wherein the second user is a plurality of users.

17. The non-transitory computer readable medium as defined in claim 15, wherein the second merchant and the third merchant are a plurality of merchants.

18. The non-transitory computer readable medium as defined in claim 15, wherein the low price guarantee provider is the first merchant or a credit card provider.

19. The non-transitory computer readable medium as defined in claim 15, wherein the one or more items purchased are purchased online, offline, or any combination of online and offline.

20. The non-transitory computer readable medium as defined in claim 19, wherein the items purchased offline are purchases made by the first user or the second user visiting the first merchant or the second merchant in person.

21. The non-transitory computer readable medium as defined in claim 15, wherein the second user is the first user.

\* \* \* \* \*